United States Patent
Matsumoto et al.

(10) Patent No.: US 8,418,797 B2
(45) Date of Patent: Apr. 16, 2013

(54) WORK VEHICLE

(75) Inventors: Keiji Matsumoto, Osaka (JP); Jun Terashima, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 316 days.

(21) Appl. No.: 12/937,815

(22) PCT Filed: Jun. 3, 2008

(86) PCT No.: PCT/JP2008/060186
§ 371 (c)(1),
(2), (4) Date: Oct. 14, 2010

(87) PCT Pub. No.: WO2009/128172
PCT Pub. Date: Oct. 22, 2009

(65) Prior Publication Data
US 2011/0048829 A1  Mar. 3, 2011

(30) Foreign Application Priority Data
Apr. 14, 2008  (JP) .................. 2008-105038

(51) Int. Cl.
*F16H 61/40* (2010.01)
(52) U.S. Cl.
USPC ................ 180/307; 180/197; 180/336
(58) Field of Classification Search ........... 180/305, 180/307, 197, 336
See application file for complete search history.

(56) References Cited

U.S. PATENT DOCUMENTS

| | | | |
|---|---|---|---|
| 7,913,799 B2 * | 3/2011 | Kawashiri et al. | 180/335 |
| 8,220,582 B2 * | 7/2012 | Toyokawa et al. | 180/336 |
| 2012/0061153 A1 * | 3/2012 | Porter et al. | 180/6.48 |

FOREIGN PATENT DOCUMENTS

| JP | 04-347058 A | 12/1992 |
|---|---|---|
| JP | 05-223169 A | 8/1993 |
| JP | 05-263926 A | 10/1993 |
| JP | 09-331604 A | 12/1997 |
| JP | 2006-218974 A | 8/2006 |
| JP | 2008-045639 A | 2/2008 |
| JP | 2008-095710 A | 4/2008 |
| JP | 2008-099346 A | 4/2008 |
| JP | 2009-063026 A | 3/2009 |
| JP | 2009-063027 A | 3/2009 |

OTHER PUBLICATIONS

International Search Report for PCT/JP2008/060186, Japanese Patent Office, mailed Sep. 16, 2008, 6 pages.

* cited by examiner

*Primary Examiner* — Kevin Hurley
(74) *Attorney, Agent, or Firm* — Sterne, Kessler, Goldstein & Fox P.L.L.C.

(57) ABSTRACT

The purpose of the present invention is to provide a work vehicle that does not slip. The work vehicle has an engine (10) generating a rotational power, a hydraulic stepless transmission (HST) (20) having a hydraulic pump (22) and a hydraulic motor (24) and changing the speed of rotation generated by the engine (10) and transmitting it to drive wheels (40), an actuator (73) for adjusting the transmission ratio of the HST (20) by changing the tilt angle of a movable swash plate (22a) of the hydraulic pump (22), a shift lever (speed setting means) (50) for setting the speed of a motor output shaft (25) changed by the HST (20), and a control device (60) for controlling operation of the actuator (73) so that the speed of the motor output shaft (25) changed by the HST (20) changes at a predetermined rate of change ($\beta$) until it reaches the speed (preset speed) set by the shift lever (50).

1 Claim, 28 Drawing Sheets

(a)

(b)

WORK VEHICLE

TECHNICAL FIELD

The present invention relates to an art for preventing slip of a work vehicle.

BACKGROUND ART

Conventionally, there is a well-known art of a work vehicle in which a rotation sensor detects a rotational speed of an axle, whether slip occurs or not is judged based on the detection, and when the slip occurs, control is performed so as to suppress the slip (for example, see the Patent Literature 1).

Patent Literature 1: the Japanese Patent Laid Open Gazette 2006-218974

DISCLOSURE OF INVENTION

Problems to be Solved by the Invention

However, in the work vehicle, the rotation sensor with high resolution is required to quickly and accurately judge whether the slip occurs or not. Such a sensor is generally expensive and is disadvantageous because of increasing the parts cost.

There is a method for suppressing slip having occurred, whereby a pressure adjusting valve is provided in a hydraulic stepless transmission (hereinafter, simply referred to as "HST") of the work vehicle so as to reduce pressure in a closed hydraulic circuit in the HST.

According to this construction, the rotational speed of the axle of the work vehicle, i.e., the rotational speed of drive wheels is reduced so as to increase the gripping power of the drive wheels, thereby suppressing the slip.

However, the above-mentioned work vehicle is disadvantageous because the pressure in the closed hydraulic circuit of the HST is lost so that large energy loss occurs in the HST and the energy loss raises the oil temperature.

Namely, the work vehicle constructed so as to perform the control suppressing the slip having occurred once is disadvantageous because of increasing parts cost and causing energy loss.

In consideration of the above problems, an object of the present invention is to provide a work vehicle which can be prevented from slipping.

Means for Solving the Problems

The above-mentioned problems are solved by the present invention with the following means.

In a first aspect of the present invention, a work vehicle comprises: an engine generating a rotational power; a hydraulic stepless transmission having a hydraulic pump and a hydraulic motor, speed-changing the rotational power generated by the engine and transmitting the power to a drive wheel; an actuator changing a tilt angle of a movable swash plate of the hydraulic pump so as to adjust a speed change ratio of the hydraulic stepless transmission; a speed setting means for setting the rotational speed of an output shaft changed by the hydraulic stepless transmission; and a control device for controlling movement of the actuator so that the rotational speed of the output shaft changed by the hydraulic stepless transmission changes at a predetermined rate until it reaches the rotational speed set by the speed setting means.

In a second aspect of the present invention, a work vehicle comprises: an engine generating a rotational power; a hydraulic stepless transmission having a hydraulic pump and a hydraulic motor, speed-changing in speed the rotational power generated by the engine and transmitting the power to a drive wheel; an actuator for changing a tilt angle of a movable swash plate of the hydraulic pump so as to adjust a speed change ratio of the hydraulic stepless transmission; a speed setting means for setting the rotational speed of an output shaft changed by the hydraulic stepless transmission; and a control device for controlling movement of the actuator based on the rotational speed set by the speed setting means. The control device comprises: a movable swash plate angle control means for controlling movement of the actuator so as to make the rotational speed of the output shaft changed by the hydraulic stepless transmission equal to the rotational speed set by the speed setting means; and a movement rate restriction means for controlling the actuator controlled by the movable swash plate angle control means so as to move the actuator at a predetermined rate.

In a third aspect of the present invention, a work vehicle comprises: an engine generating a rotational power; a hydraulic stepless transmission having a hydraulic pump and a hydraulic motor, speed-changing the rotational power generated by the engine and transmitting the power to a drive wheel; an actuator for changing a tilt angle of a movable swash plate of the hydraulic pump so as to adjust a speed change ratio of the hydraulic stepless transmission; a speed setting means for setting the rotational speed of an output shaft changed by the hydraulic stepless transmission; and a control device for controlling movement of the actuator based on the rotational speed set by the speed setting means. The control device comprises: a change rate restriction means for changing a target rotational speed at a predetermined rate until it reaches the rotational speed set by the speed setting means; and a movable swash plate angle control means for controlling movement of the actuator so as to make the rotational speed of the output shaft changed by the hydraulic stepless transmission equal to the target rotational speed.

In a fourth aspect of the present invention, a work vehicle comprises: a motor generating a rotational power so as to rotate drive wheels; a speed setting means for setting the rotational speed of the motor; and a control device for controlling the rotational speed of the motor so as to change the rotational speed of the motor at a predetermined rate until it becomes equal to the rotational speed set by the speed setting means.

In a fifth aspect of the present invention, the work vehicle further comprises a change rate setting means for setting the predetermined rate, and the control device adjusts the predetermined rate based on the setting by the change rate setting means.

In a sixth aspect of the present invention, the work vehicle further comprises a tilt angle detection means for detecting a tilt angle of a vehicle body, and the control device adjusts the predetermined rate based on the tilt angle of the vehicle body detected by the tilt angle detection means.

In a seventh aspect of the present invention, a work vehicle comprises: an engine generating a rotational power; a hydraulic stepless transmission having a hydraulic pump and a hydraulic motor, speed-changing in speed the rotational power generated by the engine and transmitting the power to a drive wheel; a speed setting means for changing a tilt angle of a movable swash plate of the hydraulic pump so as to adjust a speed change ratio of the hydraulic stepless transmission; a damper having an adjustable damping force for restricting movement of the speed setting means at a predetermined rate;

and a damping force setting means adjusting the damping force of the damper so as to set the predetermined rate.

Effect of the Invention

The present invention constructed as the above brings the following effects.

Due to the first aspect of the present invention, the work vehicle has its acceleration restricted so as to be prevented from slipping at the time of acceleration or deceleration. The work vehicle is also prevented from having sudden speed change (shock) at the time of starting or stopping, thereby improving its comfort.

Due to the second aspect of the present invention, the work vehicle has its acceleration restricted so as to be prevented from slipping at the time of acceleration or deceleration. The work vehicle is also prevented from having sudden speed change (shock) at the time of starting or stopping, thereby improving its comfort. In the control system, even if the actuator wrongly acts, the rate of movement of the actuator can be controlled so as to change the rotational speed of the drive wheels at a proper rate.

Due to the third aspect of the present invention, the work vehicle has its acceleration restricted so as to be prevented from slipping at the time of acceleration or deceleration. The work vehicle is prevented from having sudden speed change (shock) at the time of starting or stopping, thereby improving its comfort.

Due to the fourth aspect of the present invention, the work vehicle has its acceleration restricted so as to be prevented from slipping at the time of acceleration or deceleration. The work vehicle is also prevented from having sudden speed change (shock) at the time of starting or stopping, thereby improving its comfort. This construction does not cost for increasing parts because it is easily adaptable to any work vehicle having a motor whose rotational speed is controlled for driving the vehicle.

Due to the fifth aspect of the present invention, the rate of movement of the actuator can be adjusted to a desired value so as to correspond to states of road surfaces or the like, thereby optimizing comfort of the work vehicle for an operator.

Due to the sixth aspect of the present invention, in the case of traveling on a slope, the rate of movement of the actuator can be adjusted so as to correspond to the tilt angle of the slope. Accordingly, the control can be optimized in response to variation of the slope angle.

Due to the seventh aspect of the present invention, the work vehicle has its acceleration restricted so as to be prevented from slipping at the time of acceleration or deceleration. The work vehicle is also prevented from having sudden speed change (shock) at the time of starting or stopping, thereby improving its comfort. This slip preventing control can be easily performed in a work vehicle having a speed change device with no electronic control system.

Figure 1:
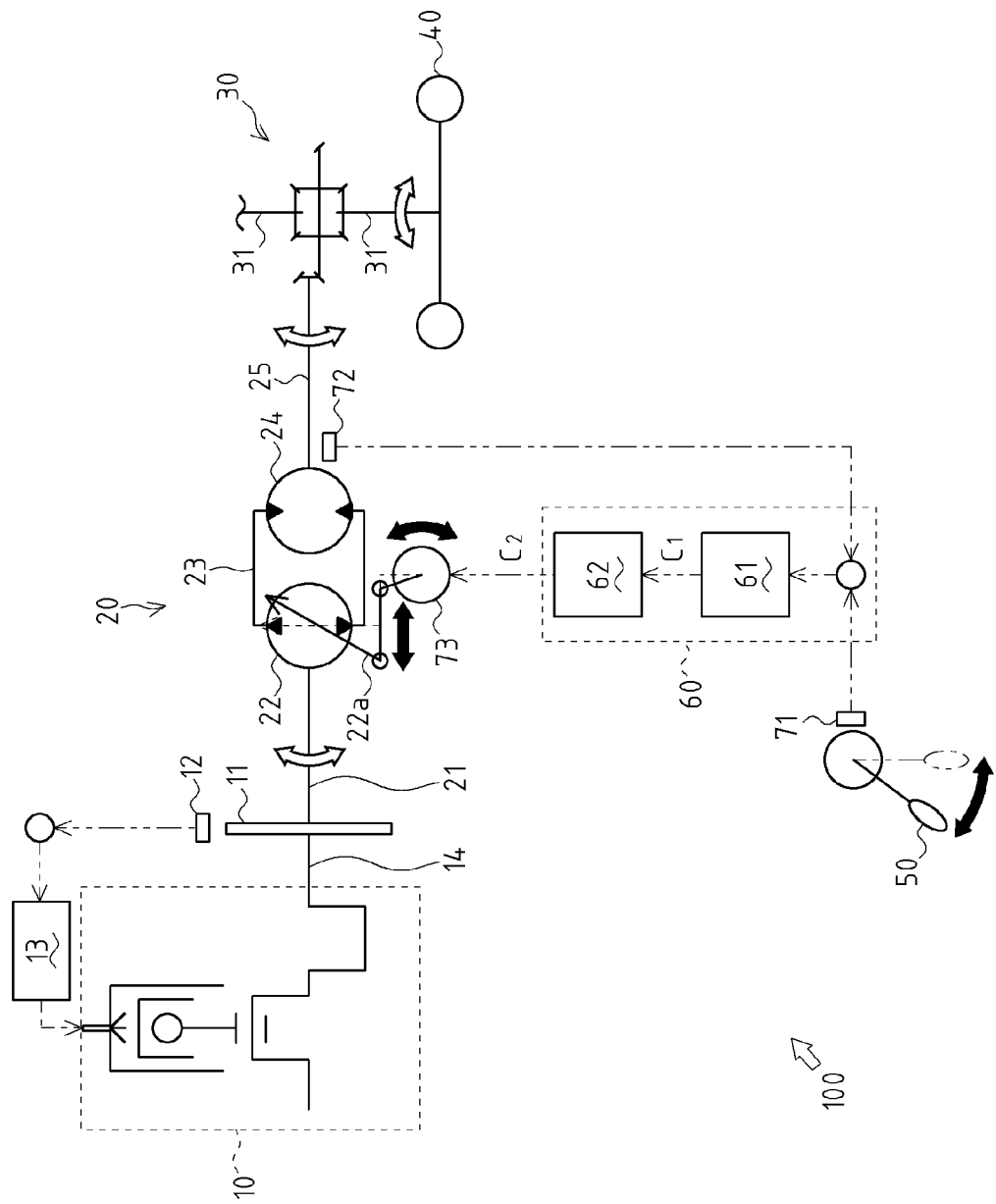
FIG. 1 It is a schematic diagram of a work vehicle according to a first embodiment of the present invention.

DESCRIPTION OF NOTATIONS 10 engine
20 HST (hydraulic stepless transmission)
25 motor output shaft (output shaft)
50 shift lever (speed setting means)
60 control device
61 movable swash plate angle control means
62 movement rate restriction means
74 setting device (change rate setting means)
75 tilt sensor (tilt angle detection means)
100 work vehicle
480 motor
570 variable damper (damping-force adjustable damper)

THE BEST MODE FOR CARRYING OUT THE INVENTION

Explanation will be given on a work vehicle 100, which is a first embodiment of the work vehicle according to the present invention, referring to FIGS. 1 and 2.

As shown in FIG. 1, the work vehicle 100 mainly has an engine 10, a hydraulic stepless transmission (hereinafter, simply referred to as "HST") 20, a differential 30, drive wheels 40, a shift lever 50 and a control device 60.

The engine 10 generates a rotational power so as to drive the work vehicle 100. The engine 10 mainly has a flywheel 11, a rotational speed sensor 12 and an engine controller 13.

The flywheel 11 saves inertial force so as to smoothen the rotation of the engine 10. The flywheel 11 is interlockingly connected to one of ends of a crankshaft 14 of the engine 10. The rotational power of the engine 10 is transmitted through the crankshaft 14 to the flywheel 11. The flywheel 11 is rotated by the rotational power transmitted through the crankshaft 14.

The rotational speed sensor 12 detects the rotational speed of the flywheel 11. The rotational speed sensor 12 includes a magnetic pickup sensor, a rotary encoder or the like.

The engine controller 13 controls the rotational speed of the engine 10. The engine controller 13 is connected to the rotational speed sensor 12. The engine controller 13 controls the rotational speed of the engine 10 based on the rotational speed of the flywheel 11 detected by the rotational speed sensor 12.

The HST 20 changes a speed of the rotational power generated by the engine 10. The HST mainly includes a pump input shaft 21, a variable displacement hydraulic pump 22, a closed hydraulic circuit 23, a hydraulic motor 24 and a motor output shaft 25.

The hydraulic motor 24 may also have a variable displacement, and a movable swash plate of the hydraulic motor 24, or both the movable swash plates of the variable displacement hydraulic pump and motor 22 and 24 may be controlled as mentioned later. In this embodiment, the hydraulic stepless transmission is employed. Alternatively, a belt type stepless transmission or a toroidal stepless transmission may be employed. Any operation means can be employed only if it can perform stepless speed change.

The pump input shaft 21 transmits the rotational power of the flywheel 11. One of ends of the pump input shaft 21 is interlockingly connected to the flywheel 11.

The hydraulic pump 22 discharges hydraulic oil. The other end of the pump input shaft 21 is interlockingly connected to the hydraulic pump 22. The rotational power of the flywheel 11 is transmitted through the pump input shaft 21 to the hydraulic pump 22. The hydraulic pump 22 is rotated by the rotational power transmitted by the pump input shaft 21 so as to discharge hydraulic oil.

The hydraulic pump 22 has a movable swash plate 22a. By adjusting tilt angle of the movable swash plate 22a, discharge amount and discharge direction of the hydraulic oil can be changed.

The hydraulic circuit 23 guides the hydraulic oil discharged from the hydraulic pump 22. The hydraulic circuit 23 is fluidly connected to the hydraulic pump 22.

The hydraulic oil is pressurized and delivered to rotate hydraulic motor 24. The hydraulic motor 24 is fluidly connected to the hydraulic circuit 23. The hydraulic motor 24 is rotated by hydraulic oil guided by the hydraulic circuit 23. Namely, the rotational power of the hydraulic pump 22 is transmitted to the hydraulic motor 24 via the pressurized hydraulic oil sent in the hydraulic circuit 23.

The motor output shaft 25 transmits the rotational power of the hydraulic motor 24. One of ends of the motor output shaft 25 is interlockingly connected to the hydraulic motor 24.

The differential 30 distributes the rotational power. The other end of the motor output shaft 25 is interlockingly connected to the differential 30. The rotational power of the hydraulic motor 24 is transmitted through the motor output shaft 25 to the differential 30. The differential 30 distributes the transmitted rotational power to left and right sides thereof.

Each of two axles 31 is connected at one of ends thereof to a corresponding one of the left and right sides of the differential 30. The axles 31 transmit the rotational power distributed by the differential 30.

The drive wheels 40 are wheels rotated by the transmitted rotational power. Each of the drive wheels 40 is interlockingly connected to the other end of a corresponding one of the axles 31. The rotational power of the differential 30 is transmitted through the axles 31 to the drive wheels 40. The drive wheels 40 are rotated by the rotational power transmitted through the axles 31.

In this embodiment, the differential 30 distributes the transmitted rotational power to the left and right sides. However, for convenience of explanation, one of the left and right drive wheels 40 is omitted in hereinafter explanation and drawings.

The shift lever 50 sets a rotational speed of the rotational power after changed in speed by the HST 20, that is, the rotational speed of the motor output shaft 25. Hereinafter, the rotational speed of the motor output shaft 25 set by the shift lever 50 is simply referred to as "set rotational speed". By rotationally operating the shift lever 50, the rotational speed of the motor output shaft 25 is set. The shift lever 50 is provided at a position convenient to an operator's operation in the vicinity of a driver's seat of the work vehicle 100.

The control device 60 controls the tilt angle of the movable swash plate 22a of the HST 20. The control device 60 is mainly connected to a lever rotation angle detection sensor 71, an output shaft rotational speed sensor 72 and an actuator 73.

The lever rotation angle detection sensor 71 detects the rotation angle of the shift lever 50, i.e., the set rotational speed.

The output shaft rotational speed sensor 72 detects the actual rotational speed of the motor output shaft 25 (hereinafter, simply referred to as "actual rotational speed"). A magnetic pickup sensor, a rotary encoder or the like serves as the output shaft rotational speed sensor 72.

In this embodiment, a rotation sensor detecting the rotational speed of the motor output shaft 25 serves as the output shaft rotational speed sensor 72. Alternatively, an angle sensor detecting the tilt angle of the movable swash plate 22a may serve as the output shaft rotational speed sensor 72. Any means may serve only if it can detect a physical quantity which is proportional to the actual rotational speed.

The actuator 73 changes the tilt angle of the movable swash plate 22a. The actuator 73 is constructed by a servomotor or the like. The actuator 73 is interlockingly connected to the movable swash plate 22a. By moving the actuator 73, the tilt angle of the movable swash plate 22a is adjusted.

The control device 60 is connected to the lever rotation angle detection sensor 71 so as to obtain a signal of the set rotational speed detected by the lever rotation angle detection sensor 71.

The control device 60 is connected to the output shaft rotational speed sensor 72 so as to obtain a signal of the actual rotational speed detected by the output shaft rotational speed sensor 72.

The control device 60 is connected to the actuator 73 so as to control movement of the actuator 73.

Concretely, the control device 60 may be constructed by a CPU, a ROM, a RAM, a HDD connected by a bus, or may alternatively be one-chip LSI or the like.

Various programs and data for controlling the movement of the actuator 73 are stored in the control device 60, and the movement of the actuator 73 is controlled based on the programs and data.

By operating the movement of the actuator 73 by the control device 60, the tilt angle of the movable swash plate 22a is adjusted. By adjusting the tilt angle of the movable swash plate 22a, the discharge amount and discharge direction of the hydraulic oil of the hydraulic pump 22 is adjusted. By adjusting the discharge amount and discharge direction of the hydraulic oil of the hydraulic pump 22, the rotational speed and rotational direction of the hydraulic motor 24 is adjusted. By adjusting the rotational speed and rotational direction of the hydraulic motor 24, the rotational speed and rotational direction of the motor output shaft 25 is adjusted.

Explanation will be given on control necessary for preventing slip of the work vehicle 100.

On an assumption that a friction coefficient, a mass of the work vehicle 100 and the gravitational acceleration are algebrized as $\mu$, m and g, respectively, a traction power Ft of the work vehicle 100 is expressed by a formula (1) as follows.

$$Ft = \mu \cdot m \cdot g \tag{1}$$

On an assumption that acceleration of the work vehicle 100 is algebrized as $\alpha$, an accelerating force Fa required for accelerating the work vehicle 100 with the acceleration $\alpha$ is expressed by a formula (2) as follows.

$$Fa = m \cdot \alpha \tag{2}$$

When the accelerating force Fa is larger than the fraction power Ft, the slip occurs. In other words, as meant by the following formula (3), when the accelerating force Fa is not more than the traction power Ft, the slip does not occur.

$$m \cdot \alpha \leq \mu \cdot m \cdot g \tag{3}$$

By rewriting the formula (3), the following formula (4) is obtained.

$$\alpha \leq \mu \cdot g \tag{4}$$

Namely, when the acceleration $\alpha$ is not more than $\mu \cdot g$, the slip does not occur.

The tilt angle of the movable swash plate 22a is proportional to the rotational speed of the motor output shaft 25. Namely, the rate of change of the tilt angle of the movable swash plate 22a is proportional to the rate of change of the rotational speed of the motor output shaft 25, i.e., the acceleration $\alpha$ of the work vehicle 100.

Accordingly, by controlling the rate of change of the tilt angle of the movable swash plate 22a so as to make the acceleration $\alpha$ not more than $\mu \cdot g$, the slip can be prevented.

Explanation will be given on patterns of controlling the movement of the actuator 73 by the control device 60.

As shown in FIG. 1, the control device 60 includes a movable swash plate angle control means 61 and a movement rate restriction means 62, which serve as control means controlling the movement of the actuator 73.

Based on the inputted signals detected by the lever rotation angle detection sensor 71 and the output shaft rotational speed sensor 72, the movable swash plate angle control means 61 calculates a movement degree X of the actuator 73 necessary for rotating the motor output shaft 25 at the set rotational speed, and outputs a control signal $C_1$ for moving the actuator 73 to the movement degree X.

Based on the inputted control signal $C_1$, the movement rate restriction means 62 outputs a control signal $C_2$ for moving the actuator 73 to the movement degree X at a predetermined rate $\beta$.

In this case, the predetermined rate $\beta$ is set so as to satisfy $\alpha \leq \mu \cdot g$, that is, so as to prevent the slip. In this embodiment, the friction coefficient $\mu$ is previously determined based on experiments and numerical simulations and is stored in the control device 60.

According to the control signal $C_2$, the actuator 73 moves at the predetermined rate $\beta$ until it reaches the movement degree X. Accordingly, the rotational speed of the motor output shaft 25 is changed toward the set rotational speed at the predetermined rate $\beta$, and in its turn, the rotational speed V of the drive wheels 40 is changed at the predetermined rate $\beta$.

Figure 2:
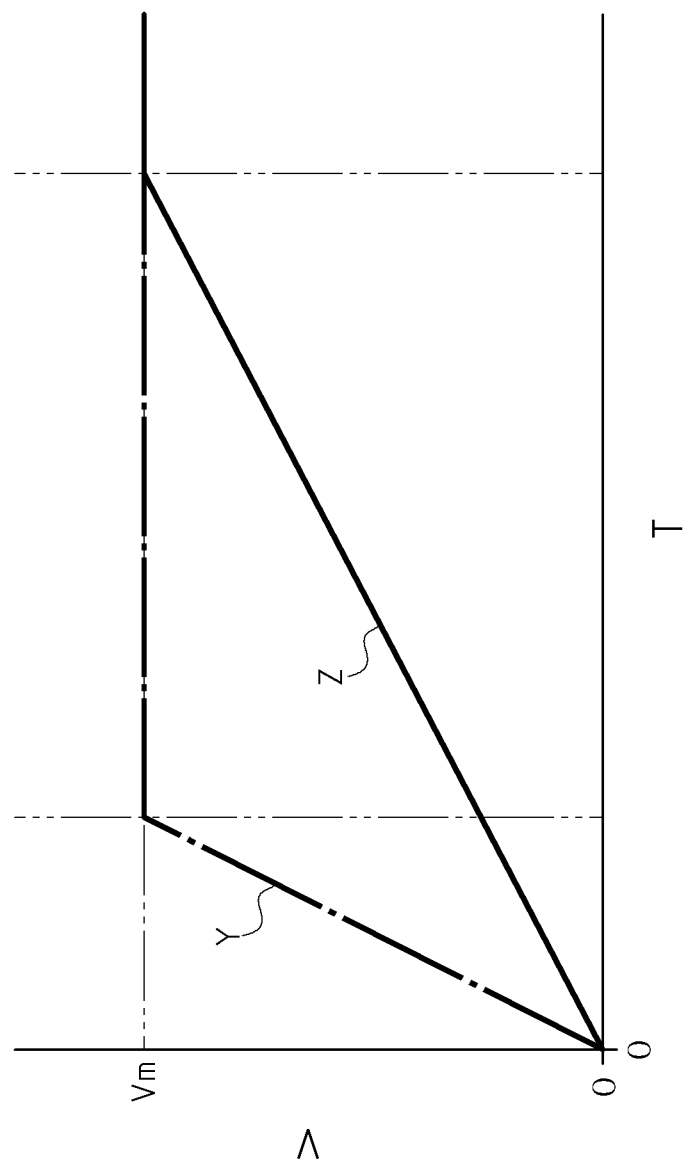
FIG. 2 It is a graph indicating change of rotational speed of a drive wheel of the work vehicle.

Referring to FIG. 2, explanation will be given on time-dependent change of the rotational speed V of the drive wheels 40 in the case that the work vehicle 100 constructed as this embodiment starts traveling from its stationary state. In the graph of FIG. 2, the axis of abscissas indicates elapsed time T from starting the operation of the shift lever 50, and the axis of ordinates indicates the rotational speed V.

It is assumed that the shift lever 50 is operated in a moment from a point zeroing the elapsed time T and the set rotational speed to a set position (in FIG. 2, a position for setting the rotational speed V of the drive wheels 40 to Vm).

An alternate long and short dash line Y indicates a typical change of the rotational speed V in the case that the control with the change rate control means 62 is not performed.

When the shift lever 50 is operated from the point of T=0, the rotational speed V increases to Vm suddenly. It may make the accelerating force Fa exceed the traction power Ft so as to cause the slip.

A solid line Z indicates a typical change of the rotational speed V due to the construction of this embodiment.

When the shift lever 50 is operated from the point of T=0, the rotational speed V increases to Vm at the predetermined rate $\beta$. Accordingly, the accelerating force Fa does not exceed the fraction power Ft, and in its turn, the slip is prevented.

As mentioned above, the work vehicle 100 in this embodiment comprises:

the engine 10 generating a rotational power;

the HST 20 having the hydraulic pump 22 and the hydraulic motor 24, speed-changing the rotational power generated by the engine 10 and transmitting the power to the drive wheels 40;

the actuator 73 for changing the tilt angle of the movable swash plate 22a of the hydraulic pump 22 so as to adjust a speed change ratio of the HST 20;

the shift lever (speed setting means) 50 for setting the rotational speed of the motor output shaft 25 changed by the HST 20; and the control device 60 for controlling the movement of the actuator 73 so that the rotational speed of the motor output shaft 25 changed by the HST 20 changes at the predetermined rate $\beta$ until it reaches the rotational speed set by the shift lever 50 (set rotational speed).

Due to the above construction, the acceleration $\alpha$ of the work vehicle 100 can be restricted so as to prevent the work vehicle 100 from slipping at the time of acceleration or deceleration. The work vehicle 100 can also be prevented from having sudden speed change (shock) at the time of starting or stopping, thereby improving its comfort. By adjusting the movable swash plate 22a by the actuator 73, the operation power of the shift lever 50 can be reduced. Further, this construction does not cost for increasing parts because it is easily adaptable to any work vehicle having the electronically controlled movable swash plate 22a.

The work vehicle 100 in this embodiment comprises:

the engine 10 generating a rotational power;

the HST 20 having the hydraulic pump 22 and the hydraulic motor 24, speed-changing the rotational power generated by the engine 10 and transmitting the power to the drive wheels 40;

the actuator 73 for changing the tilt angle of the movable swash plate 22a of the hydraulic pump 22 so as to adjust a speed change ratio of the HST 20;

the shift lever (speed setting means) 50 for setting the rotational speed of the motor output shaft 25 changed by the HST 20; and the control device 60 for controlling movement of the actuator 73 based on the rotational speed set by the shift lever 50 (set rotational speed).

The control device 60 comprises:

the movable swash plate angle control means 61 for controlling the movement of the actuator 73 so as to make the rotational speed of the motor output shaft 25 changed by the HST 20 equal to the set rotational speed; and the movement rate restriction means 62 controlling the actuator 73 controlled by the movable swash plate angle control means 61 so as to move the actuator 73 at the predetermined rate $\beta$.

Due to the construction, the acceleration $\alpha$ of the work vehicle 100 can be restricted so as to prevent the work vehicle 100 from slipping at the time of acceleration or deceleration. The work vehicle 100 can also be prevented from having sudden speed change (shock) at the time of starting or stopping, thereby improving its comfort. Due to the actuator 73 for adjusting the movable swash plate 22a, the force for operating the shift lever 50 can be reduced. This construction does not cost for increasing parts because it is easily adaptable to any work vehicle having the electronically controlled movable swash plate 22a. In the control system, even if the action of the actuator 73 is wrong, the rate of movement of the actuator 73 can be controlled so as to change the rotational speed V of the drive wheels 40 at a proper rate.

Explanation will be given on a work vehicle 200, which is a second embodiment of the work vehicle according to the present invention, referring to FIG. 3. Members having substantially the same structure as those of the work vehicle 100 of the first embodiment (see FIG. 1) are designated by the same reference numerals and explanation thereof is omitted.

The different thing of the work vehicle 200 from the work vehicle 100 is that the work vehicle 200 includes a control device 260, a setting device 74 and a tilt sensor 75, instead of the control device 60.

The control device 260 is connected to the setting device 74, the tilt sensor 75 and the like.

The setting device 74 sets the friction coefficient $\mu$ so as to set the predetermined rate $\beta$. The setting device 74 is constructed by a dial setting device with a potentiometer, a dial switch which is adjusted by rotational operation, or the like. In this embodiment, anything can serve as the setting device 74 only if it can set a value of the friction coefficient $\mu$. The setting device 74 is provided at a position convenient to an operator's operation in the vicinity of a driver's seat of the work vehicle 200.

The tilt sensor 75 detects the tilt angle $\theta$ of the body of the work vehicle 200. The tilt sensor 75 is provided in the work vehicle 200.

Explanation will be given on the control needed for preventing the work vehicle 200 from slipping in consideration of the tilt angle $\theta$ of the work vehicle 200.

By considering the tilt angle $\theta$ of the work vehicle 200, the formula 1 is translated to below formula 5.

$$Ft = \mu \cdot m \cdot g \cdot \cos \theta \quad (5)$$

According to the formula 5, the formulas 3 and 4 are translated to the following formulas 6 and 7.

$$m \cdot \alpha \leq \mu \cdot m \cdot g \cdot \cos \theta \quad (6)$$

$$\alpha \leq \mu \cdot g \cdot \cos \theta \quad (7)$$

Namely, when the acceleration $\alpha$ is not more than $\mu \cdot g \cdot \cos \theta$, the slip does not occur.

Accordingly, by adjusting the rate of change of the tilt angle of the movable swash plate 22a so as to make the acceleration $\alpha$ not more than $\mu \cdot g \cdot \cos \theta$, the slip can be prevented.

The control device 260 is connected to the setting device 74 so as to obtain a detection signal of the rate $\beta$ set by the setting device 74.

The control device 260 is connected to the tilt sensor 75 so as to obtain a detection signal of the tilt angle $\theta$ of the work vehicle 200 from the tilt sensor 75.

Explanation will be given on the control of the action of the actuator 73 by the control device 260.

Figure 3:
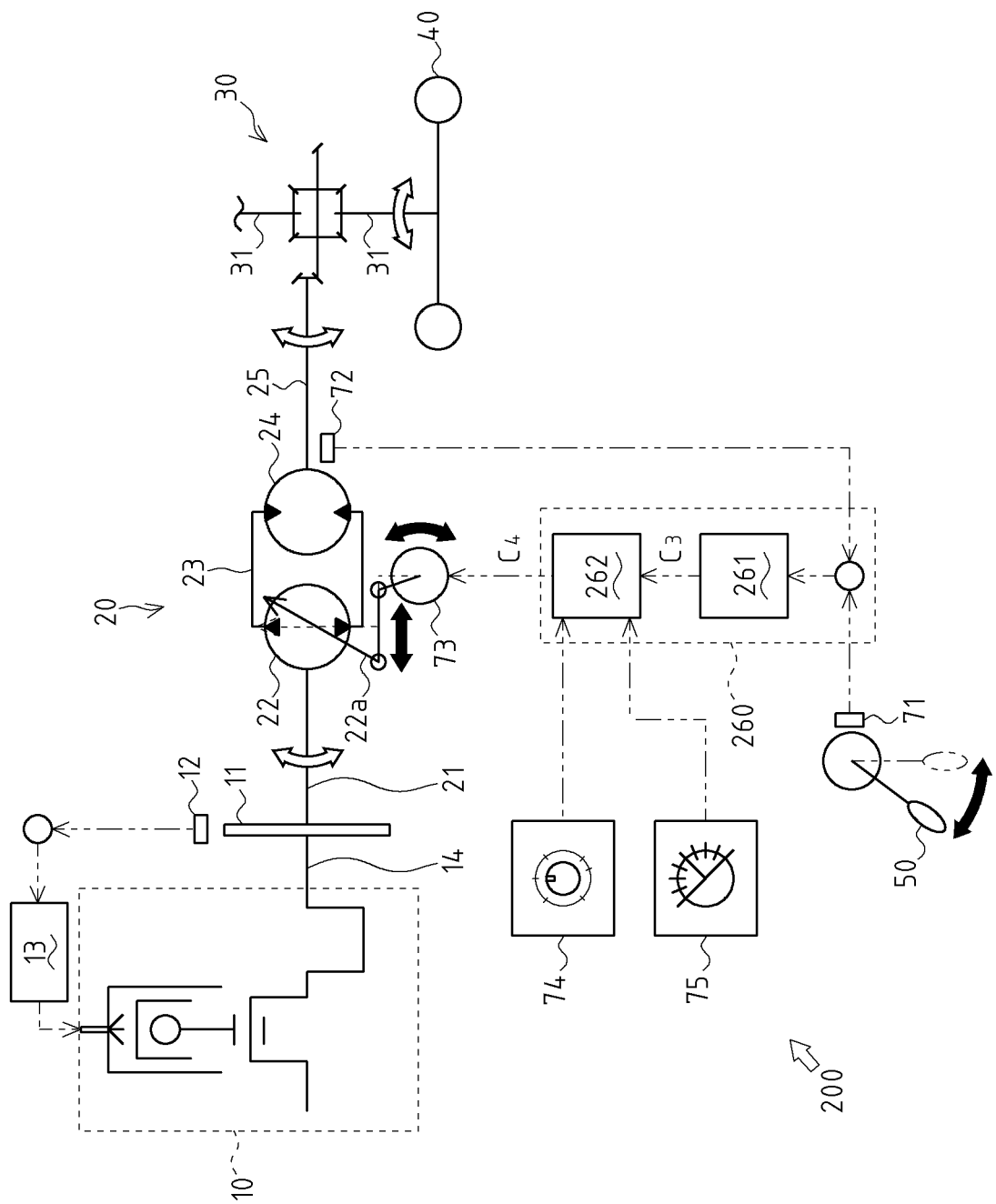
FIG. 3 It is a schematic diagram of a work vehicle according to a second embodiment of the present invention.

As shown in FIG. 3, the control device 260 includes a movable swash plate angle control means 261 and a movement rate restriction means 262 as a control means for controlling the movement of the actuator 73.

Based on the inputted signals detected by the lever rotation angle detection sensor 71 and the output shaft rotational speed sensor 72, the movable swash plate angle control means 261 calculates a movement degree X of the actuator 73 needed for rotating the motor output shaft 25 at the set rotational speed, and outputs a control signal $C_3$ for moving the actuator 73 to the movement degree X.

Based on the inputted control signal $C_3$, the movement rate restriction means 262 outputs a control signal $C_4$ for moving the actuator 73 to the movement degree X at the predetermined rate $\beta$.

In this case, the predetermined rate $\beta$ is set by the movement rate restriction means 262 so as to satisfy $\alpha \leq \mu \cdot g \cdot \cos \theta$. The value of the friction coefficient $\mu$ is determined based on the detection signal from the setting device 74. The value of the tilt angle $\theta$ is determined based on the detection signal from the tilt sensor 75.

Namely, by setting the value of $\mu$ with the setting device 74, the predetermined rate $\beta$ can be adjusted to a desired value so as to correspond to states of road surfaces or the like.

According to the control signal $C_4$, the actuator 73 moves at the predetermined rate $\beta$ until it reaches the movement degree X. Accordingly, the rotational speed of the motor output shaft 25 is changed toward the set rotational speed at the predetermined rate $\beta$, and in its turn, the rotational speed V of the drive wheels 40 is changed at the predetermined rate $\beta$.

As mentioned above, the work vehicle 200 of this embodiment comprises:

the setting device (change rate setting means) 74 for setting the predetermined rate $\beta$, wherein the control device 260 adjusts the predetermined rate $\beta$ based on the setting by the setting device 74.

Due to the construction, the rate of movement of the actuator 73 can be adjusted to a desired value in correspond to states of road surfaces or the like. Accordingly, the comfort of the work vehicle 200 can be optimized.

The work vehicle 200 of this embodiment comprises:

the tilt sensor (tilt angle detection means) 75 for detecting the tilt angle of the vehicle body, wherein the control device 260 adjusts the predetermined rate $\beta$ based on the tilt angle of the vehicle body detected by the tilt sensor 75.

According to the construction, for example, when traveling on a slope, the rate of movement of the actuator 73 can be adjusted so as to correspond to the tilt angle of the slope. Accordingly, the control can be optimized in correspondence to variation of the slope angle.

Explanation will be given on a work vehicle 300, which is a third embodiment of the work vehicle according to the present invention, referring to FIG. 4. Members having substantially the same construction as those of the work vehicle 200 of the second embodiment (see FIG. 3) are designated by the same reference numerals and explanation thereof is omitted.

The different thing of the work vehicle 300 from the work vehicle 200 is that the work vehicle 300 includes a control device 360 instead of the control device 260.

Explanation will be given on the control of the action of the actuator 73 by the control device 360 of this embodiment.

Figure 4:
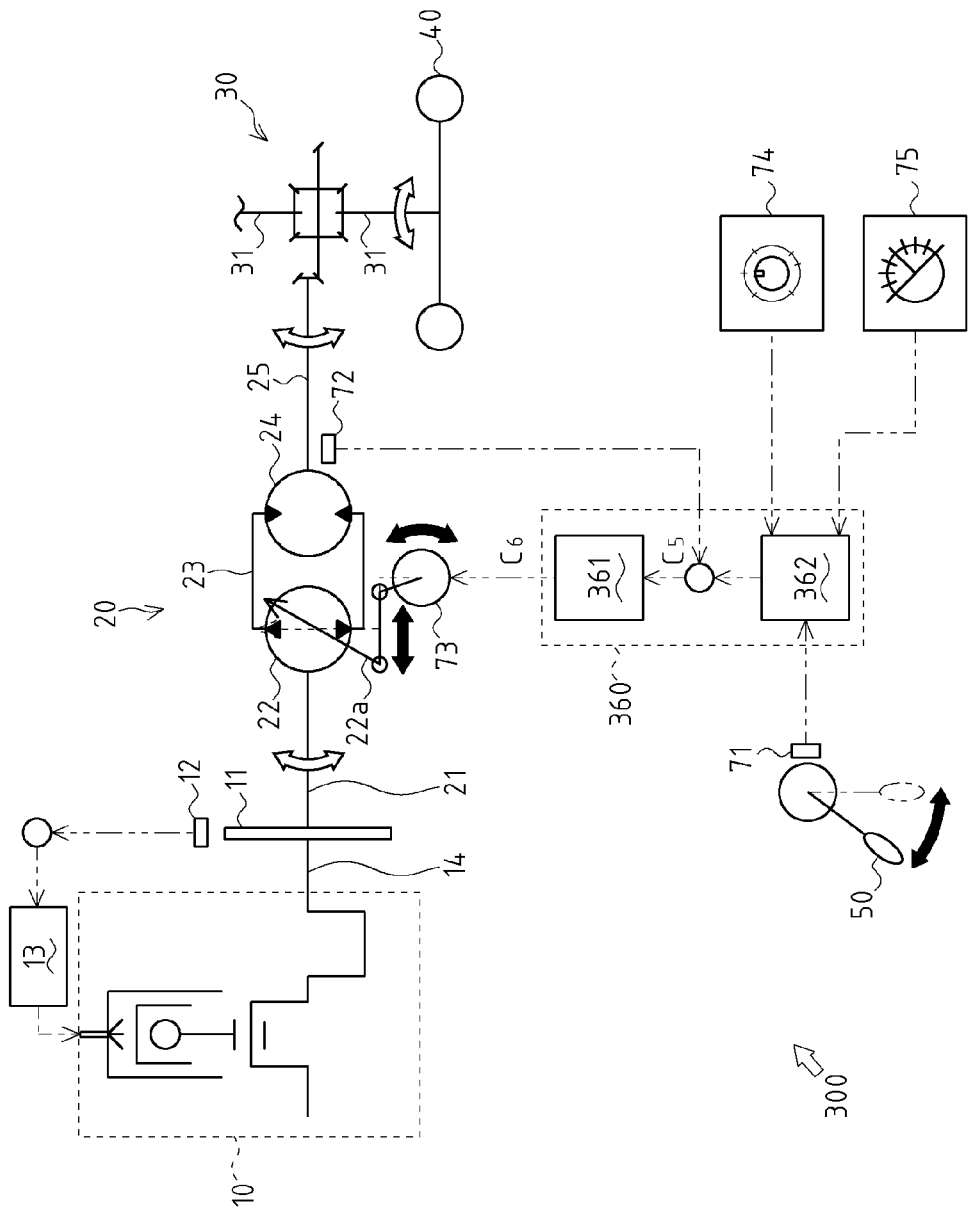
FIG. 4 It is a schematic drawing of a work vehicle according to a third embodiment.

As shown in FIG. 4, the control device 360 includes a movable swash plate angle control means 361 and a change rate restriction means 362, which serve as control means controlling the action of the actuator 73.

The change rate restriction means 362 changes a target value of rotational speed to a set value of rotational speed at a predetermined rate β and outputs a control signal $C_5$ designating the target value of rotational speed.

In this case, the predetermined rate β is set by the change rate restriction means 362 so as to satisfy $\alpha \leq \mu \cdot g \cdot \cos \theta$. The value of the friction coefficient μ is determined based on the detection signal from the setting device 74. The value of the tilt angle θ is determined based on the detection signal from the tilt sensor 75.

Based on the target rotational speed as the inputted control signal $C_5$ and the detection signal of the output shaft rotational speed sensor 72, the movable swash plate angle control means 361 calculates a movement degree X of the actuator 73 needed for rotating the motor output shaft 25 at the set rotational speed, and outputs a control signal $C_6$ for moving the actuator 73 to the movement degree X.

The target rotational speed inputted to the movable swash plate angle control means 361 is changed to the set rotational speed at the predetermined rate β. Therefore, following this change, the movement degree X of the actuator 73 as the outputted control signal $C_6$ is also changed to another movement degree corresponding to the set rotational speed at the predetermined rate β.

According to the control signal $C_6$, the actuator 73 is moved to the movement degree X.

The movement degree X inputted to the actuator 73 is changed to the value corresponding to the set rotational speed at the predetermined rate β. Therefore, following this change, the actuator 73 is also moved at the predetermined rate β.

According to the construction of this embodiment, the rotational speed of the motor output shaft 25 is changed to the set rotational speed at the predetermined rate β, and in its turn, the rotational speed V of the drive wheels 40 is changed at the predetermined rate β.

As mentioned above, the work vehicle 300 in this embodiment comprises:
the engine 10 generating a rotational power;
the HST 20 having the hydraulic pump 22 and the hydraulic motor 24, speed-changing the rotational power generated by the engine 10 and transmitting the power to the drive wheels 40;
the actuator 73 for changing the tilt angle of the movable swash plate 22a of the hydraulic pump 22 so as to adjust a speed change ratio of the HST 20;
the shift lever (speed setting means) 50 for setting the rotational speed of the motor output shaft 25 changed by the HST 20; and
the control device 360 for controlling the movement of the actuator 73 based on the rotational speed set by the shift lever 50 (set rotational speed),
wherein the control device 360 comprises:
the change rate restriction means 362 for changing the target rotational speed at the predetermined rate β until it reaches the rotational speed set by the shift lever 50; and
the movable swash plate angle control means 361 for controlling the movement of the actuator 73 so as to make the rotational speed of the motor output shaft 25 changed by the HST 20 equal to the target rotational speed.

According to the construction, the acceleration α of the work vehicle 300 is restricted so as to prevent the work vehicle 300 from slipping at the time of acceleration or deceleration. The work vehicle 300 is also prevented from having sudden speed change (shock) at the time of starting or stopping, thereby improving its comfort. Due to the actuator 73 adjusting the movable swash plate 22a, the force for operating the shift lever 50 can be reduced.

Figure 5:
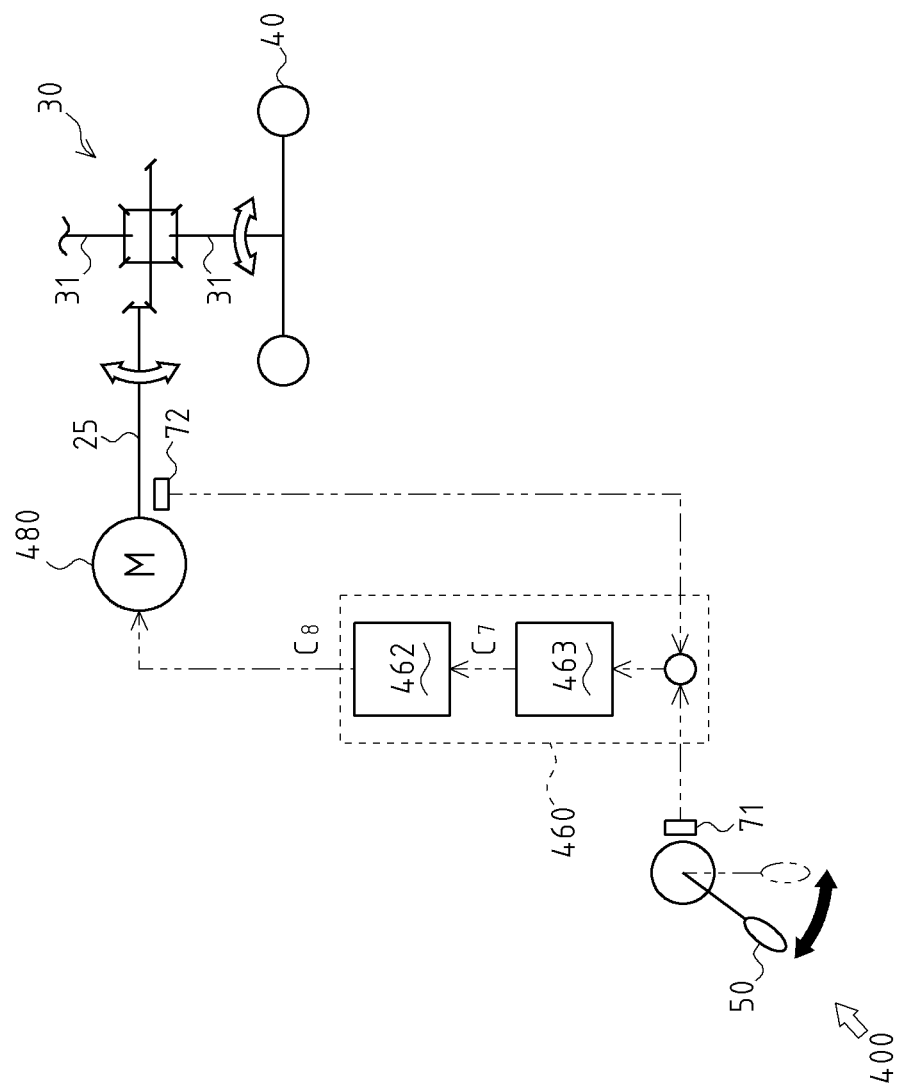
FIG. 5 It is a schematic drawing of a work vehicle according to a fourth embodiment.

Explanation will be given on a work vehicle 400, which is a fourth embodiment of the work vehicle according to the present invention, referring to FIG. 5. Members having substantially the same construction as those of the work vehicle 100 of the first embodiment (see FIG. 1) are designated by the same reference numerals and explanation thereof is omitted.

The work vehicle 400 is driven by rotational power generated by a motor 480.

The different thing of the work vehicle 400 from the work vehicle 100 is that the work vehicle 400 includes a motor 480 and a control device 460, instead of the engine 10, the HST 20, the actuator 73 and the control device 60.

The motor 480 generates rotational power so as to rotate the drive wheels 40. The motor 480 is interlockingly connected to one of ends of the motor output shaft 25.

The control device 460 controls the rotational speed of the motor 480. The control device 460 is connected mainly to the lever rotation angle detection sensor 71, the output shaft rotational speed sensor 72 and the motor 480.

Explanation will be given on the control of the rotational speed of the motor 480 by the control device 460 of this embodiment.

The control device 460 includes a rotational speed control means 463 and a change rate restriction means 462, which serve as control means controlling the rotational speed of the motor 480.

Based on the inputted signals detected by the lever rotation angle detection sensor 71 and the output shaft rotational speed sensor 72, the rotational speed control means 463 outputs a control signal $C_7$ for moving the motor 480 at the set rotational speed.

Based on the inputted control signal $C_7$, the change rate restriction means 462 outputs a control signal $C_8$ for changing the rotational speed of the motor 480 to the set rotational speed at a predetermined rate β.

In this case, the predetermined rate β is set by the change rate control means 462 so as to make the acceleration α not more than μ·g, that is, so as to prevent the slip. In this embodiment, the friction coefficient μ is previously determined based on experiments and numerical simulations and is stored in the control device 460.

According to the control signal $C_8$, the rotational speed of the motor 480 is changed to the set rotational speed at the predetermined rate β. Accordingly, the rotational speed of the motor output shaft 25 is changed toward the set rotational speed at the predetermined rate β, and in its turn, the rotational speed V of the drive wheels 40 is changed at the predetermined rate β.

As mentioned above, the work vehicle 400 in this embodiment comprises:

the motor 480 generating rotational power so as to rotate the drive wheels 40;

the shift lever (speed setting means) 50 setting the rotational speed of the motor 480; and the control device 460 controlling the rotational speed of the motor 480 so as to change the rotational speed of the motor 480 at the predetermined rate β until it becomes equal to the rotational speed set by the shift lever 50.

According to the construction, the acceleration α of the work vehicle 400 is restricted so as to prevent the work vehicle 400 from slipping at the time of acceleration or deceleration. The work vehicle 400 is also prevented from having sudden speed change (shock) at the time of starting or stopping, thereby improving its comfort. Due to the motor 480, the force for operating the shift lever 50 can be reduced. This construction does not cost for increasing parts because it is easily adaptable to any work vehicle only if it has the motor 480 whose rotational speed is controlled for driving of the work vehicle.

Further, the control device 460 in this embodiment may be connected to the setting device 74 and the tilt sensor 75. In this construction, the change rate restriction means 462 sets a value of the predetermined rate β so as to make the acceleration α not more than $\mu \cdot g \cdot \cos \theta$. The value of the friction coefficient μ is determined based on the detection signal from the setting device 74. The value of the tilt angle θ is determined based on the detection signal from the tilt sensor 75.

Figure 6:
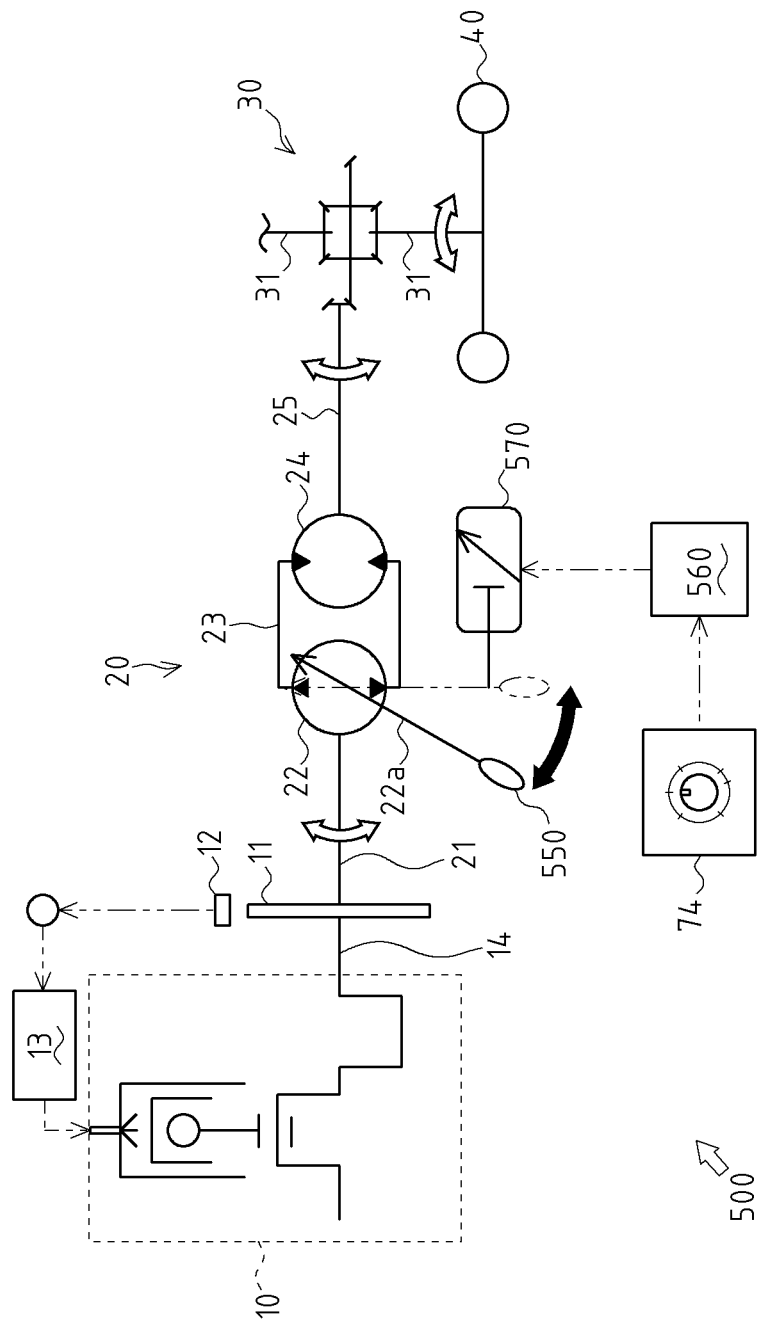
FIG. 6 It is a schematic drawing of a work vehicle according to a fifth embodiment.

Explanation will be given on a work vehicle 500, which is a fifth embodiment of the work vehicle according to the present invention, referring to FIG. 6. Members having substantially the same construction as those of the work vehicle 200 of the second embodiment (see FIG. 3) are designated by the same reference numerals and explanation thereof is omitted.

Similar to the work vehicle 200 of the second embodiment, the work vehicle 500 does not electronically control the movable swash plate 22a.

The different thing of the work vehicle 500 from the work vehicle 200 is that the work vehicle 500 includes a shift lever 550, a control device 560 and a damper having an adjustable damping force (hereinafter, simply referred to as "variable damper") 570, instead of the shift lever 50, the lever rotation angle detection sensor 71, the output shaft rotational speed sensor 72, the actuator 73, the tilt sensor 75 and the control device 260.

In this embodiment, a damping force setting means is constructed by the setting device 74 and the control device 560.

The work vehicle 500 is constructed so that the tilt angle of the movable swash plate 22a is adjusted directly by the shift lever 550.

The shift lever 550 includes the variable damper 570. The variable damper 570 can change the damping force to a desired value or an optional one of preset values. The variable damper 570 is constructed by a damper which changes sectional area of an orifice by an electromagnetic valve, a damper having magnetic fluid as working fluid and having a coil for changing the viscosity of the magnetic fluid, or the like.

By providing the shift lever 550 with the variable damper 570, the movement rate of operation of the shift lever 550 is restricted to a predetermined rate. The rate is determined based on the damping force of the variable damper 570.

The control device 560 adjusts the damping force of the variable damper 570.

The control device 560 is connected to the setting device 74 so as to obtain a detection signal of the change rate β set by the setting device 74.

The control device 560 is connected to the variable damper 570 so as to adjust the damping force of the variable damper 570.

Explanation will be given on the control of the damping force of the variable damper 570 by the control device 560 of this embodiment.

The control device 560 adjusts the damping force of the variable damper 570 based on the detection signal from the setting device 74.

When a road surface is in a condition liable to cause slipping of a vehicle, for example, when the road surface is wet, a small value of the friction coefficient μ is set by the setting device 74. When the small friction coefficient μ is set, the control device 560 increases the damping force of the variable damper 570 to a value corresponding to this friction coefficient μ. The damping force in this case is set so as to make the acceleration α not more than $\mu \cdot g$. Accordingly, the movement rate of operation of the shift lever 550 is restricted, whereby the slip is prevented.

If the road surface is in a condition that hardly causes the slip, a large value of the friction coefficient μ is set by the setting device 74. When the large friction coefficient μ is set, the control device 560 decreases the damping force of the variable damper 570 to a value corresponding to this friction coefficient μ. The damping force in this case is also set so as to make the acceleration α not more than $\mu \cdot g$. Accordingly, the movement rate of operation of the shift lever 550 is restricted, whereby the slip is prevented.

As mentioned above, the work vehicle 500 in this embodiment comprises:

the engine 10 generating a rotational power;

the HST 20 having the hydraulic pump 22 and the hydraulic motor 24, speed-changing the rotational power generated by the engine 10 and transmitting the power to the drive wheels 40;

the shift lever (speed setting means) 550 for changing the tilt angle of the movable swash plate 22a of the hydraulic pump 22 so as to adjust the speed change ratio of the HST 20;

the variable damper (damping-force adjustable damper) 570 for restricting the rate of movement of operation of the shift lever 550 to the predetermined rate β; and the setting device 74 and the control device 560 for adjusting the damping force of the variable damper 570 so as to set the predetermined rate β.

Due to this construction, the acceleration α of the work vehicle 500 is restricted so as to prevent the work vehicle 500 from slipping at the time of acceleration or deceleration. The work vehicle 500 is also prevented from having sudden speed change (shock) at the time of starting or stopping, thereby improving its comfort. The rate of movement of the movable swash plate 22a can be adjusted to a desired value so as to correspond to states of road surfaces or the like. Accordingly, the comfort of the work vehicle 500 can be optimized. Due to the control system constructed as this embodiment, this control for preventing the slip can be easily adaptable to a work vehicle having a speed change device without an electronic control system.

In this embodiment, the damping force of the variable damper 570 is adjusted by the control device 560. However, the present invention is not limited to this construction.

Figure 7:
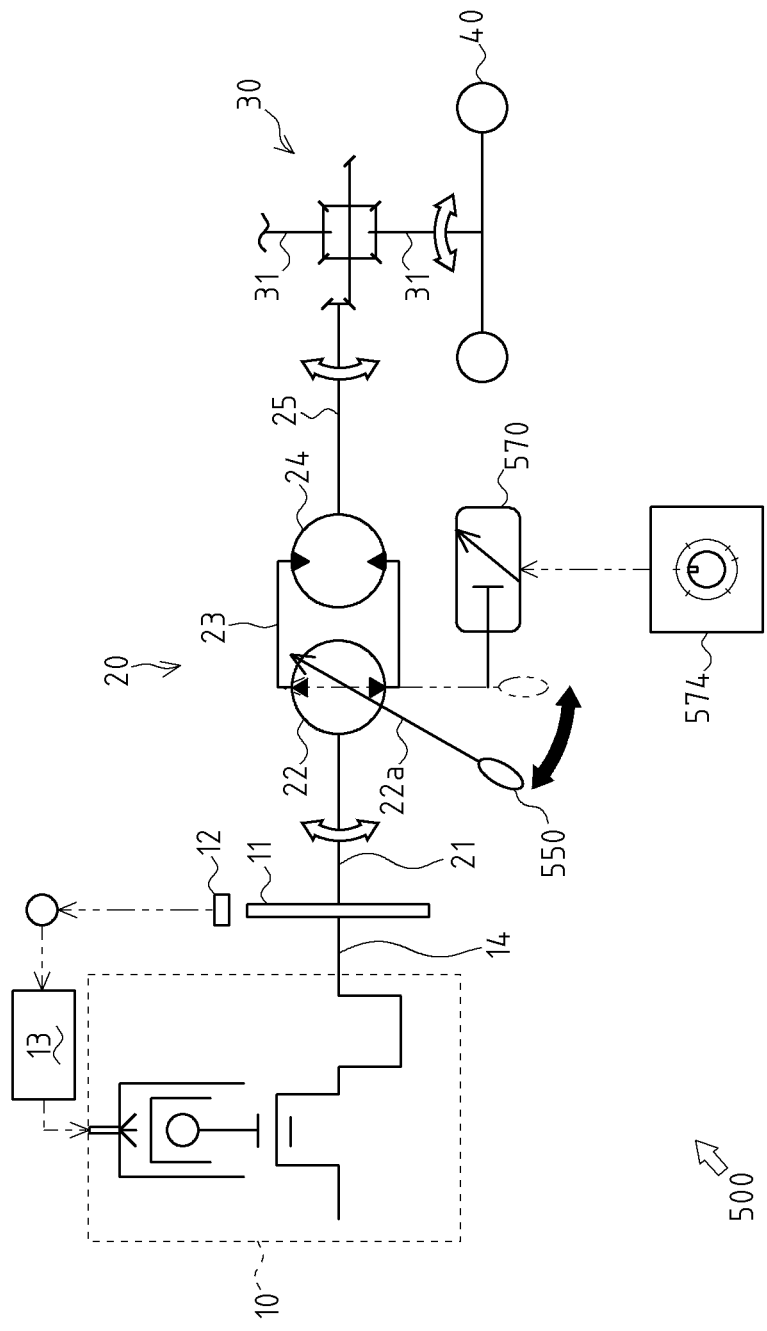
FIG. 7 It is a schematic diagram of the work vehicle.

For example, as shown in FIG. 7, instead of the electronic control with the control device 560, a variable orifice may be provided in the variable damper 570 so as to have its opening mechanically adjusted in correspondence to a value of the friction coefficient μ set by a setting device 574 (damping-force setting means)

Another work vehicle serving as a present invention will be explained.

In environments for works by agricultural machines, unpaved surfaces, such as fields, are the overwhelming majority in comparison with paved surfaces. Especially, at rainy weather or in the case that the surface is flooded, wheels or a crawler is liable to slip. In the case of performing the slip control, it is difficult to detect the actual speed.

On the other hand, there is a widely used and well known transmission with a hydraulic stepless transmission (HST). The HST is advantageous to easily perform stepless speed change and switch of forward/rearward traveling. It is also advantageous that a hydraulic mechanism employed in the HST has a fast torque response speed.

Therefore, a work vehicle is provided to have a transmission with a hydraulic stepless transmission performing the slip control without detecting the actual state of the vehicle.

In a work vehicle that transmits power from a drive source through a hydraulic stepless transmission (HST) to drive wheels, the hydraulic stepless transmission has a hydraulic pump, a hydraulic motor, and a closed hydraulic circuit interposed between the hydraulic pump and motor, and a pressure detection means and an electromagnetic pressure control valve are arranged on a passage of the closed hydraulic circuit. A control means is connected to the pressure detection means, the electromagnetic pressure control valve, and means detecting the rotational speed of the drive wheels, so as to calculate an ideal rotational speed of the drive wheels based on a value detected by the pressure detection means, and to calculate a difference between the ideal rotational speed and the actual rotational speed of the drive wheels detected by the rotational speed detection means. When the actual rotational speed is larger than the ideal rotational speed, the electromagnetic pressure control valve reduces the pressure in the passage of the closed hydraulic circuit.

According to the construction, the hydraulic stepless transmission is controlled so as to prevent the slip, whereby the motor can be miniaturized in comparison to the case where an electric motor is controlled to prevent the slip, while being capable of controlling a larger torque. The pressure of the hydraulic device is controlled so as to enable feedback control with high responsibility.

In a work vehicle that transmits power from a drive source to drive wheels through a hydraulic stepless transmission (HST), the hydraulic stepless transmission has a hydraulic pump, a hydraulic motor and a closed hydraulic circuit interposed between the hydraulic pump and motor, and an angle of a movable swash plate of the hydraulic pump can be changed by a rotation means. The movable swash plate rotation means, a pressure detection means on a passage of the closed hydraulic circuit, a speed setting means, and means detecting the rotational speed of the drive wheels are connected to a control means, which calculates an ideal rotational speed of the drive wheels based on a value detected by the pressure detection means, and calculates a difference between the ideal rotational speed and the actual rotational speed of the drive wheels detected by the rotational speed detection means. When the actual rotational speed is larger than the ideal rotational speed, the electromagnetic pressure control valve reduces the pressure in the passage of the closed hydraulic circuit.

According to the construction, the hydraulic stepless transmission is controlled so as to prevent the slip, whereby the motor can be miniaturized in comparison with the case where an electric motor is controlled to prevent the slip, while being capable of controlling a larger torque. The movable swash plate is rotated for the slip control, whereby the actual rotational speed can be adjusted easily by adjusting a flow rate of hydraulic oil.

Next, explanation will be given on embodiments referring to FIGS. 8 to 12.

Figure 8:
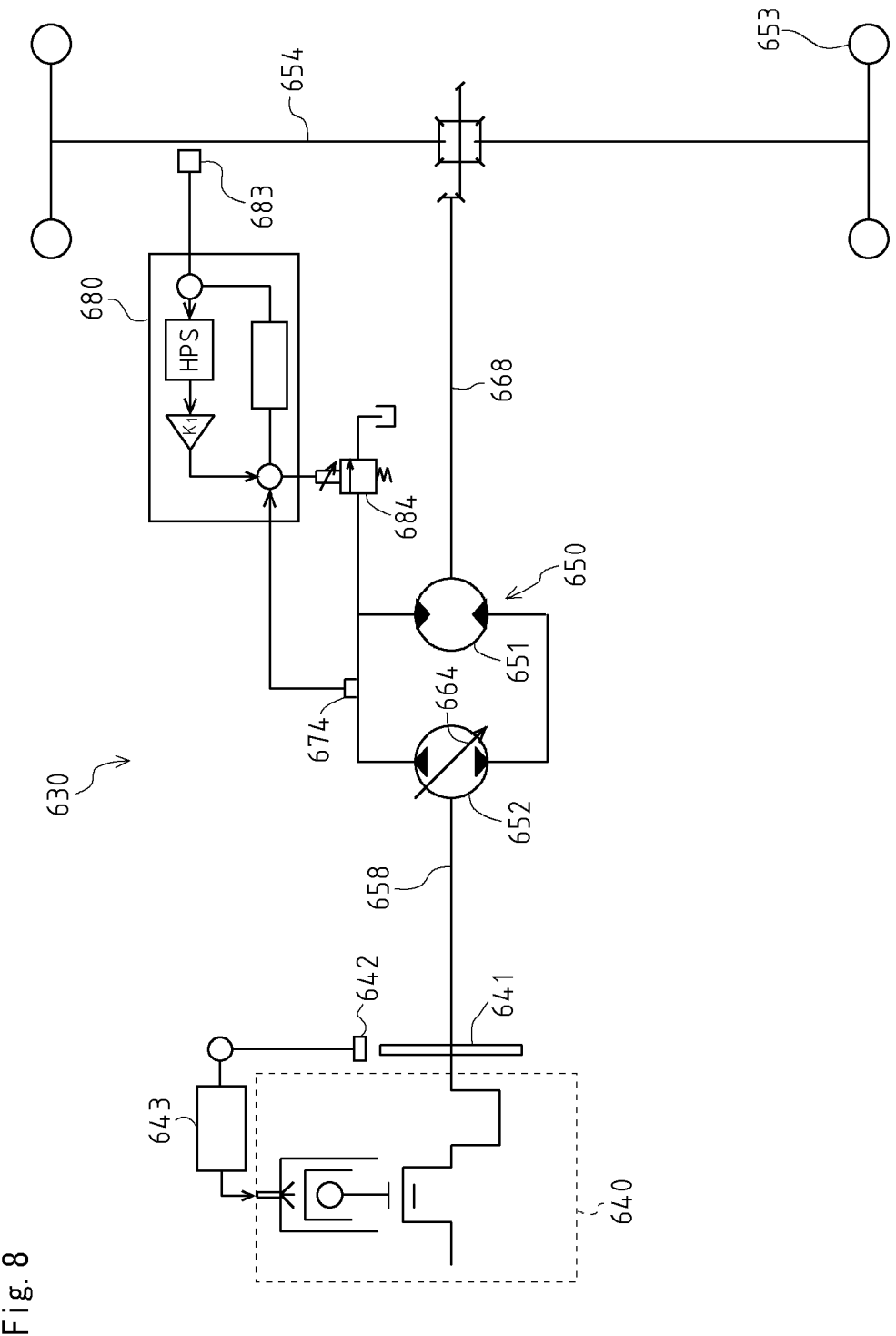
FIG. 8 It is a diagram of a power transmission system of a work vehicle according to an embodiment.

As shown in FIG. 8, a work vehicle 630 has a wheeled traveling device.

The vehicle 630 has an engine 640 as the drive source. A rotational speed sensor 642 is provided in a flywheel 641 of the engine 640 and an engine controller 643 controls rotation of the engine. Power is transmitted from the flywheel 641 to a hydraulic stepless transmission 650.

Figure 9:
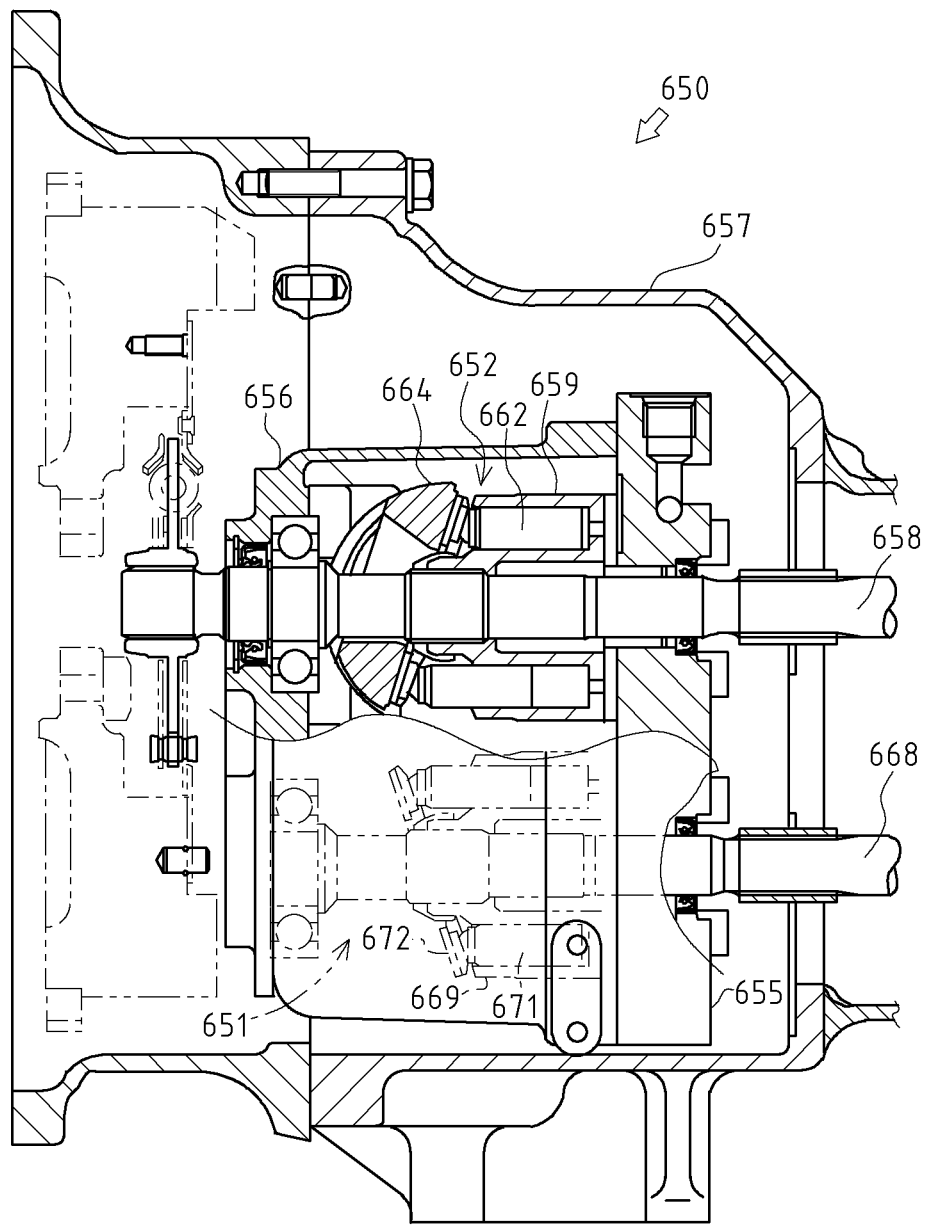
FIG. 9 It is a side view partially in section of an HST.

As shown in FIG. 9, in the hydraulic stepless transmission (HST) 650, a variable displacement hydraulic pump 652 and a fixed displacement hydraulic motor 651 are hydraulically connected to each other through passages as a closed hydraulic circuit provided in a hydraulic passage board 655. The hydraulic motor 651 and the hydraulic pump 652 are provided on a front surface of the flat plate-shaped hydraulic passage board 655 and are covered by a housing 656. The hydraulic passage board 655 is fixed to a front portion of a transmission casing 657 and is bored therein with two parallel oil passages so as to construct a circulating circuit. The circuit hydraulically (fluidly) connects the hydraulic pump 652 to the hydraulic motor 651 so as to serve as the closed circuit.

The hydraulic pump 652 includes a pump shaft 658 rotatably supported in the housing 656, a cylinder block 659 relatively unrotatably engaged with the pump shaft 658, a plurality of pistons 662 fluid-tightly and reciprocally slidably fitted in respective cylinder holes bored in the cylinder block 659, springs biasing the pistons 662 outward, and a movable swash plate 664 contacting tips of the pistons. The movable swash plate 664 of the hydraulic pump 652 is interlocked with a speed change operation means (not shown) provided in an operation part of the vehicle, and the tilt angle thereof is adjusted so as to change the capacity of the hydraulic pump 652, thereby changing the amount and direction of discharged hydraulic oil.

The hydraulic motor 651, which has substantially the same construction as the hydraulic pump 652, includes a motor shaft 668 rotatably supported below the hydraulic pump 652, a cylinder block 669 relatively unrotatably engaged with the motor shaft 668, a plurality of pistons 671 fluid-tightly and reciprocally slidably fitted in respective cylinder holes bored in the cylinder block 669, springs biasing the pistons 662 outward, and a fixed swash plate 672 serving as a cam for converting the reciprocal movement of the pistons 671 into the rotational drive power of the cylinder block 669. The motor shaft 668 for outputting the rotation of the hydraulic motor 651 is rotatably supported by the hydraulic passage board 655 so as to extend longitudinally and parallel to the pump shaft 658, and one of ends of the motor shaft 668 penetrates the hydraulic passage board 655 and projects rearward.

A pinion is fixed to the tip of the motor shaft 668 and engaged with a ring gear of a differential. Two axles 654 are pivotally supported at both sides of the differential, and two drive wheels 653 are fixed to both sides of the axles 654.

According to the construction, the power from the engine 640 is inputted to the pump shaft 658 and the speed change operation means tilts the movable swash plate 664 of the hydraulic pump 652 to an optional angle from the neutral position so that the pistons 662 of the cylinder block 659 move reciprocally by a stroke set by the movable swash plate

664 and discharge hydraulic oil. The discharged hydraulic oil is sent to the hydraulic motor 651 through the closed circuit in the hydraulic passage board 655. The hydraulic oil pushes the pistons 671 of the hydraulic motor 651 so as to rotate the cylinder block 659 and the output of the cylinder block 659 is taken off as the rotational power of the motor shaft 668. A pressure sensor 674 as a pressure detection means of hydraulic oil and an electromagnetic pressure control valve 684 as a pressure control means are arranged on the closed circuit and connected to a control device 680. A rotation sensor 683 is arranged close to the axles 654 of the left and right drive wheels 653.

Figure 10:
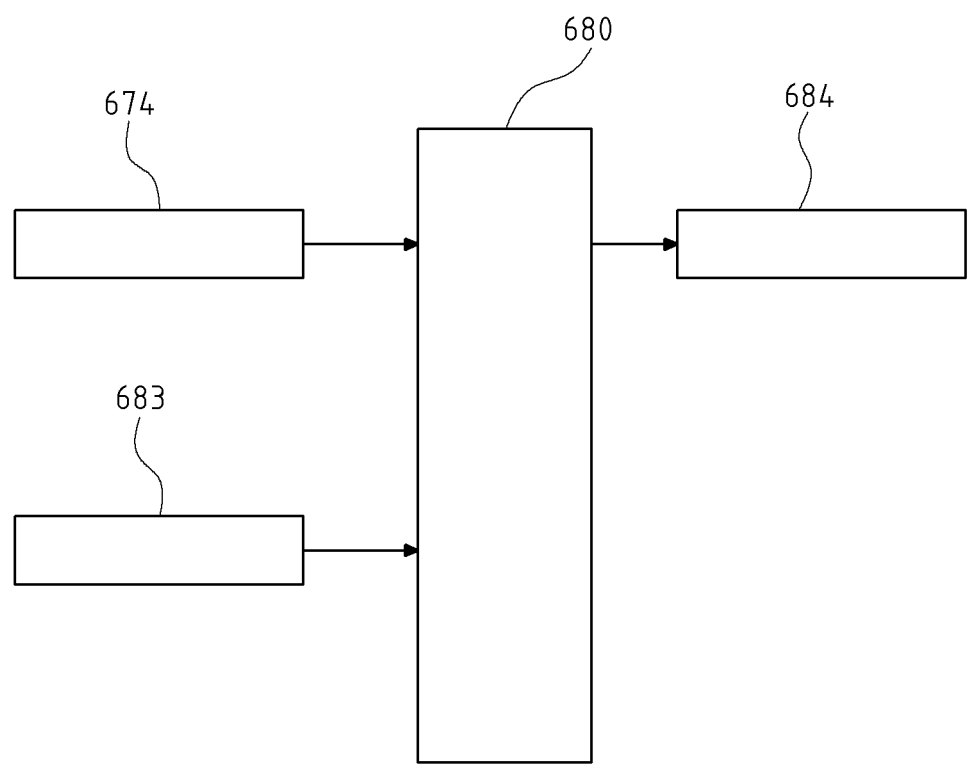
FIG. 10 It is a block diagram of control of the work vehicle.

Next, explanation will be given on the control system of the hydraulic stepless transmission 650. As shown in FIGS. 8 and 10, when the movable swash plate 664 of the hydraulic pump 652 is slantingly moved to an optional angle from the neutral position by the speed change operation means (speed setting means) so as to change the pressure, the pressure of oil sent to the hydraulic motor 651 is detected by the pressure sensor 674 and is inputted to the control device 680, and the control device 680 calculates an ideal rotational speed $Vt_1$ of the drive wheels 653. On the other hand, the rotation sensor 683 arranged close to the axles 654 of the drive wheels 653 detects the actual rotational speed of the drive wheels 653 (actual rotational speed $Vw_1$) and inputs it to the control device 680.

The control device 680 calculates a difference between the ideal rotational speed $Vt_1$ and the actual rotational speed $Vw_1$. Then, a frequency filter (high-pass filter HPS) filters the difference so as to extract only a value of a high frequency band from the difference. The extracted value is multiplied by a control gain $K_1$ so as to obtain a hydraulic pressure correction degree CP. Then, the hydraulic pressure correction degree CP is subtracted from a later-discussed set pressure of the electromagnetic pressure control valve 684 so as to correct the pressure.

The electromagnetic pressure control valve 684 provided on the oil passage bored in the hydraulic passage board 655 is an electromagnetic proportional valve. The control gain $K_1$ outputted by the control device 680 is converted into an electric signal and is inputted to the electromagnetic pressure control valve 684, and the electromagnetic pressure control valve 684 adjusts the hydraulic pressure so as to adjust the output of the hydraulic motor 651. When the drive wheels 653 slip, the difference is generated between the ideal rotational speed $Vt_1$ and the actual rotational speed $Vw_1$. When the difference is larger than the set value, the electromagnetic pressure control valve 684 is actuated so as to reduce the hydraulic pressure supplied to the hydraulic motor 651 in the hydraulic passage board 655 to the predetermined value, whereby deceleration (acceleration) is performed. Accordingly, the rotational speed of the drive wheels 653 is reduced and the ground-gripping power is increased so as to prevent the slip.

If the vehicle still slips after the reduced oil supply amount reaches the predetermined value, the hydraulic pressure is further reduced for the deceleration so as to increase the ground-gripping power for preventing the slip. When the vehicle reaches a road surface which is unlikely to cause the slip, the electromagnetic pressure control valve 684 is stopped and the hydraulic pressure and oil supply amount are returned to the original values so as to make the vehicle travel at a set traveling speed.

Alternatively, when the slip occurs, the movable swash plate 664 may be rotated in the speed-reduction direction so as to prevent the slip.

Figure 11:
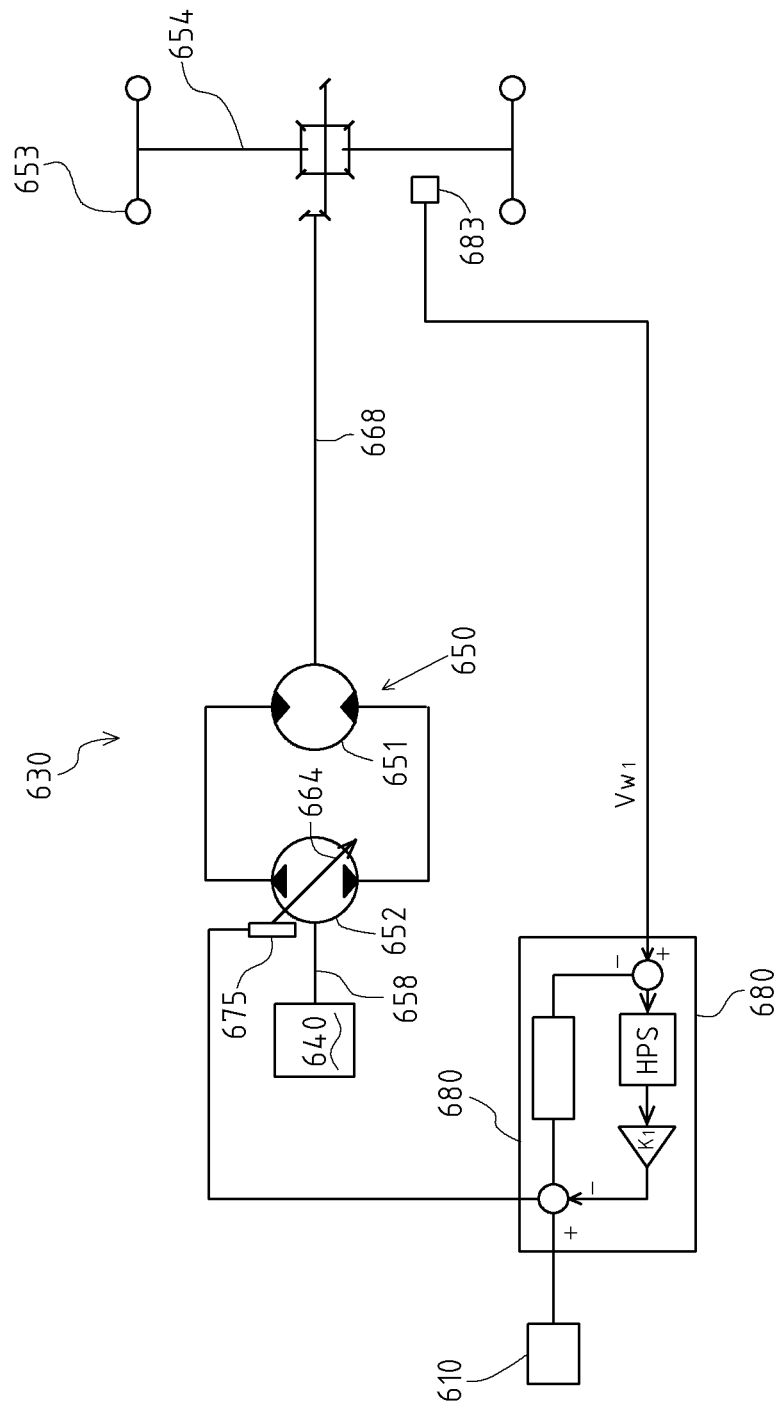
FIG. 11 It is a diagram of a power transmission system of a work vehicle according to another embodiment.
Figure 12:
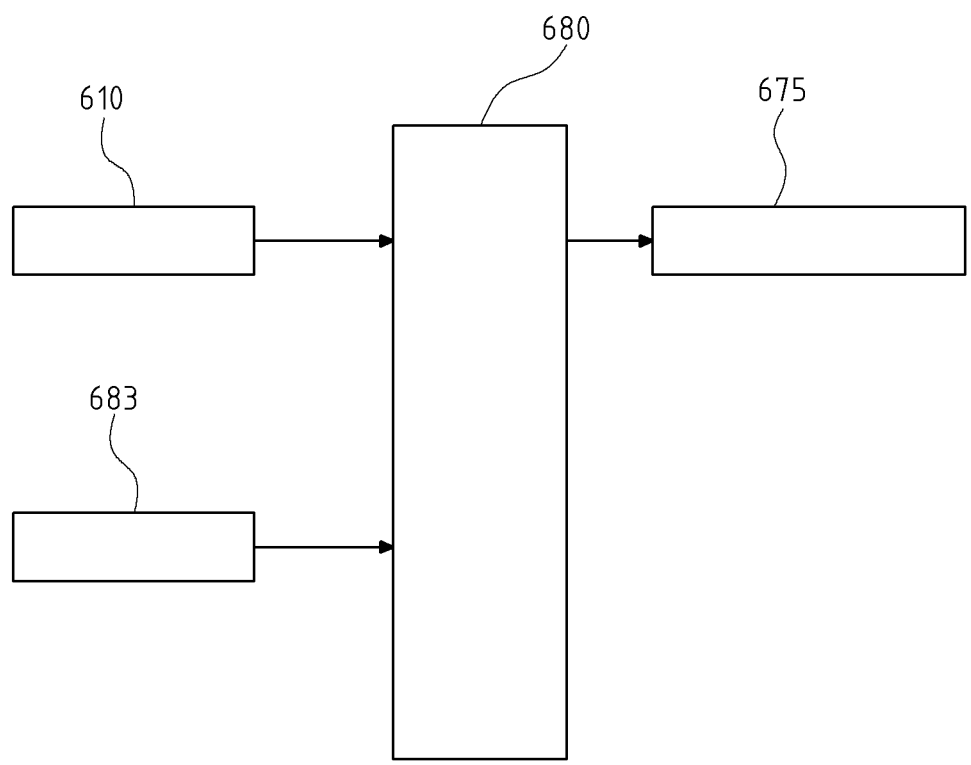
FIG. 12 It is a block diagram of control of the work vehicle.

As shown in FIGS. 11 and 12, the movable swash plate 664 of the hydraulic pump 652 is connected to a movable swash plate rotation means 675 including an actuator, such as a motor or a solenoid, and the movable swash plate rotation means 675 is connected to the control device 680. The control device 680 is connected to a speed setting means 610, such as a shift lever, and to the rotation sensor 683 for detecting the rotation speed of the axles 654.

In this construction, the ideal rotational speed $Vt_1$ is calculated from the set value of the speed setting means 610, and the actual rotational speed $Vw_1$ is calculated from the signal from the rotation sensor 683. Alternatively, instead of detecting the set value of the speed setting means 610, the rotation position of the movable swash plate 664 or the drive position of the movable swash plate rotation means 675 may be detected.

When the drive wheels 653 slip, the difference is generated between the ideal rotational speed $Vt_1$ and the actual rotational speed $Vw_1$. When the difference is larger than the set value, the movable swash plate rotation means 675 mechanically rotates the movable swash plate 664 so as to reduce the hydraulic pressure, whereby the hydraulic motor 651 is decelerated. Accordingly, the rotational speed of the drive wheels 653 is reduced and the ground-gripping power is increased so as to prevent the slip. The speed-reduction by this control can be wider than the speed-reduction by the electromagnetic pressure control valve 684, although it responds slower than that by the electromagnetic pressure control valve 684.

When the vehicle travels on a soft field which likely to cause the slip, the set pressure of the electromagnetic valve is a value for making the rotational speed lower than the rotational speed set by the speed setting means. After the vehicle has passed the soft field, such a speed difference is eliminated so that the vehicle travels at the speed set by the speed setting means.

As mentioned above, in the work vehicle that transmits power from the engine 840 to the drive wheels 653 through the hydraulic stepless transmission (HST) 650, which includes the hydraulic pump 652, the hydraulic motor 651 and the closed hydraulic circuit interposed between the hydraulic pump 652 and the hydraulic motor 651, the pressure sensor 674 and the electromagnetic pressure control valve 684 are arranged on a passage of the closed hydraulic circuit. The control device 680 is connected to the pressure sensor 674, the electromagnetic pressure control valve 684 and the rotation sensors 683 for detecting rotation of the drive wheels 653. The ideal rotational speed of the drive wheels 653 is calculated based on the value detected by the pressure sensor 674. The difference between the ideal rotational speed and the actual rotational speed of the drive wheels detected by the rotation sensors 683. When the actual rotational speed is larger than the ideal rotational speed, the electromagnetic pressure control valve 684 reduces the pressure in the passage of the closed hydraulic circuit. According to the construction, the hydraulic stepless transmission is controlled so as to prevent the vehicle from slipping, whereby the motor can be miniaturized in comparison with the case where an electric motor is controlled to prevent the slip, while being capable of controlling a larger torque. The pressure of the hydraulic device is controlled so as to enable feedback control with high responsibility.

In the work vehicle that transmits power from the engine 840 to the drive wheels 653 through the hydraulic stepless transmission (HST) 650, which includes the hydraulic pump 652, the hydraulic motor 651 and the closed hydraulic circuit interposed between the hydraulic pump 652 and the hydraulic motor 651, the angle of the movable swash plate 664 of the hydraulic pump 652 of the hydraulic stepless transmission 650 can be changed by the movable swash plate rotation means 675. The movable swash plate rotation means 675, the pressure sensor 674 on the passage of the closed hydraulic circuit, the speed setting means 610 and the rotation sensors 683 for detecting rotation of the drive wheels 653 are connected to the control means 680. The ideal rotational speed of the drive wheels 653 is calculated based on the value detected by the pressure sensor 674. The difference between the ideal rotational speed and the actual rotational speed of the drive wheels detected by the rotation sensors 683 is calculated. When the actual rotational speed is larger than the ideal rotational speed, the movable swash plate 664 is rotated so as to reduce the rotational speed of the hydraulic motor. According to the construction, the hydraulic stepless transmission is controlled so as to prevent the vehicle from slipping, whereby the motor can be miniaturized in comparison with the case where an electric motor is controlled to prevent the slip, while being capable of controlling a larger torque. The movable swash plate is rotated so as to perform the slip control, whereby the actual rotational speed can be adjusted easily by adjusting flow rate of hydraulic oil.

Another work vehicle serving as a present invention will be explained.

In environments for works by agricultural machines, unpaved surfaces, such as fields, are the overwhelming majority in comparison with paved surfaces. Especially, at rainy weather or in the case that the surface is flooded, wheels or a crawler is liable to slip. In the case of performing the slip control, it is difficult to detect the actual speed. A crawler does not have non-drive wheels, whereby the actual speed cannot be detected.

Therefore, in consideration of the problems, the invention provides a crawler traveling device adaptable to a traveling vehicle and performs slip prevention control without detecting actual speed.

According to the present invention, a crawler traveling device includes driving wheels, driven wheels, crawler belts wound between the driving wheels and the driven wheels, and an electric motor connected to the driving wheels. The crawler traveling device further includes a drive torque command setting means, a rotational speed detection means for detecting a rotation speed of the driving wheels, a motor drive circuit, and a control means connected to them. A value from the drive torque command setting means serves as a drive torque command value, and is inputted to the motor drive circuit so as to drive the electric motor. An ideal rotational speed of the driving wheels is calculated based on the drive torque command value, whereby a difference between the ideal rotational speed and an actual rotational speed of the driving wheels detected by the rotational speed detection means is calculated. When the actual rotational speed is not less than the ideal rotational speed plus a set value, the drive torque command value of the driving wheels is reduced.

According to the construction, the slip prevention control can be performed without detecting the actual speed. The wheels are driven by the motor so that the control can be performed during turning of the vehicle. The straight traveling ability of normal traveling is also improved.

A crawler traveling device includes driving wheels, driven wheels, crawler belts wound between the driving wheels and the driven wheels, and an electric motor connected to the driving wheels. The crawler traveling device further includes a drive torque command setting means, a rotational speed detection means for detecting a rotation speed of the driving wheels, a motor drive circuit, and a control means connected thereto them. A value from the drive torque command setting means serves as a drive torque command value, and is inputted to the motor drive circuit so as to drive the electric motor. An ideal rotational speed of the driving wheels is calculated based on the drive torque command value, whereby a difference between the ideal rotational speed and an actual rotational speed of the driving wheels detected by the rotational speed detection means is calculated. A frequency filter filters the difference so as to extract a value of a certain frequency band from the difference. The value is multiplied by a predetermined gain so as to obtain a drive torque correction degree. The drive torque command value of the driving wheels is reduced by the drive torque correction degree.

According to the construction, the slip prevention control can be performed without detecting the actual speed. The wheels are driven by the motor so that the control can be performed during turning of the vehicle. The straight traveling ability of normal traveling is also improved.

The rotational speed detection means of the driving wheels and the control means are each provided for each of the driving wheels so as to control the left and right driving wheels independently.

According to the construction, the left and right driving wheels can be driven independently without any differential gear. During turning or straight traveling of the vehicle, the actual rotation speeds of the respective left and right driving wheels are measured so as to accurately perform fraction control.

Next, explanation will be given on embodiments referring to FIGS. 13 to 15.

Figure 13:
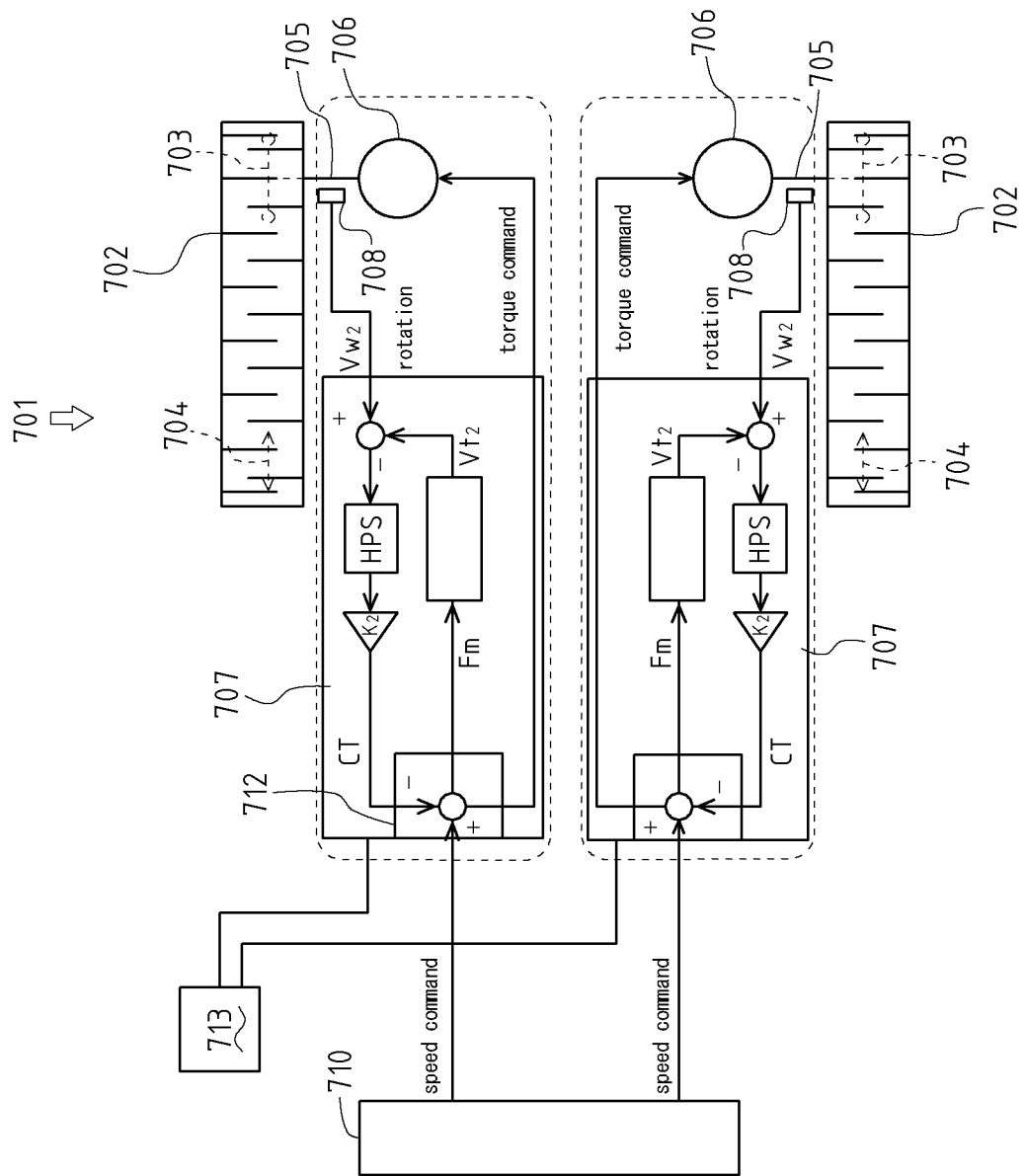
FIG. 13 It is a diagram of a power transmission system of a work vehicle according to an embodiment.
Figure 14:
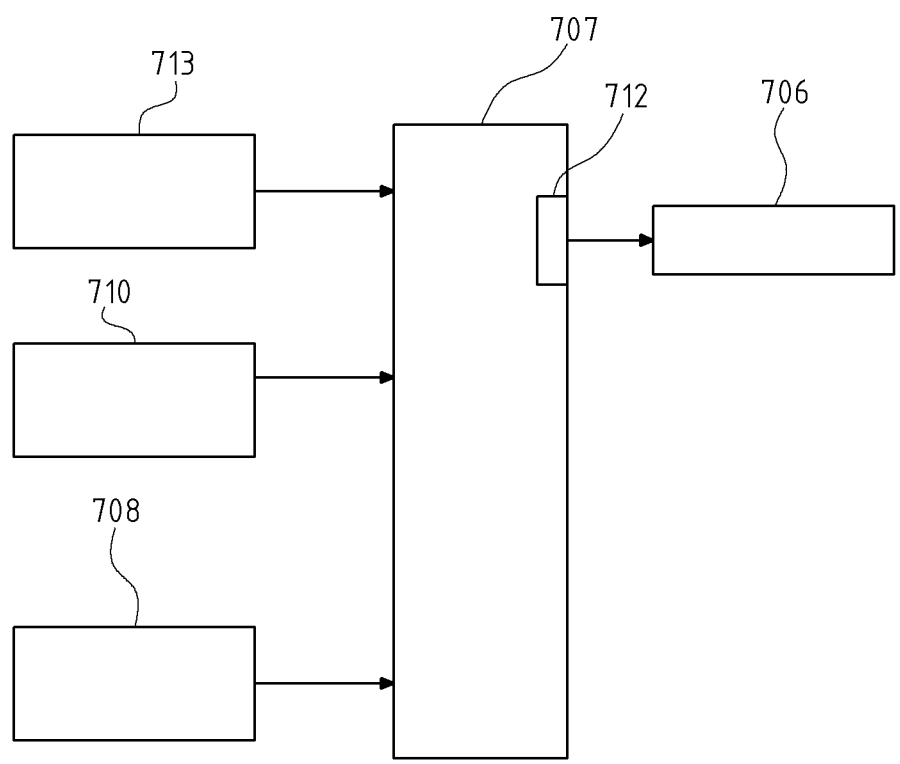
FIG. 14 It is a block diagram of control of the work vehicle.

As shown in FIG. 13, a work vehicle 701 has a crawler traveling device serving as a traveling device. In the crawler traveling device, crawler belts 702 are wound between driving wheels 703 and driven wheels 704. The driving wheels 703 are pivotally supported by drive shafts 705, and the drive shafts 705 are connected to electric motors 706 directly or through a reduction gear or the like. Electric motors 706 are provided for the respective left and right crawler belts 702. By providing the electric motors 706 for the respective left and right driving wheels 703, the drive wheels 703 can be driven independently without any differential gear.

In the crawler traveling device, the crawler belts 702 are wound between the driving wheels 703 and the driven wheels 704, whereby the vehicle speed cannot be detected from the driven wheels 704. Therefore, the traction control is performed based on the rotational speed of the driving wheels 703.

Next, explanation will be given on systems for controlling the electric motors 706 referring to FIGS. 13 and 14. Electric motor control systems are provided for the respective left and right electric motors 706 independently. Since the electric motor control systems are structurally identical to each other, explanation will be given on only the left motor 706. In an operation part (not shown) of a vehicle, an accelerator lever, a shift lever or the like is arranged as the drive torque command setting means (speed setting means) 710, and the drive torque command setting means 710 is connected to a control device 707 so as to enable setting a speed. A drive torque command value Fm inputted by the drive torque command setting means 710 is inputted to the control device 707 and a drive circuit 712 for driving the electric motors 706, so that the control device 707 and the drive circuit 712 serve as control means. The control device 707 calculates each of the rotational speeds of the driven wheels 703 (ideal rotational speeds $Vt_2$) by the following formula with the torque command value Fm.

$$Vt_2 = 1/Js \cdot Fm \qquad (8)$$

In this case, an equivalent moment of inertia J is stored and it is a value for making the output rotational speed corresponding to the inputted torque command value Fm during traveling on a paved surface become the ideal rotational speed $Vt_2$.

On the other hand, a rotational sensor 708 as the rotational speed detection means is provided close to the driven wheel 703 or the drive shaft 705 and is connected to the control device 707. The rotational sensor 708 detects the actual rotational speed of the drive wheel 703 (actual rotational speed $Vw_2$) and inputs it to the control device 707. The control device 707 calculates the difference between the ideal rotational speed $Vt_2$ and the actual rotational speed $Vw_2$. Then, a frequency filter (high-pass filter HPS) filters the difference so as to extract a value of a high frequency band from the difference, and the extracted value is multiplied by a control gain $K_2$ so as to obtain a correction degree. Then, the hydraulic pressure correction degree is subtracted from the torque command value Fm so as to correct the torque command value Fm of the motor. The control gain $K_2$ can be set freely so that it may be a value for optimally efficiently outputting a traction force during work by the vehicle or a value for reducing the effect when the control is unnecessary, as well a value for minimizing the slip. By extracting the correction degree of the high frequency band, there is further no constant difference between the ideal rotational speed and the actual rotational speed, and the difference can be controlled only during a process where the slip occurs.

When the actual rotational speed $Vw_2$ is larger than the ideal rotational speed $Vt_2$, it may occur because the vehicle slips and skids so as to make the actual rotational speed $Vw_2$ larger than the ideal rotational speed $Vt_2$. Therefore, the drive torque is reduced by only the degree corresponding to the difference. Namely, the difference between the ideal rotational speed $Vt_2$ and the actual rotational speed $Vw_2$ is calculated and the frequency filter extracts the high frequency band which is effective to prevent the slip, and the value is multiplied by the control gain $K_2$ so as to obtain the torque correction degree CT. The correction degree is fed back to the electric motor 706 and is subtracted from the torque command value Fm so as to correct it. Accordingly, the drive torque of the electric motor 706 is reduced so that the vehicle can travel at the ideal rotational speed $Vt_2$ while being prevented from slipping.

During turning traveling of the vehicle, the drive torque command setting means 710 set a lower value as the torque command value Fm to the electric motor 706 driving the crawler belt 702 on the turning inside of the vehicle so that the vehicle can turn without any clutch or brake. In this regard, a steering operation means 713, such as a steering wheel or a steering lever, is provided with a means detecting operation thereof, and an operation signal is inputted to the control device 707. During straight traveling of the vehicle, the above-mentioned slip control is performed. When the steering operation is performed, the operation signal is inputted from the steering operation means 713 to the control device 707. To correspond to the turning radius of the vehicle defined by the signal, the rotational speed command value, which is lower than the ideal rotational speed $Vt_2$ at the straight traveling, is outputted to the electric motor 706 driving the crawler belt 702 on the turning inside of the vehicle, and the rotational speed command value, which is higher than the ideal rotational speed $Vt_2$ at the straight traveling, is outputted to the electric motor 706 driving the crawler belt 702 on the turning outside of the vehicle.

Even if the vehicle is going to slip during turning, the slip can be prevented by the torque correction with the model follow-up control. Namely, similarly to the above mentioned, when the actual rotational speed $Vw_2$ is larger than the ideal rotational speed $Vt_2$, the drive torque is reduced to a value corresponding to the difference. Namely, the difference between the ideal rotational speed $Vt_2$ and the actual rotational speed $Vw_2$ is calculated and the frequency filter extracts a value of the high frequency band which is effective to prevent the slip, and the value is multiplied by the control gain $K_2$ so as to obtain the torque correction degree CT. The correction degree is fed back to the electric motor 706 and is subtracted from the torque command value Fm so as to correct it. Accordingly, the drive torque of the electric motor 706 is reduced so that the vehicle can travel at the ideal rotational speed $Vt_2$, while being prevented from slipping.

The frequency filter is not limited to the high-pass filter employed in this embodiment, and a bandpass filter or the like may alternatively be employed.

The control systems of the left and right crawler belts 702 are independent of each other so that the control systems enables the vehicle to travel at the ideal rotational speed even if a difference exists between the left and right slip rates. Namely, when the vehicle travels straight on a ground surface on which only one of the crawlers is liable to slip, and the one of the crawlers is really going to slip, the rotational speeds of the respective electric motors 706 are reduced to the same values so as to keep the straight traveling, whereby the vehicle can travel as if traveling on the normal surface. Both wheels are rotated at the ideal rotational speed $Vt_2$ so that the straight traveling ability which is the problem of the traveling with the crawler belts 702 is improved.

Next, explanation will be given on the embodiment employing variable displacement hydraulic motors 714 instead of the electric motors 706.

Figure 15:
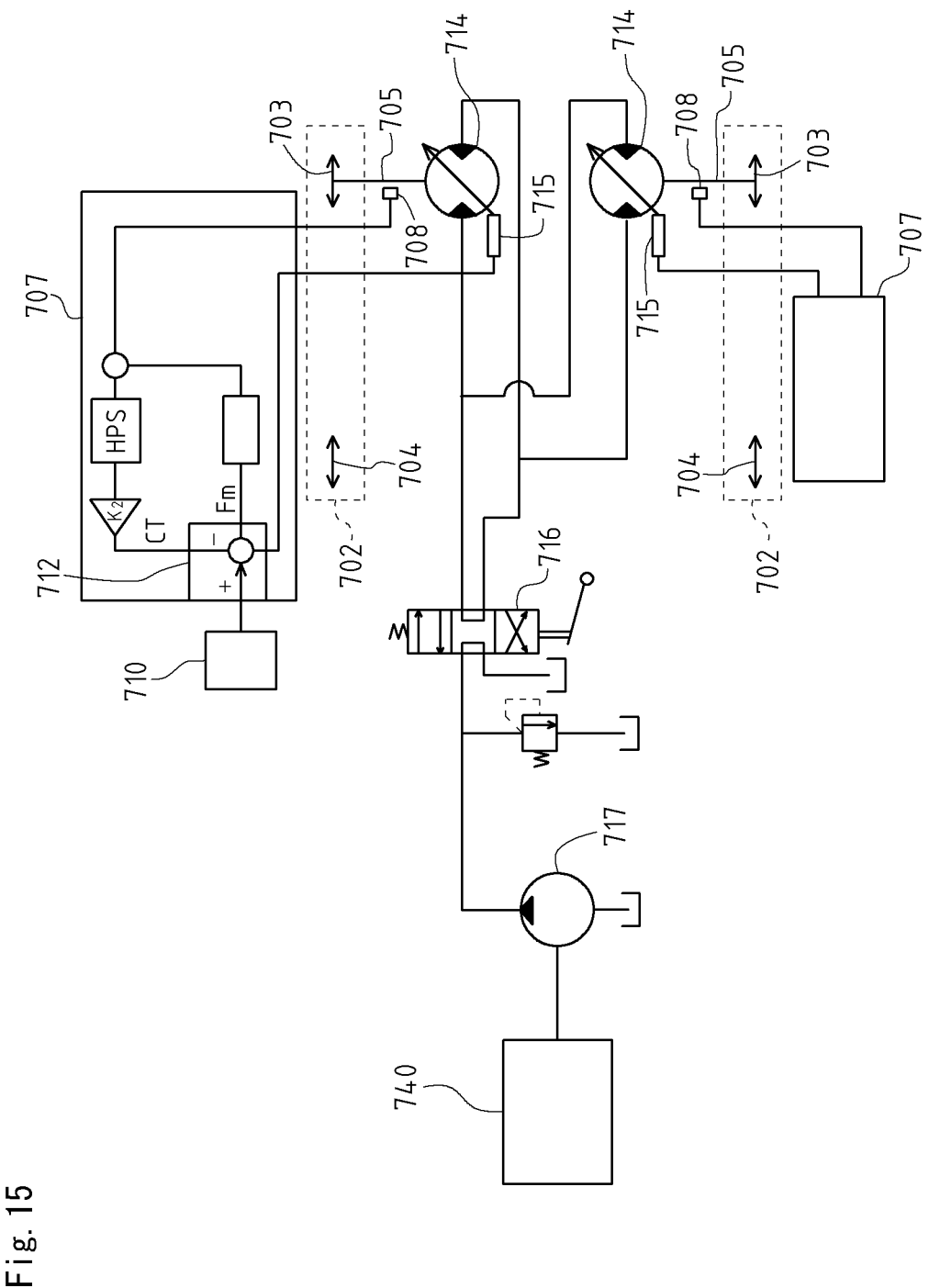
FIG. 15 It is a diagram of a power transmission system of a work vehicle according to an embodiment.

As shown in FIG. 15, the drive shafts 705 serve as output shafts of the variable displacement hydraulic motors 706, and are fixedly provided thereon with the respective driving wheels 703. The crawler belts 702 are wound between the driving wheels 703 and the driven wheels 704. Rotational speed sensors or the like serve as the rotational speed sensors 708 which detect the rotational speeds of the drive shafts 705 and input the detected speeds to the control device 707. The construction of the control device 707 is similar to the above mentioned.

Discharge oil passages and suction oil passages of the variable displacement hydraulic motors 714 are connected through a switch valve 716 to a hydraulic pump 717, and the hydraulic pump 717 is driven by an engine 740. The switch valve 716 is switched by an operation means so as to switch forward/rearward traveling.

A movable swash plate 718 of each of the variable displacement hydraulic motors 714 is connected to an actuator 715, such as a motor or a solenoid, and the tilt angle of the movable swash plate 718 is changed by the actuation of the actuator 715 so as to change the rotational speed of the output shaft. The actuator 715 is connected to the control device 707. Similarly to the above mentioned, the control device 707 is connected to the drive torque command setting means 710 and the steering operation means 713 so as to set the traveling speed, and the movable swash plate 718 is rotated so as to correspond to the traveling speed.

When the vehicle is going to slip during straight traveling or turning, the control similar to the above-mentioned is performed. In this regard, when a change degree as the difference between each of the actual rotational speeds $Vw_2$ obtained by the rotational speed sensors 708 and the ideal rotational speed $Vt_2$ obtained by the drive torque command setting means 710 and the steering operation means 713 is larger than the set value, the drive torque is reduced to a value corresponding to the difference. Namely, the difference between the ideal rotational speed $Vt_2$ and the actual rotational speed $Vw_2$ is calculated and the frequency filter extracts a value of the high frequency band which is effective to prevent the slip, and the extracted value is multiplied by the control gain $K_2$ so as to obtain the torque correction degree CT. The correction degree is fed back to the actuator 715 and is subtracted from the hydraulic pressure so as to correct it. Accordingly, the vehicle travels at the ideal rotational speed $Vt_2$ so as to be prevented from slipping. Incidentally, a differential load or temperature may cause a difference of oil supply amount between the left and right sides. Therefore, the actuators 715 are controlled so as to make the left and right output rotations equal to each other during the straight traveling based on the signals from the rotational speed sensors 708. The control for realizing the ideal rotational speed is also performed during turning of the vehicle.

As mentioned above, in the crawler traveling device according to the invention, the crawler belts 702 are wound between the driving wheels 703 and the driven wheels 704, and the electric motors 706 are connected to the driving wheels 703. The crawler traveling device further includes the drive torque command setting means 710, the rotation sensors 708 for detecting rotation speeds of the driving wheels 703, the drive circuit 712, and the control device 707 connected to them. The value from the drive torque command setting means 710 serves as a drive torque command value and is inputted to the drive circuit 712 so as to drive the electric motors 706. The ideal rotational speeds of the driving wheels 703 are calculated based on the drive torque command value. The difference between the ideal rotational speed and each of actual rotational speeds of the driving wheels 703 detected by the rotation sensors 708. When the actual rotational speed is larger than the ideal rotational speed plus a set value, the drive torque command values of the driving wheels 703 are reduced. According to the construction, the slip prevention control can be performed without detecting the actual vehicle speed. The wheels are driven by the motors so that the control can also be performed during turning of the vehicle. The straight traveling ability during normal traveling is also improved.

In the crawler traveling device, the crawler belts 702 are wound between the driving wheels 703 and the driven wheels 704, and the electric motors 706 are connected to the driving wheels 703. The crawler traveling device further includes the drive torque command setting means 710, the rotation sensors 708 for detecting rotational speeds of the driving wheels 703, the drive circuit 712, and the control device 707 connected thereto are provided. The value from the drive torque command setting means 710 serves as a drive torque command value and is inputted to the drive circuit 712 so as to drive the electric motors 706. The ideal rotational speed of the driving wheels 703 is calculated based on the drive torque command value. The difference is calculated between the ideal rotational speed and each of actual rotational speeds of the driving wheels 703 detected by the rotation sensors 708. The filter filters the difference so as to extract a value of the certain frequency band from the difference. The extracted value is multiplied by the predetermined gain so as to obtain the drive torque correction degree CT. The drive torque command values of the driving wheels 703 are reduced by the drive torque correction degrees. According to the construction, the slip prevention control can be performed without detecting the actual vehicle speed. The wheels are driven by the motors so that the control can also be performed during turning of the vehicle. The straight traveling ability during normal traveling is also improved.

The rotation sensors 708 and the control devices 707 are provided for the respective driving wheels 703 so as to control the left and right driving wheels 703 independently. According to the construction, the left and right driving wheels 703 can be driven independently without any differential gear. During turning or straight traveling of the vehicle, the actual rotation speeds of the left and right driving wheels 703 are measured so as to accurately control the traction of the vehicle.

Another work vehicle serving as a present invention will be explained.

If the slip is suppressed by shifting down the transmission to a lower speed stage, especially if the transmission is a multi-step transmission such as a manual transmission, sudden speed change may cause shock during this shift of the transmission. Furthermore, since the transmission is shifted to the lower speed state so as to correspond to the slipping wheel, all wheels are slowed. Namely, not only the slipping wheel but also the other wheels are slowed so that the traveling speed of the work vehicle is reduced. This speed reduction causes rough surfaces of a field during a work for leveling the field surface, for example.

If the slip is suppressed by automatically raising a set height of a working machine, the change of height may cause deterioration of work accuracy such as instability of plowing depth.

Therefore, the invention provides a work vehicle performing a smooth slip control without excessive decrease of drive power regardless of what kind of a transmission the vehicle has.

A work vehicle includes a transmission for speed-changing power from a prime mover and a distribution part for distributing the power speed-changed by the transmission between left and right sides of the vehicle. The distributed powers are transmitted through left and right reduction devices and drive axles to left and right drive wheels. The work vehicle further includes planetary gear mechanisms serving as the respective reduction devices, first brake means for braking ring gears of the respective planetary gear mechanisms, slip detection means detecting slip of the respective drive wheels, and a control means connected to the first brake means and the slip detection means. When the control means judges that the slip occurs at either one of the drive wheels, the control means operates the first brake means on the side of the slipping drive wheel.

According to the construction, the slip control is performed for only the slipping wheel. The smooth slip control can be performed regardless of what kind of the transmission the vehicle has. Furthermore, the reduction devices can be compact because they are planetary gear mechanisms.

A second brake means is provided at the upstream of the distribution part so as to brake the power from the prime mover.

According to the construction, the work vehicle can be braked with a small braking torque.

The transmission is constituted by a hydraulic stepless transmission including a hydraulic pump, a hydraulic motor and a closed hydraulic circuit interposed between the hydraulic pump and motor. The slip detection means is constituted by a pressure detection means, which detects pressure in a passage of the closed hydraulic circuit, and a rotational speed detection means, which detects a rotational speed of the drive wheel.

According to the construction, the slip of the work vehicle can be detected by comparing the ideal rotational speed with the actual rotational speed.

Next, explanation will be given on embodiments referring to FIGS. 16 to 21.

Firstly, explanation will be given on outlines of construction of a work vehicle 801 and of a power transmission system thereof referring to FIG. 16. In the drawing, a direction of an arrow $A_1$ is regarded as the right direction of the vehicle.

Power of an engine 802 serving as the prime mover is transmitted to a differential 805 through a clutch and a hydraulic stepless transmission (hereinafter, simply referred to as "HST") 804 provided in a transmission casing. The differential 805 is the distribution part distributing the power. The power transmitted to the differential 805 is transmitted to planetary gear mechanisms 807 through respective left and right sun gear shafts 806. Each of the planetary gear mechanisms 807 is the reduction device. The vehicle is provided on each of the left and right sides thereof with a common construction including the sun gear shaft 806, the planetary gear mechanism 807, a drive axle 808 and a drive wheel 809.

The power reduced in the planetary gear mechanism 807 is transmitted through the drive axle 808 to the drive wheel 809 which is a traveling wheel. The drive axle 808 supports the drive wheel 809. A brake device 810 is provided at each of the left and right sides of the differential 805 so as to brake the power distributed by the differential 805.

In this embodiment, the drive wheel 809 is the traveling wheel. However, the invention is not limited thereto, and the drive wheel 809 may alternatively be a driving wheel of a crawler traveling device including a crawler belt wound between a driving wheel and a driven wheel. In this embodiment, one drive wheel is provided at each of the left and right sides of the work vehicle 801. However, the invention is not limited thereto, and the work vehicle 801 may alternatively be a four-wheel drive work vehicle in which all front and rear wheels are drive wheels. For example, a four-wheel drive work vehicle is suggested to transmit power extracted from the HST 804 to a front portion thereof and to then transmit it through a differential to left and right front wheels, thereby driving the front wheels. In this case, planetary gear mechanisms serving as the reduction devices are provided for the respective left and right front wheels.

The HST mainly includes a variable displacement hydraulic pump 820, a fixed displacement hydraulic motor 821 and a movable swash plate 822.

The variable displacement hydraulic pump 820 and the fixed displacement hydraulic motor 821 are fluidly connected to each other through a closed hydraulic circuit 823.

The hydraulic pump 820 is provided with the movable swash plate 822 which is interlocked with a speed change operation means (not shown) provided in an operation part of the vehicle. By operating the speed change operation means, the tilt angle of the movable swash plate 822 can be adjusted. By the operation, the displacement of the hydraulic pump 820 is changed so as to change the discharge amount and discharge direction of the hydraulic oil.

According to the above-mentioned construction, the power from the engine 802 is inputted to the hydraulic pump 820 and the speed change operation means slantingly moves the movable swash plate 822 of the hydraulic pump 820 to an optional angle from the neutral position, whereby the hydraulic pump 820 discharges the hydraulic oil. The hydraulic oil discharged from the hydraulic pump 820 is pressurized and sent through the closed hydraulic circuit 823 to the hydraulic motor 821 so as to rotate hydraulic motor 821, whereby the power is transmitted to the downstream of the HST.

Figure 17:
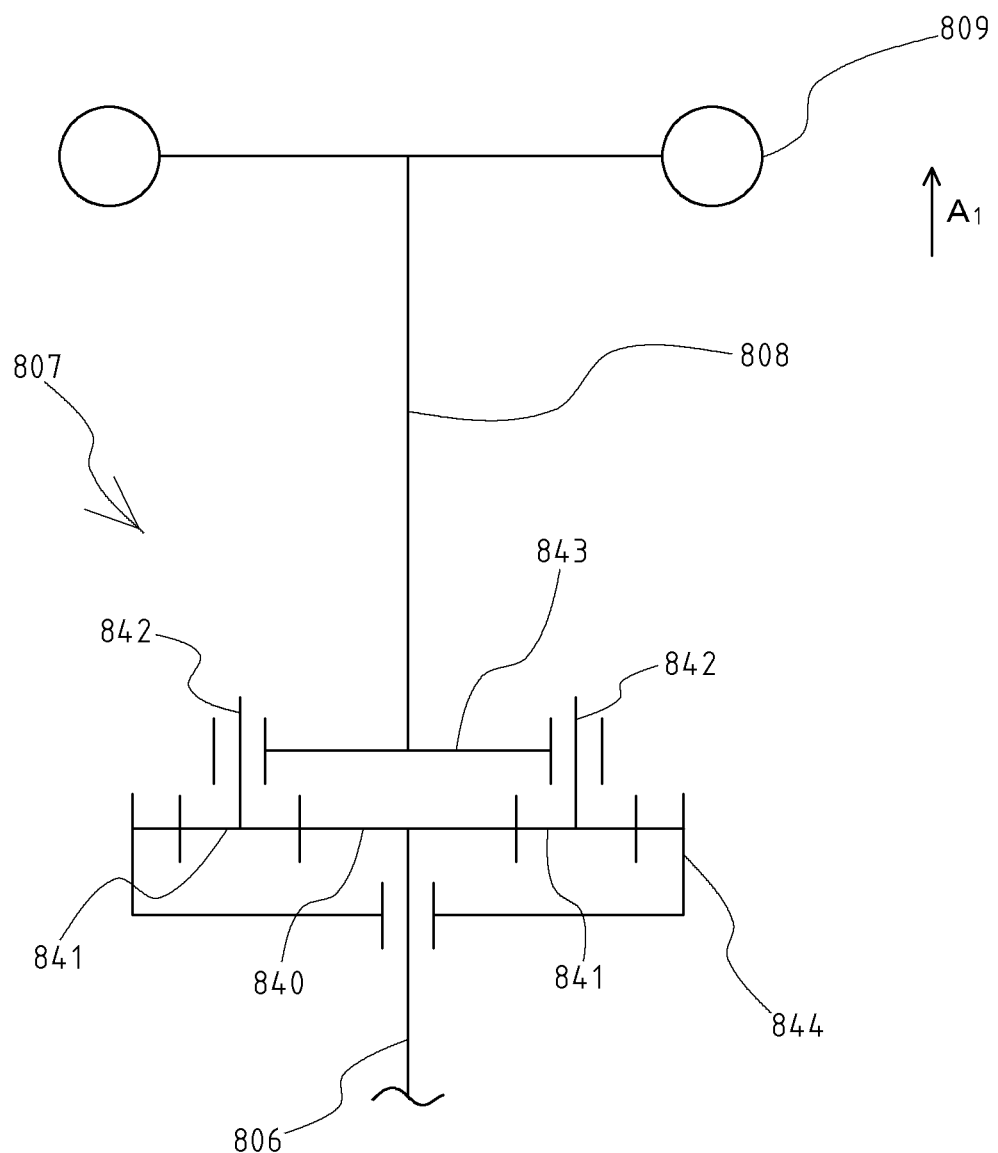
FIG. 17 It is an enlarged diagram of the power transmission system in a planetary gear mechanism of the work vehicle.
Figure 18:
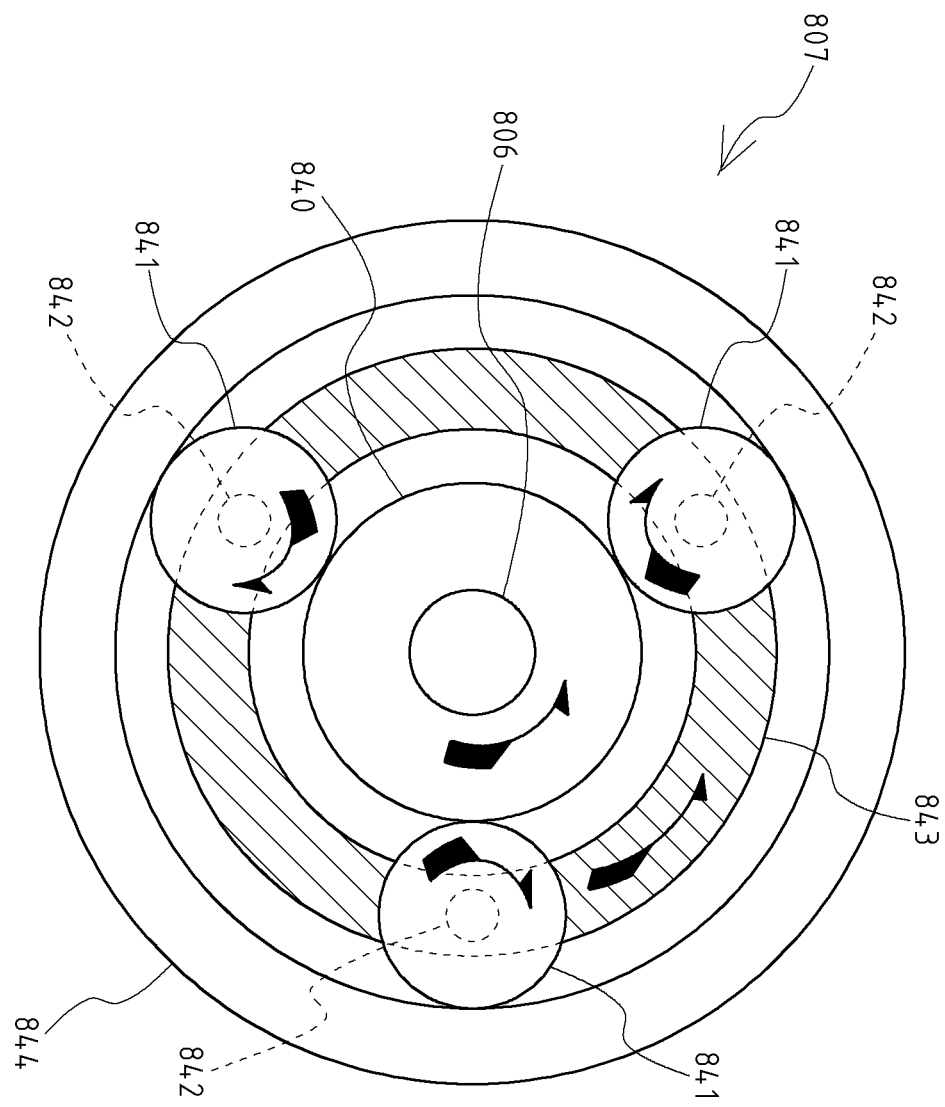
FIG. 18 It is a schematic side view of the planetary gear mechanism of the work vehicle.

Explanation will be given on the construction of the planetary gear mechanism 807 referring to FIGS. 17 and 18. The planetary gear mechanism 807 mainly includes a sun gear 840, three planetary gears 841, a carrier 843 and a ring gear 844. In this embodiment, the planetary gear mechanism 807 has the three planetary gears 841. However, the number of planetary gears in the invention is not limited thereto.

The sun gear shaft 806 is provided at the center of the sun gear 840. The sun gear 840 meshes on the outer periphery thereof with planetary gears 841. The planetary gears 841 also mesh with inner peripheral teeth of the ring gear 844. One of ends of a planetary gear shaft 842 is provided at the center of each of the planetary gears 841. The other end of the planetary gear shaft 842 is supported by the carrier 843. The drive axle 808 is provided at the center of the carrier 843. The ring gear 844 is fixed so as not to be rotatable.

Explanation will be given on the planetary gear mechanism 807 constructed as mentioned above. The power inputted from the sun gear shaft 806 is transmitted through the sun gear 840 to the planetary gears 841. The planetary gears 841 revolve along the outer periphery of the sun gear 840 while they rotate centered on their own axes. The revolutional movement of the planetary gears 841 is transmitted through the planetary gear shafts 842 to the carrier 843 so that the carrier 843 is rotated, that is, the drive axle 808 and the drive wheel 809 are rotated.

The above-mentioned planetary gear mechanism 807 serving as the reduction device performs speed-reduction of the power inputted from the sun gear shaft 806, and then outputs the power from the drive axle 808.

Next, explanation will be given on an embodiment regarding a slip control of the invention shown in FIG. 19.

A rotation sensor 851 is provided at an intermediate portion of each of the left and right drive axles 808. The rotation sensor 851 is the rotational speed detection means detecting the rotational speed of the drive axle 808, that is, the rotational speed of the drive wheel 809. The rotation sensors 851 are connected to a controller 850 serving as the control means. The rotation sensors 851 constantly detect the respective rotational speeds of the drive axles 808 and transmit detection signals $RR_1$ and $RL_1$ as measures of the detected rotational speeds to the controller 850.

A pressure sensor 852 is provided at an intermediate portion of a passage of the closed hydraulic circuit 823. The pressure sensor 852 is the pressure detection means detecting the pressure in the closed hydraulic circuit 823. The pressure sensor 852 is connected to the controller 850. The pressure sensor 852 constantly detects the pressure in the closed hydraulic circuit 823 and transmits detection signals $P_1$ as a measure of the detected pressure to the controller 850.

The occurrence of slip is detected based on the rotational speed detected by the rotation sensors 851 and the pressure detected by the pressure sensor 852. Namely, the rotation sensors 851 and the pressure sensor 852 are the slip detection means detecting whether the work vehicle 801 slips or not.

Figure 19:
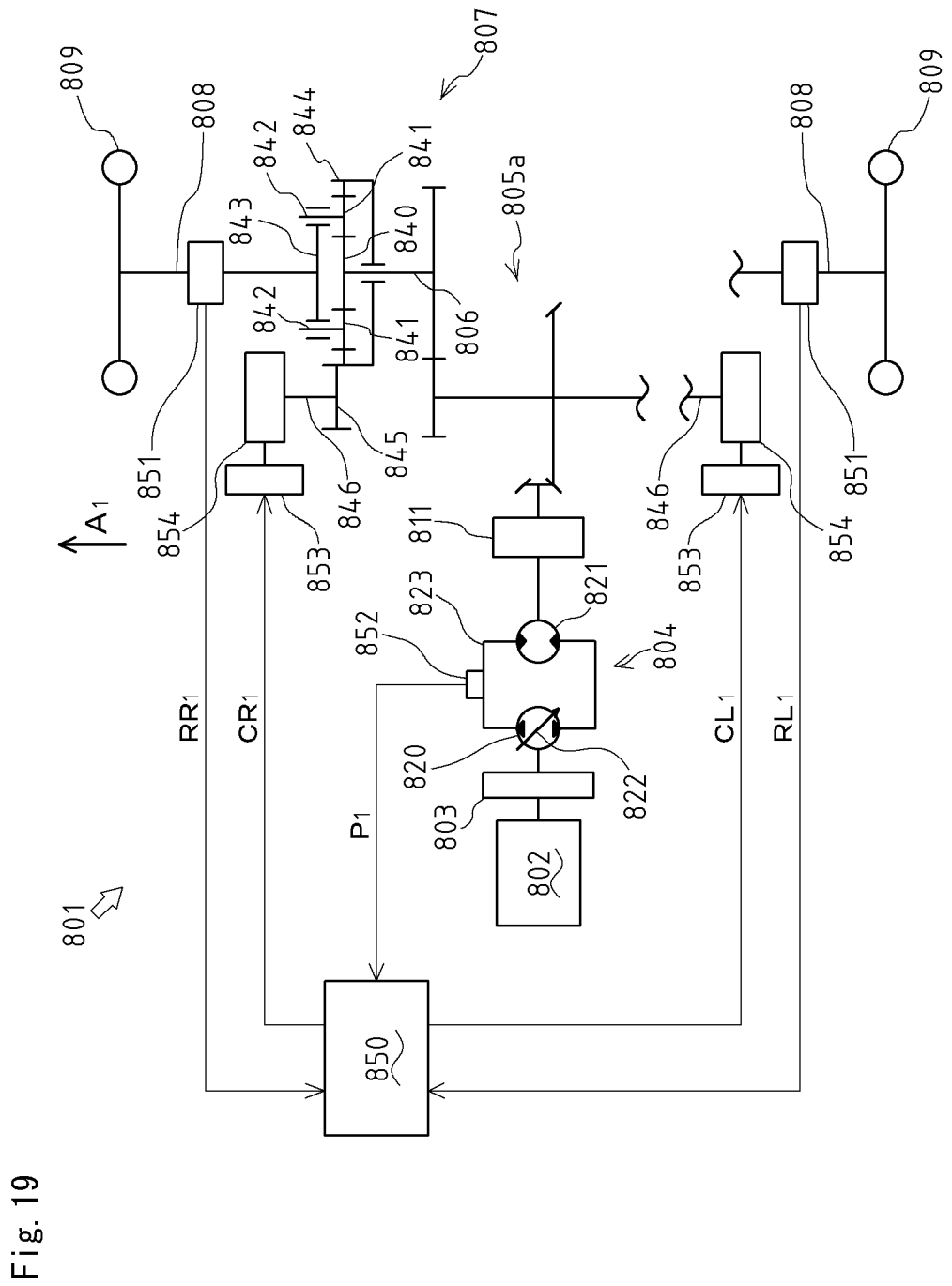
FIG. 19 It is a schematic diagram of a slip control system of the work vehicle according to an embodiment.
Figure 20:
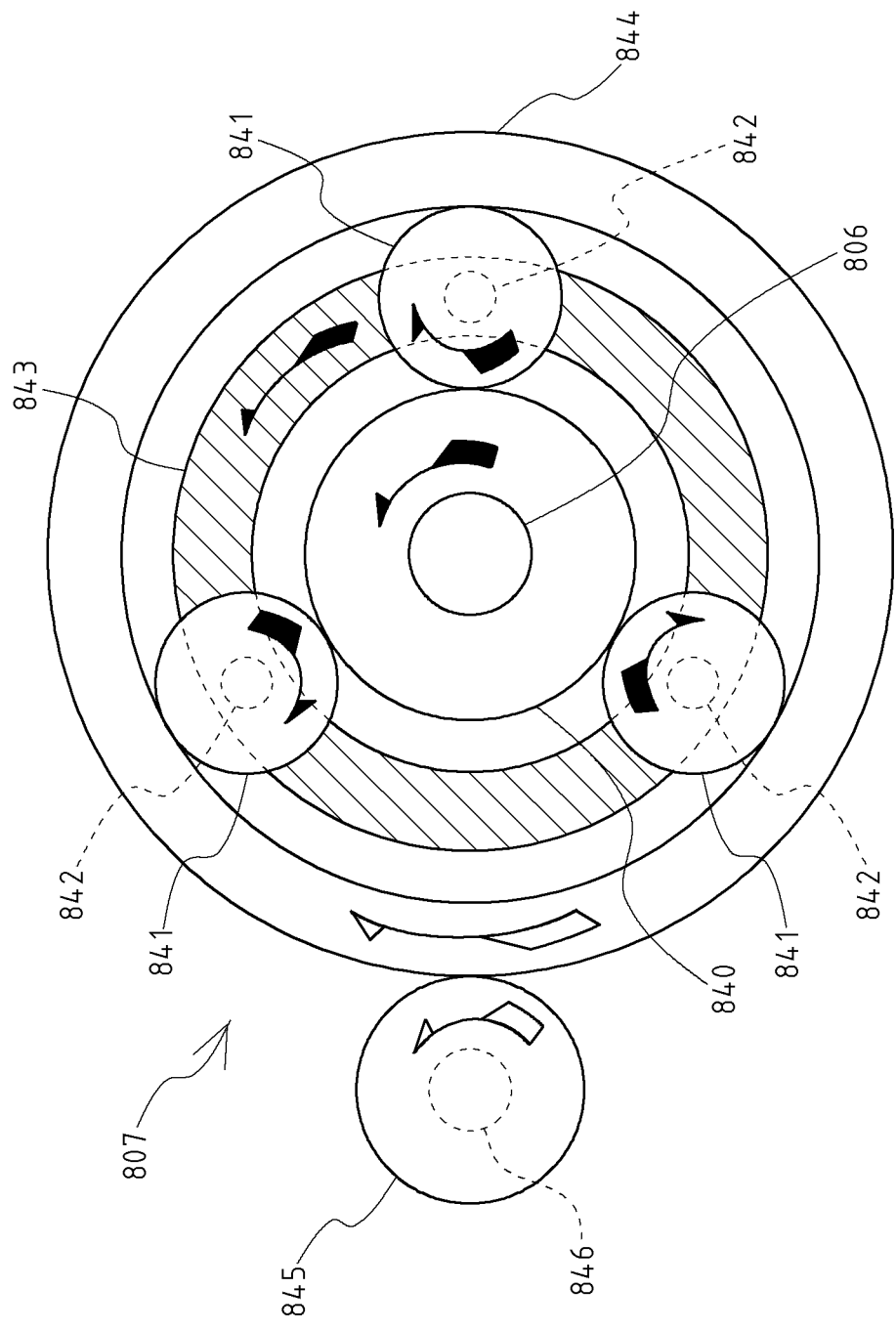
FIG. 20 It is a schematic side view of a planetary gear mechanism of the work vehicle.

As shown in FIGS. 19 and 20, the ring gear 844 meshes on the outer periphery thereof with a brake gear 845. One of ends of a brake gear shaft 846 is provided at the center of the brake gear 845. A brake means 854 is provided at the other end of the brake gear shaft 846. The brake means 854 brakes the rotation of the ring gear 844 via the brake gear 845 and the brake gear shaft 846. The brake means 854 is connected to an actuator 853. These actuator 853 and brake means 854 serve as the first brake means for braking the ring gear 844. The actuator 853 is connected to the controller 850. The left and right actuators 853 operate the respective brake means 854 based on respective control signals $CR_1$ and $CL_1$ from the controller 850. For example, the brake means (the first brake means and the second brake means) are disc brakes, drum brakes, multi-plate brakes or the like, and the actuators 853 are hydraulic cylinders, motors or the like, and these should not be limitative.

Figure 16:
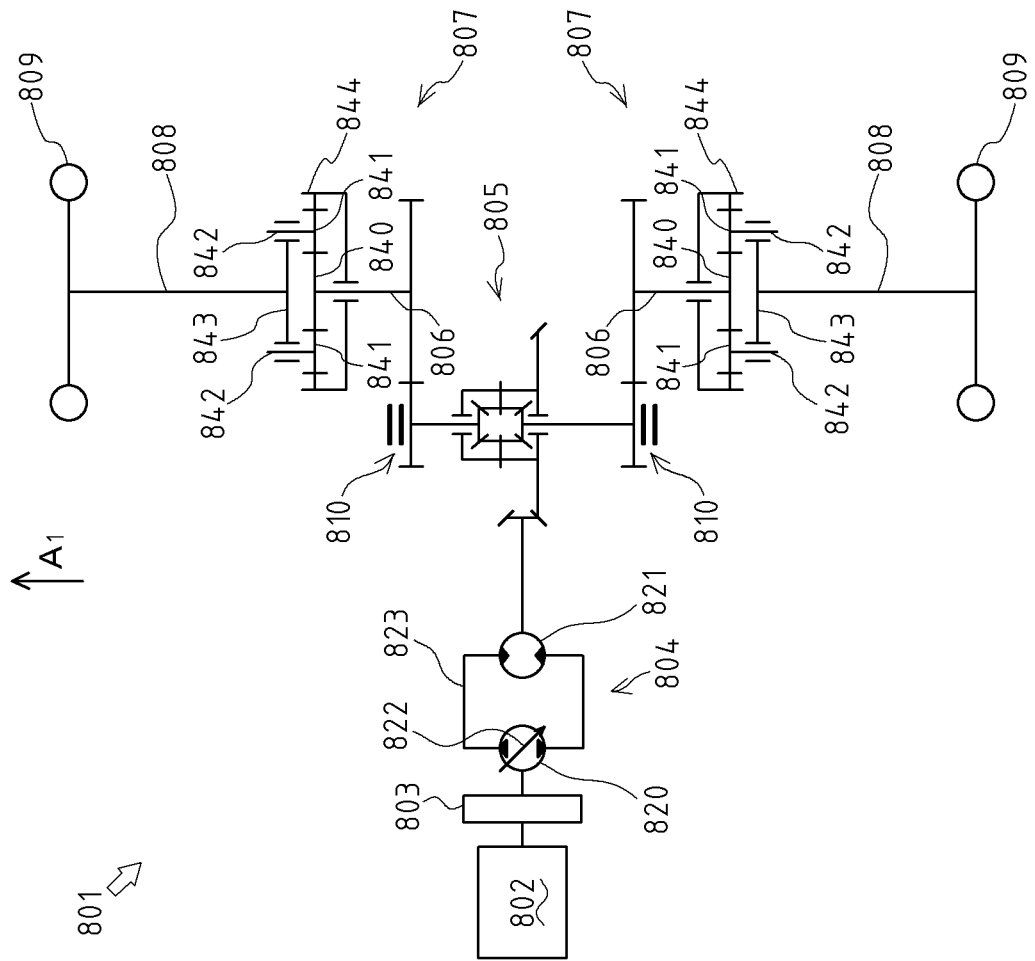
FIG. 16 It is a schematic diagram of a power transmission system for driving a work vehicle.

By providing the brake means 854 for braking the respective ring gears 844 of the left and right planetary gear mechanisms 807, the differential 805 shown in FIG. 16 becomes unnecessary. Namely, the function of the differential 805 differentially distributing the power to the left and right of the work vehicle 801 is replaced with the function of the brake means 854 respectively braking the rotations of the ring gears 844. Accordingly, the differential 805 is not necessary in the distribution part, and as shown in FIG. 19, the differential 805 in FIG. 16 can be replaced with a bevel gear serving as a distribution part 805a. The distribution part 805a equally distributes the power from the engine between the left and right of the vehicle.

As shown in FIG. 19, by replacing the differential 805 with the distribution part 805a, a brake means 811 serving as the second brake means for braking the power from the engine 802 can be provided at the upstream of the distribution part 805a and at the downstream of the HST 804. Accordingly, the brake device 810 shown in FIG. 16 is not necessary. Namely, by replacing the differential 805 with the distribution part 805a, it is not necessary to distribute the power at the downstream of the distribution part 805a. By only braking the power at the upstream of the distribution part 805a, the power to the left and right of the work vehicle 801 is braked simultaneously. Therefore, only one brake means 811 is required and the brake capacity is saved.

In this embodiment, the brake means 811 is provided at the upstream of the distribution part 805a and at the downstream of the HST 804. However, the invention is not limited thereto. The second brake means should be provided at a position at which the work vehicle 801 can be braked by a single brake means. For example, the position may be at the upstream of the HST 804 and at the downstream of the clutch 803 or inside of the HST 804.

Explanation will be given on the embodiment of slip control in the above-mentioned construction referring to FIGS. 19 and 20.

When the vehicle does not slip during traveling or working, the controller 850 transmits the control signals $CR_1$ and $CL_1$ to the actuators 853 so as to apply the brake means 854. Accordingly, the actuators 853 apply the brake means 854 so as to brake the rotations of the ring gears 844 via the brake gears 845 and the brake gear shafts 846, respectively.

The left and right rotation sensors 851 constantly detect the respective rotational speeds of the drive wheels 809 and transmit the detection signals $RR_1$ and $RL_1$ as measures of the detected rotational speeds to the controller 850.

The pressure sensor 852 constantly detects the pressure in the closed hydraulic circuit 823 continuously and transmits a detection signal $P_1$ as a measure of the detected pressure to the controller 850.

The controller 850 judges whether the drive wheels 809 slip or not based on the detection signals $RR_1$, $RL_1$ and $P_1$.

When the controller 850 judges that the slip occurs, the controller 850 transmits the control signal to the actuator 853 at the slipping side so as to release the brake means 854.

As shown in FIG. 20, when the braking of the ring gear 844 by the brake means 854 is canceled, the ring gear 844 is rotated by the rotation of the planetary gears 841 meshing with the ring gear 844. Accordingly, the power inputted from the sun gear shaft 806 is distributed between the carrier 843 and the ring gear 844 and transmitted to them. Namely, the power transmitted through the carrier 843 and the drive axle 808 to the drive wheel 809 is reduced in speed.

Accordingly, the braking of the ring gear 844 is canceled and the power is inputted to the planetary gear mechanism 807, whereby the power outputted to the drive axle 808 is reduced in speed. Therefore, the slipping drive wheel 809 is slowed so as to increase its ground-gripping power, whereby the slip is suppressed.

According to the construction of this embodiment, the slip control can be performed for the slipping drive wheel. Accordingly, only the drive wheel requiring the slip control has the slip control, so as not to excessively reduce the driving power of the work vehicle 801. Alternatively, when the slip occurs, the brake means 811 may be actuated so as to reduce the speed of rotation power outputted to the drive axle 808, thereby suppressing the slip. In this case, the brake means 854 are used for turning.

When the slip control is performed, the planetary gear mechanism 807 distributes the power from the engine 802 and reduces the speed of rotational power transmitted to the drive wheel 809, thereby smoothing the slip control. Namely, in this embodiment, the transmission is not controlled for the slip control so that the slip control can be performed smoothly without sudden speed change.

The planetary gear mechanisms 807 serve as the left and right transmissions, thereby ensuring a large reduction ratio while serving as compact reduction devices, in comparison with a gear reduction mechanism interposed between parallel shafts.

By replacing the differential 805 with the distribution part 805a, any differential lock operation is not necessary at the time of slip or skid of the drive wheel.

Explanation will be given on a process of judging whether the drive wheels 809 slip or not based on the detection signals $RR_1$, $RL_1$ and $P_1$.

The pressure sensor 852 constantly detects the pressure in the closed hydraulic circuit 823 and transmits the detection signal $P_1$ as measure of the detected pressure to the controller 850. The controller 850 calculates an ideal rotational speed $R_1$ of the drive axle 808 based on the detection signal $P_1$.

The ideal rotational speed $R_1$ is the rotational speed of the drive wheel 809 when the work vehicle 801 travels without slipping. The relation between the ideal rotational speed $R_1$ and the detection signal $P_1$ is previously determined based on experiments and numerical simulations and is stored in the controller 850, whereby the controller 850 can calculate the ideal rotational speed $R_1$ of the drive axle 808 based on the detection signal $P_1$.

Simultaneously, the left and right rotation sensors 851 detect the respective rotational speeds of the drive wheels 809 and transmit the detection signals $RR_1$ and $RL_1$ as measures of the detected rotational speeds to the controller 850.

The controller 850 calculates the difference between the ideal rotational speed $R_1$ and the detection signal $RR_1$ or $RL_1$ which is the actual rotational speed, and judges that either one of the drive wheels 809 slips when the difference becomes not less than the fixed value which has been set previously.

The slip control of the drive wheels 809 with the rotation sensors 851 and the pressure sensor 852 is not limited to this embodiment. For example, alternatively, the slip control may be performed not only when the difference is not less than the fixed value but constantly so as to continuously reduce the difference between the ideal rotational speed $R_1$ and the detection signal $RR_1$ or $RL_1$.

In this embodiment, both the detection signals $RR_1$ and $RL_1$ serving as the actual rotational speed are used for judging whether the vehicle slips or not. However, the invention is not limited thereto. Alternatively, only one of the detection signal $RR_1$ and $RL_1$ may be used for judging whether the vehicle slips or not.

In this embodiment, the pressure sensor 852 detects the pressure in the closed hydraulic circuit 823 and the detection signal $P_1$ is employed for calculating the ideal rotational speed $R_1$ of the drive axle 808. However, the invention is not limited thereto. Alternatively, for example, the tilt angle of the movable swash plate 822 and the rotational speed of the engine 802 may be detected and the ideal rotational speed $R_1$ may be calculated based on them. In this invention, the method for calculating the ideal rotational speed $R_1$ is not limited.

Next, explanation will be given on construction and control system in another embodiment of the slip control shown in FIG. 21.

Figure 21:
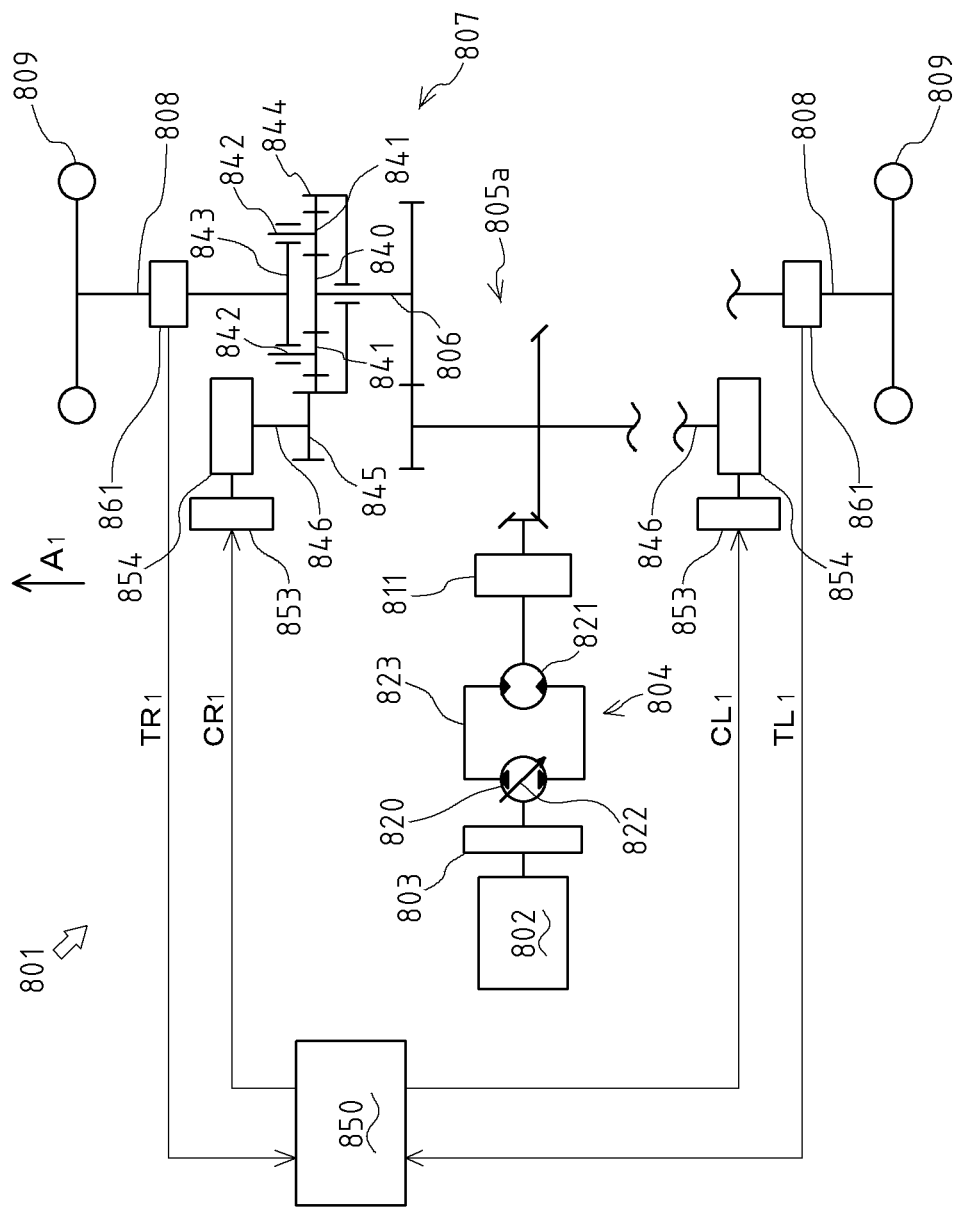
FIG. 21 It is a schematic diagram of a slip control system of a work vehicle according to an embodiment.

As shown in FIG. 21, torque sensors 861 are provided at intermediate portions of the respective left and right drive axles 808. Each torque sensor 861 detects the torque applied to the drive axle 808. The occurrence of the slip is detected based on the detected torque. Namely, the torque sensor 861 is the slip detection means detecting the occurrence of the slip. The torque sensors 861 are connected to the controller 850 serving as the control means. The left and right torque sensors 861 constantly detect the respective torque applied to the drive axles 808 and detection signals $TR_1$ and $TL_{14}$ as measures of the detected torques are transmitted to the controller 850.

When the vehicle does not slip during traveling or working, the controller 850 transmits the control signals $CR_1$ and $CL_1$ to the actuators 853 so as to apply the respective brake means 854. Accordingly, the actuators 853 apply the brake means 854 so as to brake the rotations of the ring gears 844 via the brake gears 845 and the brake gear shafts 846, respectively.

The left and right torque sensors 861 constantly detect the torques applied to the drive axles 808, respectively, and the detection signals $TR_1$ and $TL_1$ as measures of the detected torques are transmitted to the controller 850. The controller 850 judges whether the slip occurs at either one of the drive wheels 809 or not based on change of each of the received detection signals $TR_1$ and $TL_1$.

When the controller 850 judges that the slip occurs, the controller 850 transmits the control signal to the actuator 853 at the slipping side so as to release the brake means 854. Then, the slip is suppressed similarly to the embodiment shown in FIG. 20.

According to the construction of this embodiment, the slip control can be performed for only the slipping drive wheel. Accordingly, only the drive wheel requiring the slip control is given the slip control, so as not to excessively reduce the driving power of the work vehicle 801. Alternatively, when the slip occurs, the brake means 811 may be applied so as to reduce the power outputted to the drive axle 808, thereby suppressing the slip. In this case, the brake means 854 are used for turning.

At the time of the slip control, the planetary gear mechanism distributes the power from the engine and reduces the power transmitted to the drive wheel, whereby the slip control can be performed smoothly regardless of what type of the transmission the vehicle has. Namely, in this embodiment, the transmission is not controlled for the slip control so that the slip control can be performed smoothly without sudden speed change.

The planetary gear mechanisms 807 serve as the left and right transmissions, thereby ensuring a large reduction ratio while serving as compact reduction devices, in comparison with a gear reduction mechanism interposed between parallel shafts.

By replacing the differential 805 with the distribution part 805a, any differential lock operation is not necessary at the time of slip or skid of the drive wheel.

Explanation will be given on a process of judging whether the drive wheels 809 slip or not based on the detection signals $RR_1$, $RL_1$ and $P_1$.

When the work vehicle travels, a torque is applied to each drive axle 808. The torque is caused by the power transmitted from the planetary gear mechanism 807 and by the friction force applied to the drive wheel 809 from the ground surface.

When the work vehicle 801 travels without slipping, a certain fixed torque is applied to each drive axle 808. The torque is changed according to change of the rotational speed of the engine and of the state of the ground surface. When the slip occurs, the torque applied to the drive axle 808 is smaller than that that during traveling without slipping. Therefore, the torque applied to the drive axle 808 during traveling without slipping is measured by experiments and a threshold $TT_1$ is set between the measured torque and the torque when the slip occurs. The threshold $TT_1$ is a value for judging occurrence of the slip. When the detection signal $TR_1$ or $TL_1$ is smaller than the threshold $TT_1$, it is judged that the slip occurs at the drive wheel generating this detection signal.

The threshold $TT_1$ is previously stored in the controller 850. The controller 850 constantly compares the received detection signals $TR_1$ and $TL_1$ with the threshold $TT_1$. When the detection signal $TR_1$ or $TL_1$ is smaller than the threshold $TT_1$, it is judged that the slip occurs at the drive wheel generating this detection signal.

In this embodiment, the method judging occurrence of the slip based on the detection signal $TR_1$ or $TL_1$ is not limited to the above-mentioned method with the threshold. Alternatively, for example, a change degree of the detection signal per unit time may be measured so as to judge occurrence of the slip when the torque is changed suddenly for the unit time, or both the threshold and the change degree may be used.

In this embodiment, the work vehicle 801 has the HST 804. However, the invention is not limited thereto, and a multi-step transmission such as a manual transmission may alternatively be employed.

In the invention, the slip detection means is not limited to the rotation sensors 851 and the pressure sensor 852 or the torque sensor 861 as mentioned above. Alternatively, for example, a theoretical vehicle speed may be calculated based on the rotational speed of the engine and may be compared with an actual vehicle speed measured by a ground speed sensor or the like, so as to judge that the slip occurs when the actual vehicle speed is smaller than the theoretical vehicle speed plus a certain fixed value. Namely, in the invention, any other detection means than that as mentioned above may serve as the slip detection means only if it can detect occurrence of the slip of the work vehicle.

In the above-mentioned embodiment, any differential is not provided in the distribution part 805a. However, the invention is not limited thereto, and a differential may be provided in the work vehicle 801.

As mentioned above, the work vehicle 801 has the transmission for changing in speed power from the engine 802 and has the distribution part 805a for distributing the power changed in speed by the transmission to the left and right sides thereof. The power distributed by the distribution part 805a is transmitted through the left and right reduction devices and the drive axles 808 to the left and right drive wheels 809. The planetary gear mechanisms 807 serve as the reduction devices, the brake means 854 are provided for braking the ring gears 844 of the respective planetary gear mechanism 807, the slip detection means are provided for detecting slip of the drive wheels 809, and the controller 850 is connected to the brake means 854 and the slip detection means. When the controller 850 judges that the slip occurs at either one of the drive wheels 809, the controller 850 operates the brake means 854 at the slipping side.

Accordingly, the slip control can be performed for only the slipping drive wheel 809. The smooth slip control can be performed regardless of what kind of the transmission the vehicle has. Furthermore, the reduction devices are compact because they are constructed by the planetary gear mechanisms 807.

The brake means 811 is provided at the upstream of the distribution part 805a so as to brake the power from the engine 802.

Accordingly, the work vehicle can be braked with small braking torque.

The HST 804 serves as the transmission. The HST 804 includes the hydraulic pump 820, the hydraulic motor 821 and the closed hydraulic circuit interposed between the hydraulic pump 820 and the hydraulic motor 821, and the pressure sensor 852 detecting pressure in a passage of the closed hydraulic circuit 823 serves as the sip detection means. Alternatively, the rotational sensors 851 detecting the rotational speeds of the respective drive wheels 809 serving as the slip detection means.

Accordingly, the slip of the work vehicle can be detected by comparing the ideal rotational speed $R_1$ with the actual rotational speed $RR_1$ and $RL_1$.

Another work vehicle serving as a present invention will be explained.

If the slip is suppressed by shifting down the transmission to a lower speed stage, especially if the transmission is a multi-step transmission such as a manual transmission, sudden speed change may cause shock during this shift of the transmission. Furthermore, since the transmission is shifted to the lower speed state so as to correspond to the slipping wheel, all wheels are slowed. Namely, not only the slipping wheel but also the other wheels are slowed so that the traveling speed of the work vehicle is reduced. This speed reduction causes rough surfaces of a field during a work for leveling the field surface, for example.

If the slip is suppressed by automatically raising a set height of a working machine, the change of height may cause deterioration of work accuracy such as instability of plowing depth.

Therefore, the invention provides a work vehicle performing a smooth slip control without excessive decrease of drive power regardless of what kind of a transmission the vehicle has.

A work vehicle includes a transmission for speed-changing power from a prime mover and a distribution part for distributing the power speed-changed by the transmission to the left and right sides of the vehicle. The distributed powers are transmitted through left and right reduction devices and drive axles to left and right drive wheels. The work vehicle further includes planetary gear mechanisms serving as the reduction devices, motors for controlling rotations of ring gears of the respective planetary gear mechanisms, slip detection means detecting slip of the respective drive wheels, and a control means connected to the motor and the slip detection means. When the control means judges that the slip occurs at either one of the drive wheels, the control means operates the motor on the side of the slipping drive wheel.

According to the construction, the slip control can be performed for only the slipping wheel. The smooth slip control can be performed regardless of what kind of the transmission the vehicle has. Furthermore, the reduction devices can be compact because they are the planetary gear mechanisms. An appropriate torque can be transmitted to the left and right drive wheels with no differential and with no differential lock operation.

The motor is arranged at a motor-arrangeable position where the motor can be arranged. A drive shaft is interlockingly connected at one of ends thereof through a gear to the outer periphery of the ring gear, and is extended at the other end thereof to the motor-arrangeable position so as to be interlockingly connected through a gear to the output shaft of the motor.

According to the construction, the motor can be provided at the motor-arrangeable position even if the motor arranged at the position has to be distant from the planetary gear mechanism.

The control means can be set in a turning mode such that the left and right drive wheels are rotated in opposite directions. A mode command means is provided for transmitting a signal for switching the control means into the turning mode. The mode command means is connected to the control means.

According to the construction, the control means can be automatically switched into the turning mode for minimizing the turning radius of the work vehicle.

Explanation will be given on the best mode for carrying out the invention referring to the drawings.

Explanation will be given on the embodiment referring to FIGS. 22 to 28.

The work vehicle concerning the invention is not limited to a tractor explained in this embodiment and may alternatively be an agricultural vehicle, such as a combine, or a construction vehicle, such as a loader or a backhoe.

In the drawings, it is assumed that a forward direction of a tractor 901 is a direction of an arrow $A_2$ and a rightward direction of the tractor 901 is a direction of an arrow $B_2$.

Figure 22:
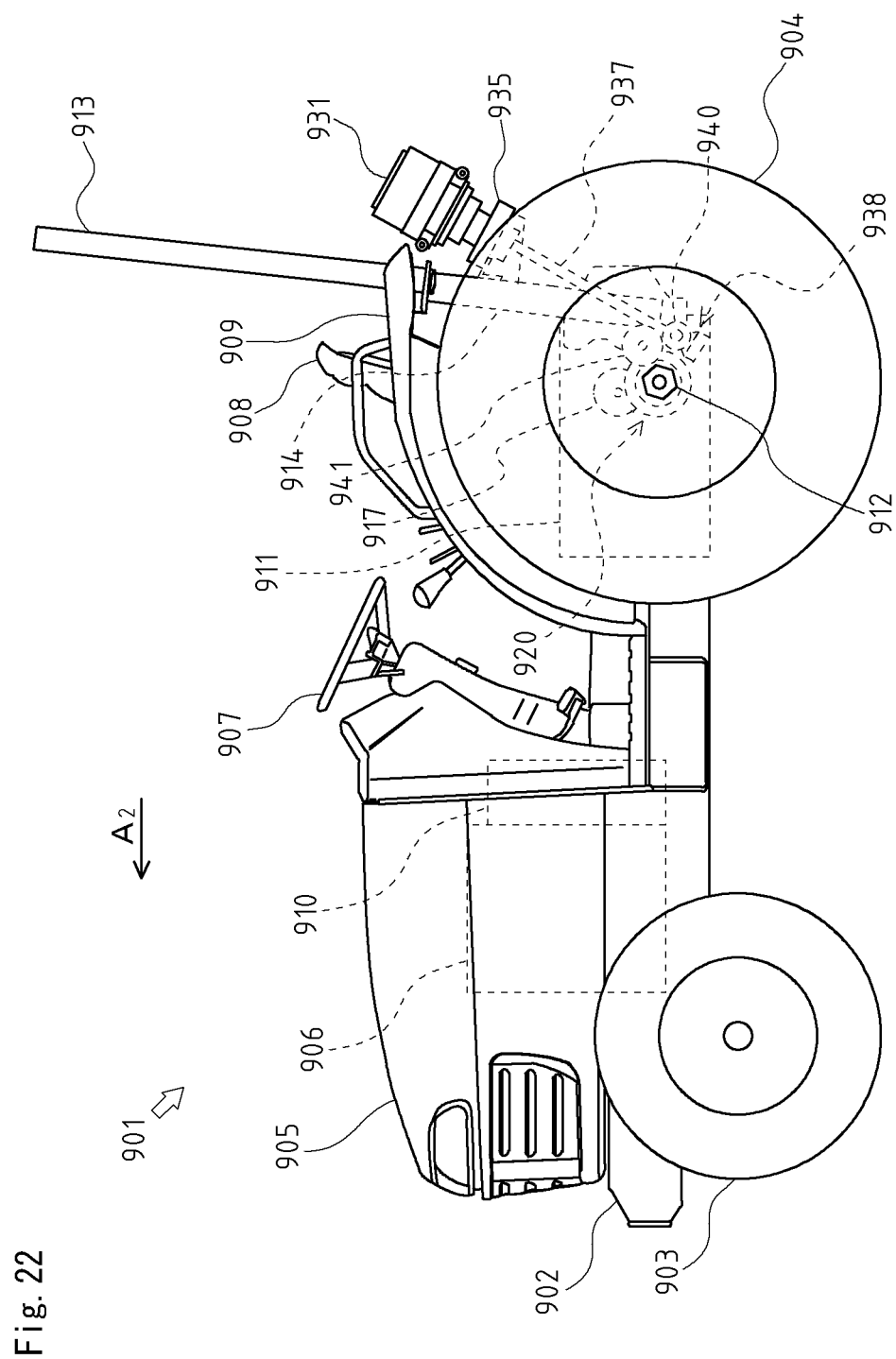
FIG. 22 It is a side view of an entire construction of a tractor according to an embodiment.

As shown in FIG. 22, the tractor 901 has a body frame 902 provided at a front portion thereof with front wheels 903 and at a rear portion thereof with drive wheels 904. An engine 906 serving as a prime mover is fixed to the body frame 902 in a bonnet 905 at the front portion of the tractor 901. A steering wheel 907 is arranged behind the bonnet 905 and a seat 908 is arranged behind the steering wheel 907. At the left and right sides of the seat 908, fenders 909 are fixed to cover upper portions of the drive wheels 904.

A clutch 910 is arranged behind the engine 906, and a transmission casing 911 is arranged behind the clutch 910. The drive wheels 904 are attached onto drive axles 912 projecting laterally from the left and right side surfaces of the transmission casing 911, whereby the power from the engine 906 is transmitted to the drive wheels 904. ROPS support frames 914 are fixed to rear portions of left and right side surfaces of the transmission casing 911 so as to support a ROPS (Roll-Over Protective Structure).

Next, explanation will be given on a power transmission system of the tractor 901 referring to FIGS. 23 to 25.

Figure 23:
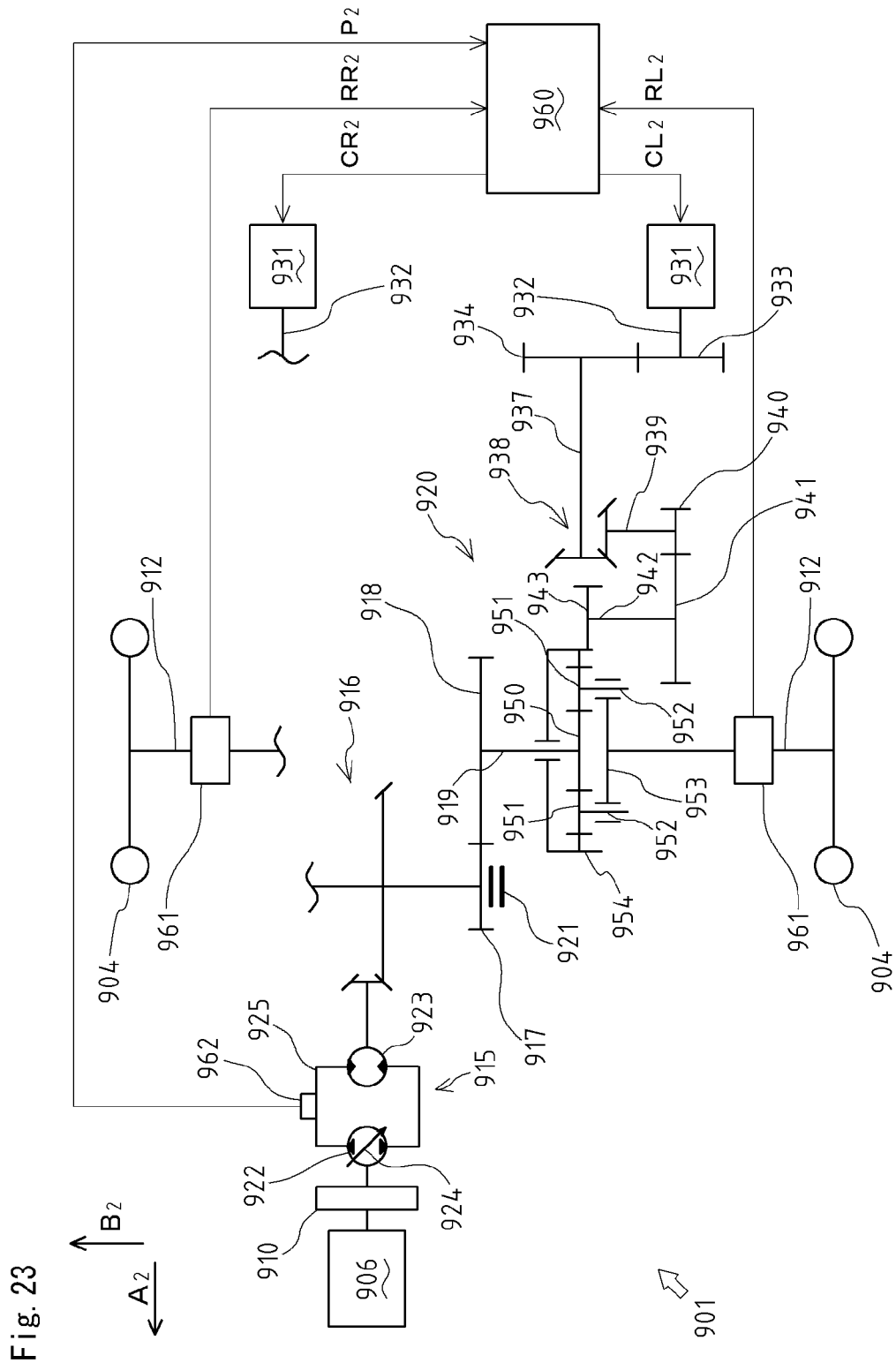
FIG. 23 It is a skeleton diagram of a drive and slip control system of the tractor.

As shown in FIG. 23, the power of the engine 906 is transmitted through the clutch 910 and a hydraulic stepless transmission (hereinafter, simply referred to as "HST") 915 provided in the transmission casing 911 to bevel gears serving as a distribution part 916. The distribution part 916 distributes the power rightward and leftward. The powers distributed by the distribution part 916 are transmitted to sun gear shafts 919 of respective planetary gear mechanisms 920 through respective left and right gears 917 and 918. Each of the planetary gear mechanisms 920 serves as a reduction device. The gears 917 and 918, the sun gear shafts 919, the planetary gear mechanisms 920, the drive axles 912 and the drive wheels 904 are arranged symmetrically at the left and right sides of the vehicle. Therefore, explanation will be given on only the arrangement on the left side of the tractor 901.

The power whose speed is reduced in the planetary gear mechanism 920 is transmitted through the drive axle 912 to the drive wheel 904 serving as a traveling wheel. The drive axle 912 supports the drive wheel 904. At the left and right of the distribution part 916, brake devices 921 are provided so as to brake the respective powers distributed by the distribution part 916.

In this embodiment, the drive wheel 904 serves as the traveling wheel. However, the invention is not limited thereto and the drive wheel 904 may alternatively be a driving wheel of a crawler traveling device including a crawler belt wound between a driving wheel and a driven wheel. In this embodiment, one drive wheel is provided at each of the left and right sides of the tractor 901. However, the invention is not limited thereto, and the tractor 901 may alternatively be a four-wheel drive work vehicle in which all front and rear wheels are drive wheels. For example, a four-wheel drive work vehicle is suggested to transmit power extracted from the HST 915 to the front portion thereof and to then transmit it through a differential to left and right front wheels, thereby driving the front wheels. In this case, planetary gear mechanisms serving as the reduction devices are provided for the respective left and right front wheels.

The HST mainly includes a variable displacement hydraulic pump 922, a fixed displacement hydraulic motor 923 and a movable swash plate 924.

The variable displacement hydraulic pump 922 and the fixed displacement hydraulic motor 923 are fluidly connected to each other through a closed hydraulic circuit 925.

The hydraulic pump 922 is provided with the movable swash plate 924 which is interlocked with a speed change operation means (not shown) provided in an operation part of the vehicle. By operating the speed change operation means, the tilt angle of the movable swash plate 924 can be adjusted. By the operation, the displacement of the hydraulic pump 922 is changed so as to change the discharge amount and discharge direction of the hydraulic oil.

According to the above-mentioned construction, the power from the engine 906 is inputted to the hydraulic pump 922 and the speed change operation means slantingly moves the movable swash plate 924 of the hydraulic pump 922 to an optional angle from the neutral position, whereby the hydraulic pump 922 discharges the hydraulic oil. The hydraulic oil discharged from the hydraulic pump 922 is pressurized and sent through the closed hydraulic circuit 925 to the hydraulic motor 923 so as to rotate hydraulic motor 923, whereby the power is transmitted to the downstream of the HST.

Figure 24:
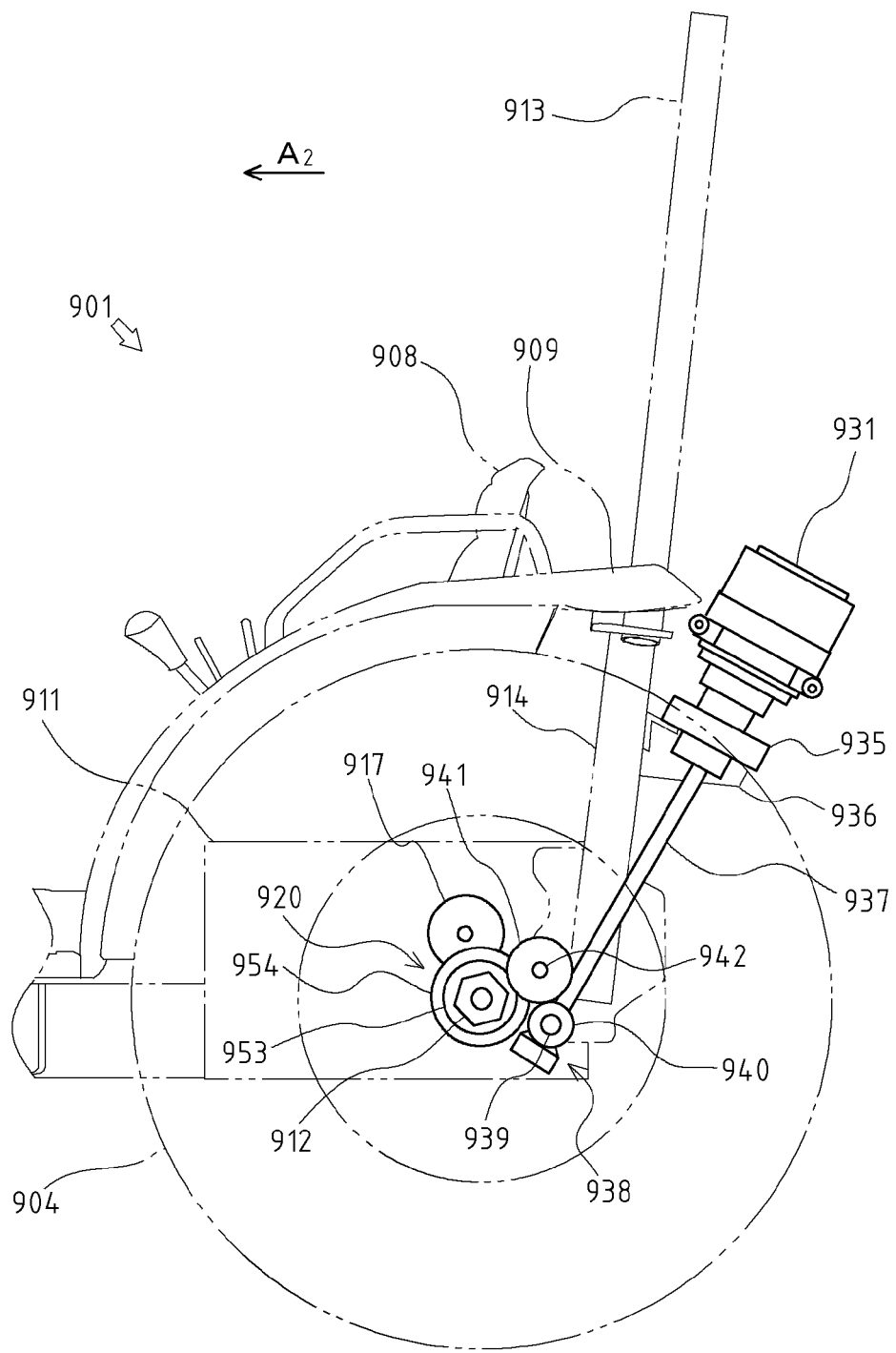
FIG. 24 It is an enlarged side view of a rear portion of the tractor having the construction concerning the slip control of the tractor.
Figure 25:
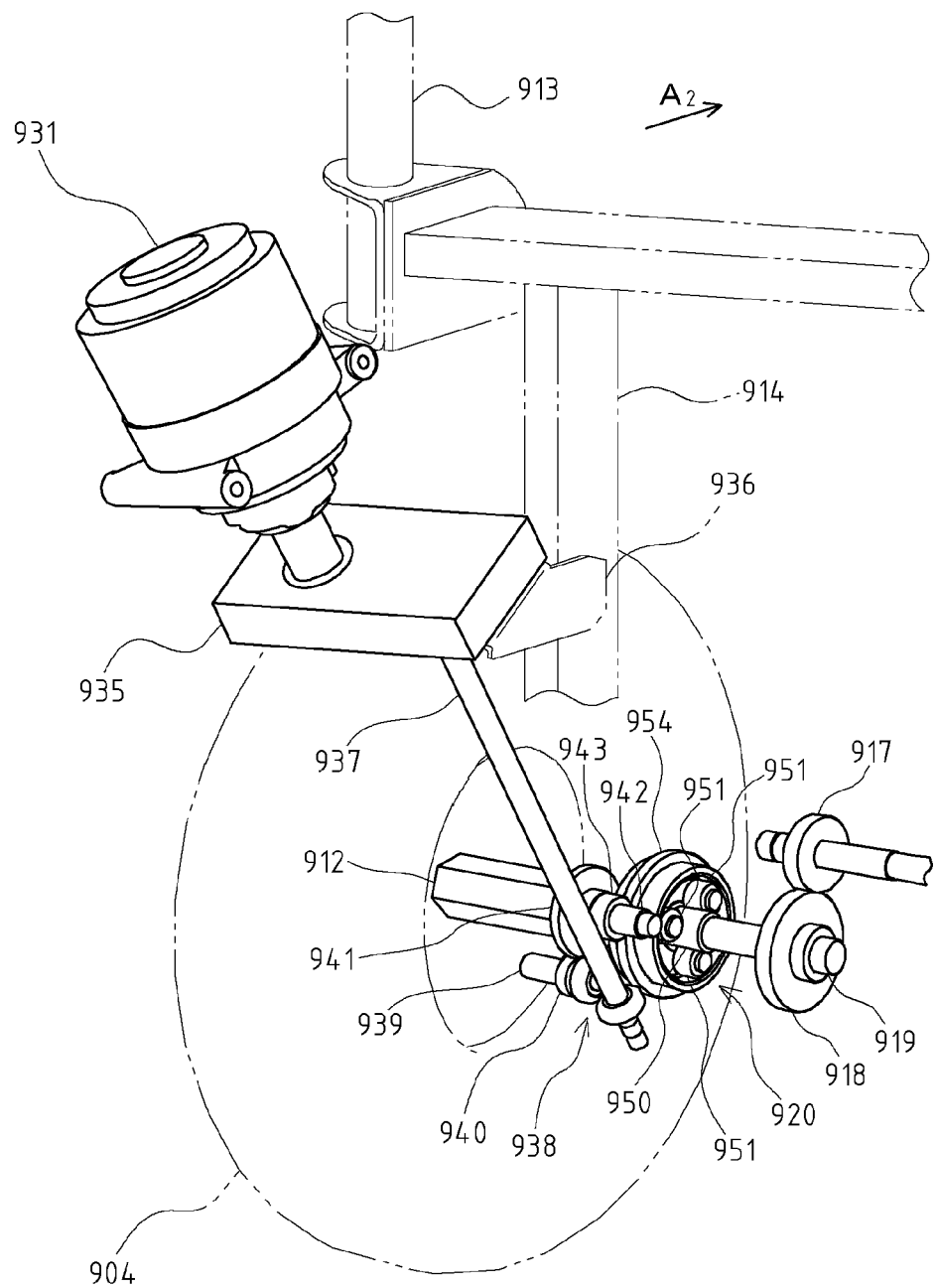
FIG. 25 It is a perspective rear view of the construction concerning the slip control of the tractor.

As shown in FIGS. 24 and 25, a motor 931 is disposed behind the fender 909 and above the drive wheel 904. An output shaft 932 projects below the motor 931. An output gear 933 is provided on a tip of the output shaft 932 and meshes with a transmission gear 934 (see FIG. 23). The output gear 933 and the transmission gear 934 are provided inside an output gear casing 935. The motor 931 is fixed to an upper surface of the output gear casing 935, and the output gear casing 935 is fixed to a stay 936 behind the ROPS support frames 914. Accordingly, the motor 931 can be arranged without interfering with the drive wheel 904 and a rear axle casing (not shown), thereby facilitating its maintenance and protecting the motor 931 from adherence of mud caused by the mud splash from the drive wheel 904.

As shown in FIG. 23, one of ends of a transmission shaft 937 is provided at the center of the transmission gear 934. A bevel gear 938 is provided on the other end of the transmission shaft 937 so that the transmission shaft 937 is interlockingly connected to a bevel gear shaft 939 through the bevel gear 938. The bevel gear shaft 939 is interlockingly connected to a brake gear shaft 942 through gears 940 and 941. One of ends of the brake gear shaft 942 is provided at the center of the gear 941 and the other end thereof is provided at a center of a brake gear 943. The brake gear 943 meshes with an outer periphery of a ring gear 954 constituting the planetary gear mechanism 920.

The above-mentioned motor-arrangeable position where the motor 931 is arranged is an outside (upward) of the outer periphery of the drive wheel 904. One of ends of the transmission shaft 937 is interlockingly connected to the outer perimeter of the ring gear 954 through the brake gear 943 and the like. The other end of the transmission shaft 937 is extended to this motor-arrangeable position and is interlockingly connected to the output shaft 932 of the motor 931 through the transmission gear 934 and the like.

The motor-arrangeable position is provided in the tractor 901 for enabling arrangement of the motor 931 whose output shaft 932 is interlockingly connected to the ring gear 954 through the gears. In this embodiment, the motor 931 is disposed behind the fender 909. However, the invention is not limited thereto. Namely, the position does not interfere with the drive wheel 904, a rear axle casing, a work machine attachment device and the like and is above or before the fender 909, behind the seat 908, or the like.

In the above-mentioned construction, the power from the motor 931 is transmitted through the output shaft 932, the output gear 933 and the transmission gear 934 to the transmission shaft 937, and then transmitted through the bevel gear 938, the bevel gear shaft 939, the gears 940 and 941, the brake gear shaft 942 and the brake gear 943 to the ring gear 954.

Explanation will be given on the construction of the planetary gear mechanism 920 referring to FIGS. 23 and 25. The planetary gear mechanism 920 mainly includes a sun gear 950, three planetary gears 951, a carrier 953 and the ring gear 954. In this embodiment, the planetary gear mechanism 920 has the three planetary gears 951. However, the number of planetary gears in the invention is not limited thereto.

The sun gear shaft 919 is provided at the center of the sun gear 950. The planetary gears 951 mesh with the outer peripheral edge of the sun gear 950. The planetary gears 951 mesh with inner peripheral teeth of the ring gear 954. One of ends of a planetary gear shaft 952 is provided at the center of each of the planetary gears 951. The other end of each of the planetary gear shafts 952 is supported by the carrier 953. The drive axle 912 is provided at the center of the carrier 953.

The planetary gear mechanism 920, the brake gear 943, the brake gear shaft 942, the gears 940 and 941, the bevel gear shaft 939 and the bevel gear 938 are arranged in the rear axle casings (not shown) provided at the left and right of the transmission casing 911.

Explanation will be given on the power transmission by the planetary gear mechanism 920 constructed as the above.

When the engine 906 is driven and the motor 931 is stopped, the power inputted from the sun gear shaft 919 is transmitted through the sun gear 950 to the planetary gears 951. The planetary gears 951 revolve along the outer periphery of the sun gear 950 while they rotate centered on their own axes. The revolutional movement of the planetary gears 951 is transmitted through the planetary gear shafts 952 to the carrier 953 so that the carrier 953 is rotated, that is, the drive axle 912 and the drive wheel 909 are rotated.

When both the engine 906 and the motor 931 are driven simultaneously, the power of the motor 931 (hereinafter, referred to as "auxiliary power") is transmitted through the transmission shaft 937 and the like to the ring gear 954 so as to rotate the ring gear 954. This rotation is combined at the planetary gears 951 with the rotation of the sun gear 950 by the power of the engine 906 so as to make the revolutional movement of the planetary gears 951. The revolutional movement of the planetary gears 951 is transmitted through the planetary gear shafts 952 to the carrier 953 so that the carrier 953 is rotated, that is, the drive axle 912 and the drive wheel 909 are rotated.

The above-mentioned planetary gear mechanism 920 as the reduction device performs reduction of the power inputted from the sun gear shaft 919, and then the power is outputted through the drive axle 912.

Next, explanation will be given on the construction of the slip control of the embodiment of the invention shown in FIG. 23. The construction for the slip control is also symmetrical at the left and right sides of the vehicle Rotation sensors 961 are provided at intermediate portions of the respective left and right drive axles 912. The rotation sensors 961 serve as the rotational speed detection means detecting the respective rotational speeds of the drive axles 912, that is, the respective rotational speeds of the drive wheels 904. The rotation sensors 961 are connected to a controller 960 as the control means. The rotation sensors 961 constantly detect the respective rotational speeds of the drive axles 912 and transmit detection signals $RR_2$ and $RL_2$ as measures of the detected rotational speeds to the controller 960.

A pressure sensor 962 is provided at an intermediate portion of the closed hydraulic circuit 925. The pressure sensor 962 serves as the pressure detection means detecting the pressure in the closed hydraulic circuit 925. The pressure sensor 962 is connected to the controller 960. The pressure sensor 962 constantly detects the pressure in the closed hydraulic circuit 925 and transmits a detection signal $P_2$ as a measure of the detected pressure to the controller 960.

The occurrence of slip is detected based on the rotational speed detected by the rotation sensors 961 and the pressure detected by the pressure sensor 962. Namely, the rotation sensors 961 and the pressure sensor 962 serve as the slip detection means detecting the occurrence of slip of the work vehicle 901.

The motors 931 are connected to the controller 960. The left and right motors 931 are respectively actuated in response to command of control signals $CR_2$ and $CL_2$ from the controller 960.

Figure 26:
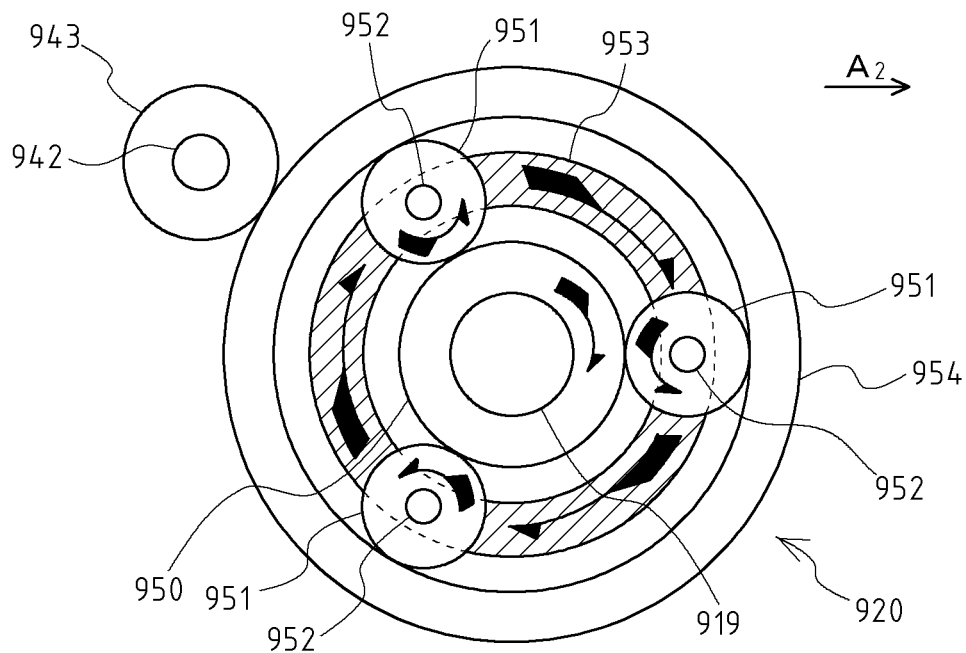
FIG. 26 (*a*) is a schematic side view of actuation of the planetary gear mechanism of the tractor. (*b*) is a schematic side view of actuation of the planetary gear mechanism at the slip control of the tractor.
Figure 26:
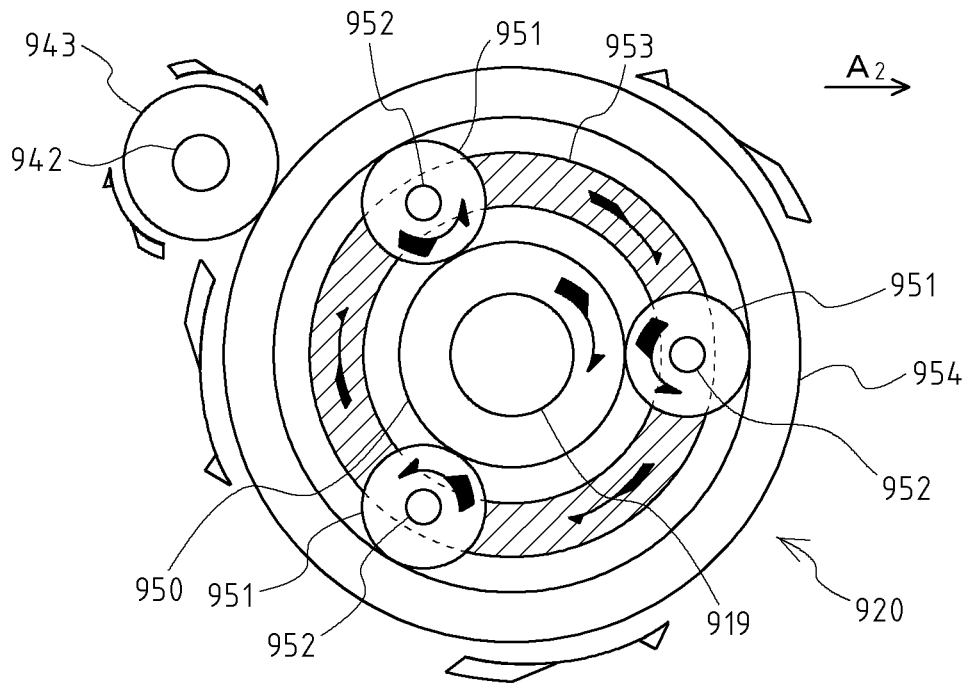

Explanation will be given on the slip control of the above-mentioned construction referring to FIGS. 23 and 26.

Each of the motors 931 is rotated forward or rearward according to the control signal $CR_2$ or $CL_2$. The auxiliary power generated by normal or reverse rotation of the motor 931 is transmitted through the transmission shaft 937 to the brake gear 943.

In this case, "normal rotation" means the rotation accelerating the tractor 901 in the traveling direction, and "reverse rotation" means the rotation which is opposite to the normal rotation so as to decelerate the tractor 901.

As shown in FIG. 23, when the vehicle does not slip during traveling or working, the controller 960 transmits the control signals $CR_2$ and $CL_2$ to the respective motors 931. Namely, each of the motors 931 is a motor with a brake, so that its output shaft 932 is not rotated when a signal for driving the motor 931 is not transmitted.

When the vehicle does not slip, as shown in FIG. 26(a), the brake of the motor 931 brakes the rotation of the brake gear 943 so that the rotation of the ring gear 954 meshing with the brake gear 943 is also braked. By the power from the engine 906 transmitted through the sun gear 950 and the like to the planetary gears 951, the drive axle 912 and the drive wheel 904 are rotated via the carrier 953.

As shown in FIG. 23, left and right rotational sensors 961 constantly detect the rotational speeds of the respective drive wheels 904 and transmit the detection signals $RR_2$ and $RL_2$ as measures of the detected rotational speeds to the controller 960 as.

A pressure sensor 962 constantly detects the pressure in the closed hydraulic circuit 823 and transmits the detection signal $P_2$ as the measure of the detected pressure to the controller 960.

The controller 960 judges whether the slip occurs or not based on the detection signals $RR_2$, $RL_2$ and $P_2$.

When the controller 960 judges that the slip occurs at either one of the drive wheels 904, the controller 960 operates the motor 931 at the slipping side. Namely, the controller 960 transmits the signal for reversing the rotation of the motor 931 at the slipping side.

As shown in FIG. 23, the auxiliary power generated by the reverse rotation of the motor 931 is transmitted through the transmission shaft 937 to the brake gear 943.

As shown in FIG. 26(b), the ring gear 954 is rotated by the auxiliary power transmitted to the brake gear 943 by the reverse rotation of the motor 931 so that the auxiliary power is transmitted to the planetary gears 951. Then, the power of the engine 906 is combined with the auxiliary power, whereby the drive axle 912 and the drive wheel 904 are rotated via the carrier 953. In this case, the auxiliary power decelerates the rotation of the drive axle 912 and the drive wheel 904 at the slipping side.

As mentioned above, by operating the motor 931 by the controller 960, the rotational speed of the drive wheel 904 is decelerated so as to increase the ground-gripping power, whereby the slip is suppressed.

In this embodiment, when the slip does not occur, the controller 960 stops the motors 931. However, the invention is not limited thereto. Alternatively, for example, the motors 931 may be rotated in the normal or reverse direction so as to obtain a desired reduction ratio when the slip does not occur.

In this embodiment, when the controller 960 judges that the slip occurs, the controller 960 reverses the rotation of the motor 931 at the slipping side. However, the invention is not limited thereto. Alternatively, for example, the normal rotation of the motor 931 is decelerated gradually or stopped so as to reduce the rotational speed of the drive wheel 904. Namely, the only thing required for the motor 931 to suppress the slip is to reduce the rotational speed of the drive wheel 904 so as to increase the ground-gripping power.

In this embodiment, the rotation of the ring gear 954 is braked by only the drive of the motor 931. However, by providing a brake device on the transmission shaft 937 which transmits the auxiliary power from the motor 931 to the ring gear 954 and controlling the brake device by the controller 960, the slip control can be performed more quickly. For example, by providing a brake device on the transmission gear 934, the auxiliary power transmitted from the motor 931 to the ring gear 954 can be reduced quickly.

According to the construction of this embodiment, the slip control can be performed for only the slipping drive wheel. Therefore, the slip control can be performed by reducing the rotational speed of only the drive wheel requiring the slip control without reducing the traveling speed of the tractor 901.

At the time of the slip control, the power of the engine 906 is combined with the auxiliary power of the motor 931 by the planetary gear mechanism 920 so as to reduce the rotational speed of the drive wheel, whereby the smooth slip control can be performed regardless of what type of the transmission the vehicle has. Namely, in this embodiment, the transmission is not shifted for the slip control, whereby the smooth slip control can be performed without sudden speed change.

The planetary gear mechanisms 920 serve as the left and right reduction devices, thereby ensuring a large reduction ratio while serving as compact reduction devices in comparison with a gear reduction mechanism interposed between parallel shafts.

The left and right motors 931 are provided for controlling the rotations of the ring gears 954 of the left and right planetary gear mechanisms 920, respectively, whereby it is not necessary to provide any differential in the distribution part 916 of the tractor 901.

Namely, the function of the differential which differentially distributes power between the left and right of the tractor 901 can be replaced with the motors 931 and the controller 960 controlling the respective rotations of the ring gears 954.

Explanation will be given on a process of judging whether the drive wheels 904 slip or not based on the detection signals $RR_2$, $RL_2$ and $P_2$.

The pressure sensor 962 constantly detects the pressure in the closed hydraulic circuit 823 and transmits the detection signal $P_2$ as the detected pressure to the controller 960. The controller 960 calculates an ideal rotational speed $R_2$ of the drive axle 912 based on the detection signal $P_2$.

The ideal rotational speed $R_2$ is the rotational speed of the drive wheel 904 when the tractor 901 travels without slipping. The relation between the ideal rotational speed $R_2$ and the detection signal $P_2$ is previously determined based on experiments and numerical simulations and is stored in the controller 960, whereby the controller 960 can calculate the ideal rotational speed $R_2$ of the drive axle 912 based on the detection signal $P_2$.

Simultaneously, the left and right rotation sensors 961 detect the respective rotational speeds of the drive wheels 904 and transmit the detection signals $RR_2$ and $RL_2$ as measures of the detected rotational speeds to the controller 960.

The controller 960 calculates the difference between the ideal rotational speed $R_1$ and the detection signal $RR_2$ or $RL_2$ which is the actual rotational speed, and judges that the drive wheel 904 slips when the difference becomes not less than the previously set fixed value.

The method of the slip control of the drive wheels 904 with the rotation sensors 961 and the pressure sensor 962 is not limited to this embodiment. Alternatively, for example, the slip control may be performed so as to constantly reduce the difference between the ideal rotational speed $R_2$ and the detection signal $RR_2$ or $RL_2$, regardless of whether the difference becomes not less than the fixed value or not.

In this embodiment, the detection signals $RR_2$ and $RL_2$ are measures of the actual rotational speeds and are used for judging whether the slip occurs or not. However, the invention is not limited thereto. Alternatively, only one of the detection signal $RR_2$ and $RL_2$ may be used for judging whether the slip occurs or not.

In this embodiment, the pressure sensor 962 detects the pressure in the closed hydraulic circuit 925 and the detection signal $P_2$ is employed for calculating the ideal rotational speed $R_2$ of the drive axle 912. However, the invention is not limited thereto. Alternatively, for example, the tilt angle of the movable swash plate 924 and the rotational speed of the engine 906 may be detected and the ideal rotational speed $R_2$ may be calculated based on them. In this invention, the method for calculating the ideal rotational speed $R_2$ is not limited.

Next, explanation will be given on the construction and control system for the slip control in another embodiment shown in FIG. 27.

Figure 27:
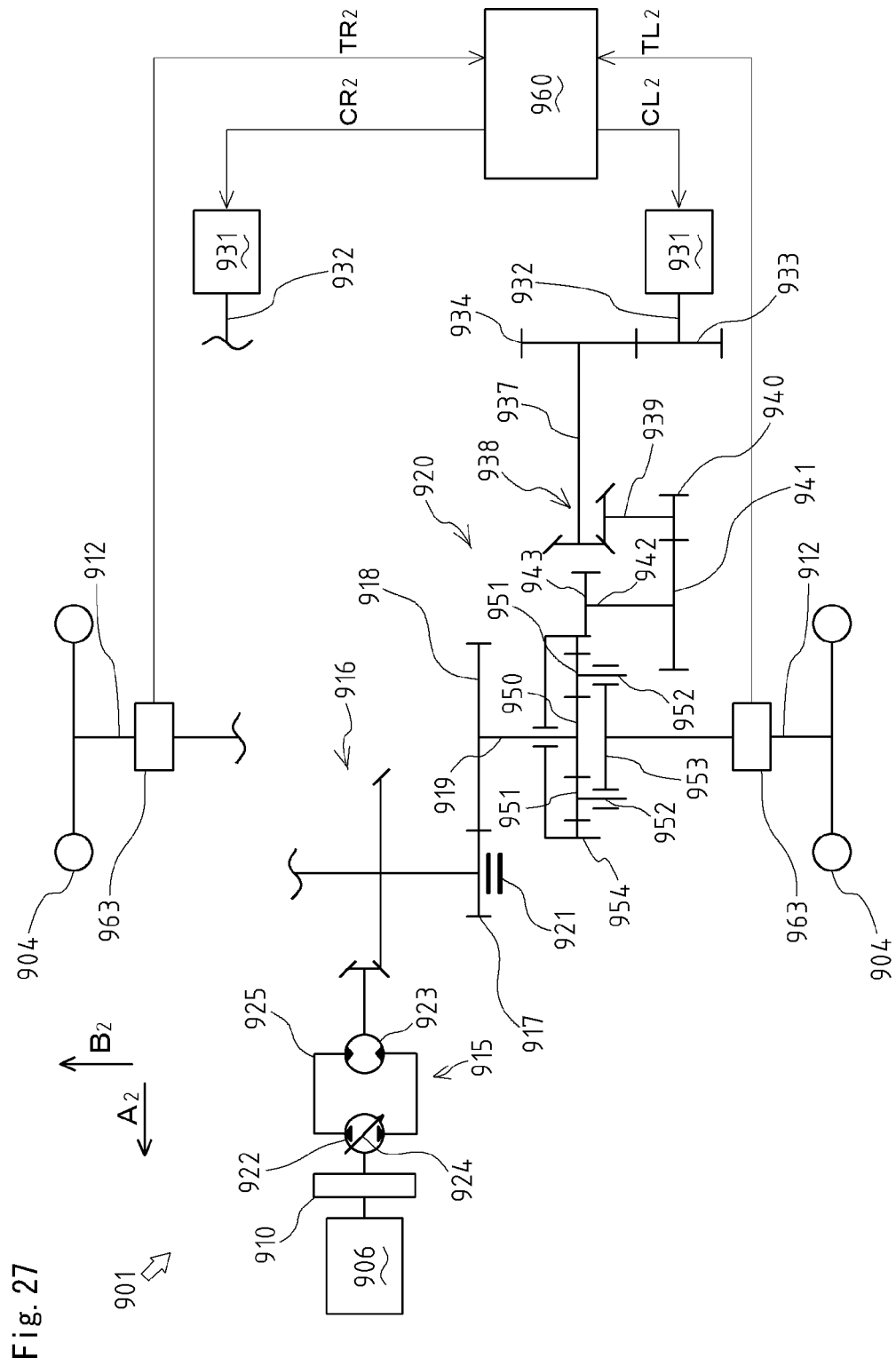
FIG. 27 It is a skeleton diagram of a slip control system of a tractor in another embodiment.

As shown in FIG. 27, torque sensors 963 are provided at intermediate portions of the respective left and right drive axles 912. Each torque sensor 963 detects the torque applied to the drive axle 912. The occurrence of the slip is detected based on the detected torque. Namely, the torque sensors 963 serve as the slip detection means detecting occurrence of the slip.

The torque sensor 963 is connected to the controller 960 as the control means. The left and right torque sensors 963 constantly detect the respective torques applied to the drive axles 912 and transmit detection signals $TR_2$ and $TL_2$ as measures of the detected torques.

The controller 960 judges whether the slip occurs or not at the drive wheels 904 based on changes of the received detection signals $TR_2$ and $TL_2$.

When the vehicle does not slip during traveling or working, the controller 960 transmits the control signals $CR_2$ and $CL_2$ to the motors 931 so as to stop the rotations of the motors 931. Namely, each of the motors 931 has a brake and the output shaft 932 is not rotated when a signal for driving the motor 931 is not transmitted.

When the controller 960 judges that the drive wheel 904 slips, the controller 960 operates the motor 931 at the slipping side. Namely, the controller 960 transmits the signal for reversing the rotation of the motor 931 at the slipping side.

As mentioned above, by operating the motor 931 by the controller 960, the rotational speed of the drive wheel 904 is reduced so as to increase the ground-gripping power, whereby the slip is suppressed.

Explanation will be given on a process for judging whether the drive wheels 904 slip or not based on the detection signals $RR_2$, $RL_2$ and $P_2$.

When the work vehicle travels, the torques are applied to the drive axles 912. The torque is caused by the power transmitted from the planetary gear mechanism 920 and the friction force applied to the drive wheel 904 from the ground surface.

When the tractor 901 travels without slipping, a certain fixed torque is applied to the drive axle 912. The torque is changed according to changes of the rotational speed of the engine and the state of the ground surface. When the slip occurs, the torque applied to the drive axle 912 is smaller than that during traveling without slipping. Therefore, the torque applied to the drive axle 912 during traveling without slipping is measured by experiments and a threshold $TT_2$ is set for comparison of the measured torque with the torque when the slip occurs. The threshold $TT_2$ is a value for judging occurrence of the slip. When the detection signal $TR_2$ or $TL_2$ is smaller than the threshold $TT_2$, it is judged that the slip occurs at the drive wheel generating this detection signal.

The threshold $TT_2$ is previously stored in the controller 960. The controller 960 constantly compares the received detection signals $TR_2$ and $TL_2$ with the threshold $TT_2$. When the detection signal $TR_2$ or $TL_2$ is smaller than the threshold $TT_2$, it is judged that the slip occurs at the drive wheel generating this detection signal.

In this embodiment, the method judging occurrence of the slip based on the detection signal $TR_2$ or $TL_2$ is not limited to the above-mentioned method with the threshold. For example, a change degree of the detection signal per unit time may be measured so as to judge that the slip occurs when the torque is changed suddenly for the unit time, or both the threshold and the change degrees of the detection signals may be used for judging occurrence of the slip.

In this embodiment, the tractor 901 has the HST 915. However, the invention is not limited thereto, and a multi-step transmission such as a manual transmission may alternatively be employed.

In the invention, the slip detection means is not limited to the rotation sensors 961 and the pressure sensor 962 or the torque sensor 963 as mentioned above. Alternatively, for example, a theoretical vehicle speed may be calculated based on the rotational speed of the engine and may be compared with an actual vehicle speed measured by a ground speed sensor or the like so as to judge that the slip occurs when the actual vehicle speed is smaller than the theoretical vehicle speed plus a certain fixed value. Namely, in the invention, any other slip detection means than that as mentioned above may serve as the slip detection means only if it can detect occurrence of the slip of the work vehicle.

The controller 960 as the control means can be set in a turning mode such that one of the left and right drive wheels 904 is accelerated and the other thereof is decelerated, or that the drive wheels are rotated in opposite directions. The tractor 901 has a mode command means which transmits a signal for switching the controller 960 into the turning mode. The mode command means is connected to the controller 960. Accordingly, the controller 960 can be automatically switched into the turning mode so as to minimize the turning radius of the tractor 901.

The "turning mode" is referred to as a state of a turning vehicle where one of the left and right drive wheels is accelerated and the other thereof is decelerated or the drive wheels are rotated oppositely at the time of turning so as to minimize the turning radius. Namely, during turning of the vehicle, the drive wheel at the outside of the turning radius is accelerated and the drive wheel at the inside of the turning radius is decelerated. Otherwise, the drive wheel at the outside of the turning radius is rotated in the normal direction (in the traveling direction) and the drive wheel at the inside of the turning radius is rotated in the reverse direction (oppositely to the traveling direction).

Figure 28:
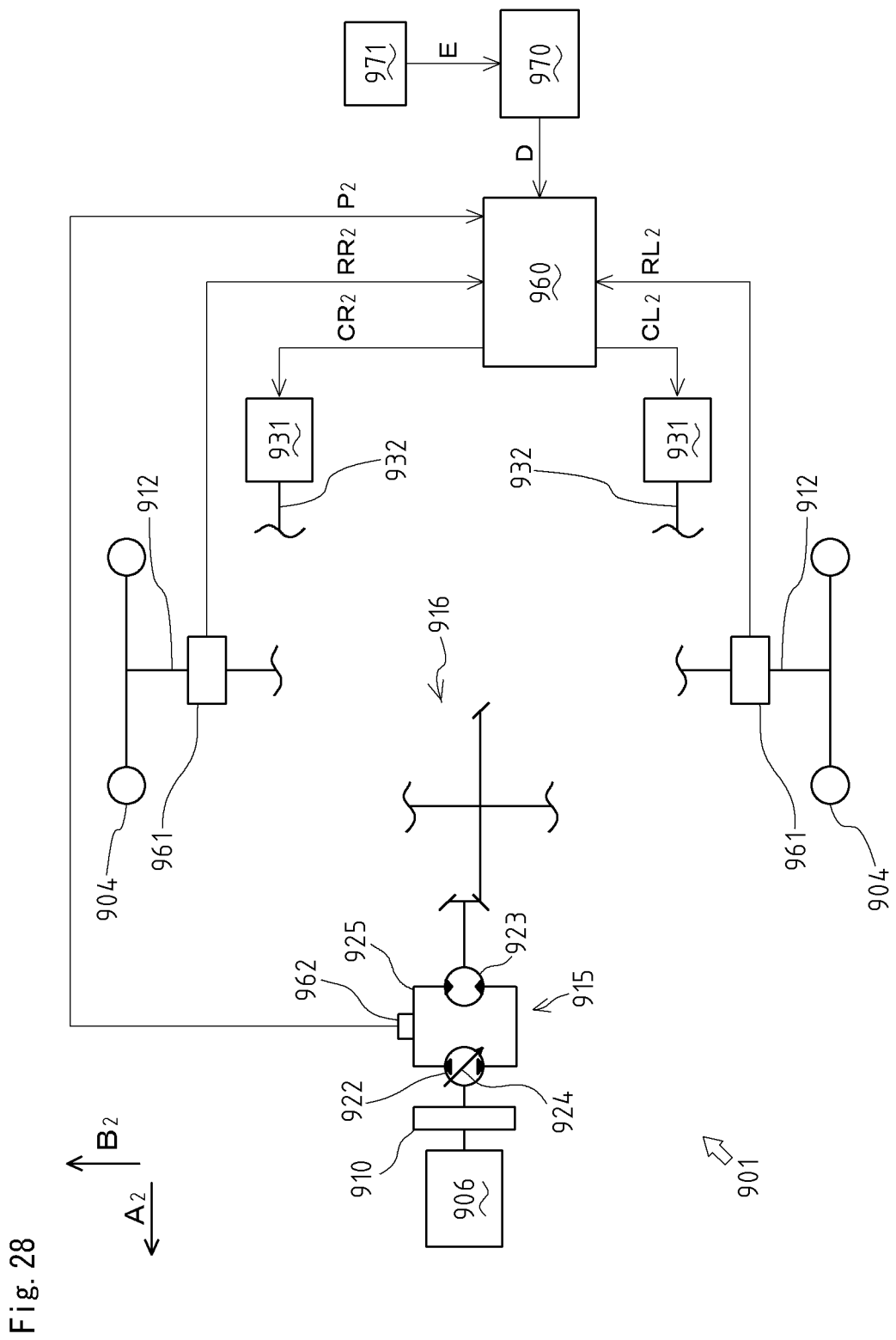
FIG. 28 It is a schematic diagram of the construction concerning a drive and slip control system of a tractor in another embodiment of the tractor.

Concretely, it is constructed as shown in FIG. 28.

A mode command means 970 is constructed by a switch or the like and is connected to the controller 960. The mode command means 970 transmits a signal D to the controller 960 so as to switch the controller 960 into the turning mode. An angle detection means 971 detects the rotation angle of the steering wheel 907. The angle detection means 971 is connected to the mode command means 970 and transmits a signal E as the detected angle to the mode command means 970.

In the construction shown in FIG. 28, the mode command means 970 transmits the signal D to the controller 960 so as to switch the controller 960 into the turning mode. The controller 960 receiving the signal D is switched to the turning mode. In correspondence to the rotation angle of the steering wheel 907 detected by the angle detection means 971, the control signals $CR_2$ and $CL_2$ are transmitted to the left and right motors 931 so that the drive wheel 904 at the outside of the turning radius is accelerated and the drive wheel 904 at the inside of the turning radius is decelerated. When the steering wheel 907 is further rotated and the rotation angle of the steering wheel 907 becomes not less than the set angle, the control signals $CR_2$ and $CL_2$ are transmitted to the left and right motors 931 so that the drive wheel 904 at the outside of the turning radius is rotated in the normal direction and the drive wheel 904 at the inside of the turning radius is rotated in the reverse direction. Accordingly, the tractor 901 can turns on a small turning radius.

Explanation will be given on the mode command means 970.

During traveling of the vehicle on a normal road or during work of the vehicle by straight traveling, it is not necessary to minimize the turning radius. Then, the controller 960 must be switched into the turning mode only at the time of turning at low speed. Therefore, the mode command means 970 transmits the signal D to the controller 960 so as to switch the controller 960 into the turning mode when the traveling speed of the tractor 901 is not less than the set speed and the signal E meaning that the tractor 901 is turning is detected.

Concretely, the turning mode of the mode command means 970 includes a normal turning mode (not actuating the motors 931), a small turning mode and an immobile turning mode.

In the small turning mode, in correspondence to the rotation angle of the steering wheel 907, the controller 960 transmits the control signals $CR_2$ and $CL_2$ to the left and right motors 931 so that the drive wheel 904 at the outside of the turning radius is accelerated and the drive wheel 904 at the inside of the turning radius is decelerated.

In the immobile turning mode, in addition to the above-mentioned turning, when the rotation angle of the steering wheel 907 becomes not less than the preset angle, the controller 960 transmits the control signals $CR_2$ and $CL_2$ to the left and right motors 931 so that the drive wheel 904 at the outside of the turning radius is rotated in the normal direction and the drive wheel 904 at the inside of the turning radius is rotated in the reverse direction.

For example, when the steering wheel 907 is turned left and the steering angle of the steering wheel 907 becomes larger than the set angle, the control signal $CR_2$ is transmitted to the motor 931 connected interlockingly to the planetary gear mechanism 920 at the right side which is the outside of the turning radius so as to rotate the right drive wheel 904 in the normal direction. The control signal $CL_2$ is transmitted to the motor 931 connected interlockingly to the planetary gear mechanism 920 at the left side which is the inside of the turning radius so as to rotate the left drive wheel 904 in the reverse direction.

By the motors 931, the right drive wheel 904 is rotated in the normal direction and the left drive wheel 904 is rotated in the reverse direction. Accordingly, in comparison with the case that the left and right drive wheels 904 are rotated in the normal direction, the tractor 901 can be rotated on a smaller turning radius. The inside drive wheel 904 is rotated at the time of turning, whereby the drive wheels do not stick to the ground and the ground is not damaged.

When the controller 960 is set in the immobile turning mode and when the steering wheel 907 is returned toward the neutral position (the rotation angle of the steering wheel 907 is decreased) and the rotation angle of the steering wheel 907 becomes not larger than the set angle, the control is shifted to the small turning mode.

According to the construction of this embodiment, the turning radius of the tractor 901 can be small. Therefore, the mobility and working efficiency of the tractor 901 can be improved.

In this embodiment, the angle detection means 971 detects the rotation angle of the steering wheel 907. However, the invention is not limited thereto. For example, the angle detection means 971 may alternatively detect the steering angle of the front wheels 903.

In this embodiment, the steering mode is automatically shifted in response to change of the rotation angle of the steering wheel 907 detected by the angle detection means 971. However, the invention is not limited thereto. Alternatively, for example, a switch serving as the mode command means may be manually operated so as to shift the steering mode. Further alternatively, the shift of the steering mode is prohibited previously so as to prevent the automatic shift of the steering mode according to change of the rotation angle of the steering wheel 907.

In the above-mentioned embodiment, any differential is not provided in the distribution part 916. However, the invention is not limited thereto, and a differential may be provided in the tractor 901.

As mentioned above, the tractor 901 according to this embodiment includes the transmission, which speed-changes power from the engine 906, and the distribution part 916, which distributes the power speed-changed by the transmission to the left and right sides thereof. The distributed power is transmitted through the left and right reduction devices and the drive axles 912 to the left and right drive wheels 904. The planetary gear mechanisms 920 serve as the reduction devices, and the motors 931 control rotations of the ring gears 954 of the respective planetary gear mechanisms 920. The slip detection means detect whether the respective drive wheels 904 slip or not. The controller 960 is connected to the motors 931 and the slip detection means. When the controller 960 judges that the slip occurs at either one of the drive wheels 904, the controller 960 operates the motor 931 at the slipping side.

Accordingly, the slip control can be performed for only the slipped wheel. The smooth slip control can be performed regardless of what kind of the transmission the vehicle has. Furthermore, the reduction devices can be compact because they are the planetary gear mechanisms 920. An appropriate torque can be transmitted to the left and right drive wheels 904 with no differential and with no differential lock operation.

The motor 931 is arranged at the motor-arrangeable position where the motor can be arranged. The drive shaft 937 is interlockingly connected at one of ends thereof through the gear to the outer periphery of the ring gear 954, and is extended at the other end thereof to the motor-arrangeable position s as to be interlockingly connected through the gear to the output shaft 932 of the motor 931.

Accordingly, the motor 931 can be provided at the motor-arrangeable position even if the motor arranged at the position has to be distant from the planetary gear mechanism 920.

The controller 960 can be set in a turning mode such that the left and right drive wheels 904 are rotated in opposite directions. The mode command means 970 is provided for transmitting the signal for switching the controller 960 into the turning mode. The mode command means 970 is connected to the controller 960.

Accordingly, the controller 960 can be automatically switched into the turning mode for minimizing the turning radius of the tractor 901.

INDUSTRIAL APPLICABILITY

The present invention is adaptable for preventing slip of a work vehicle.

The invention claimed is:

1. A work vehicle comprising:
an engine generating a rotational power;
a hydraulic stepless transmission having a hydraulic pump and a hydraulic motor, speed-changing the rotational power generated by the engine and transmitting the power to a drive wheels;
a speed setting means for changing a tilt angle of a movable swash plate of the hydraulic pump so as to adjust a speed change ratio of the hydraulic stepless transmission;
a damper having an adjustable damping force for restricting movement of the speed setting means at a rate determined based on a friction coefficient between the drive wheel and a ground surface; and
a damping force setting means for adjusting the damping force of the damper so as to set the rate.

* * * * *